United States Patent
Zhao et al.

(10) Patent No.: US 11,134,275 B2
(45) Date of Patent: Sep. 28, 2021

(54) METHOD AND APPARATUS FOR PERFORMING PRIMARY TRANSFORM BASED ON FILTERING OF BLOCKS

(71) Applicant: TENCENT AMERICA LLC, Palo Alto, CA (US)

(72) Inventors: Xin Zhao, Santa Clara, CA (US); Liang Zhao, Sunnyvale, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/884,971

(22) Filed: May 27, 2020

(65) Prior Publication Data

US 2020/0389671 A1  Dec. 10, 2020

Related U.S. Application Data

(60) Provisional application No. 62/857,141, filed on Jun. 4, 2019, provisional application No. 62/892,238, filed on Aug. 27, 2019.

(51) Int. Cl.
  *H04N 7/18* (2006.01)
  *H04N 19/61* (2014.01)
  (Continued)

(52) U.S. Cl.
  CPC .......... *H04N 19/61* (2014.11); *H04N 19/117* (2014.11); *H04N 19/119* (2014.11);
  (Continued)

(58) Field of Classification Search
  CPC .... H04N 19/61; H04N 19/172; H04N 19/176; H04N 19/119; H04N 19/117; H04N 19/80; H04N 19/186; H04N 19/159
  (Continued)

(56) References Cited

U.S. PATENT DOCUMENTS 8,238,442 B2  8/2012  Liu
8,526,495 B2  9/2013  Liu et al.
(Continued)

OTHER PUBLICATIONS

Reza et al, Online learning based mode prediction method for quality scalable extension of the high efficiency video coding (HEVC) standard (Year: 2017).*
(Continued)

*Primary Examiner* — Shan E Elahi
(74) *Attorney, Agent, or Firm* — Oblon, McClelland, Maier & Neustadt, L.L.P.

(57) ABSTRACT

A method of video decoding for a decoder is provided. In the method, prediction information of a current block in a current picture is decoded from a coded video bitstream, where the prediction information is indicative of an inter prediction mode. Whether a filtering process is applied on the current block is determined, where the filtering process adjusts inter prediction samples of the current block based on neighboring reconstructed samples of the current block. A primary transform is thus performed for a transform block according to a pre-defined primary transform type based on that the filtering process is determined to be applied on the current block, where the transform block is partitioned from the current block.

20 Claims, 22 Drawing Sheets

US 11,134,275 B2
Page 2

(51) Int. Cl.
| | |
|---|---|
| *H04N 19/172* | (2014.01) |
| *H04N 19/176* | (2014.01) |
| *H04N 19/119* | (2014.01) |
| *H04N 19/117* | (2014.01) |
| *H04N 19/80* | (2014.01) |
| *H04N 19/186* | (2014.01) |
| *H04N 19/159* | (2014.01) |

(52) U.S. Cl.
CPC ......... *H04N 19/159* (2014.11); *H04N 19/172* (2014.11); *H04N 19/176* (2014.11); *H04N 19/186* (2014.11); *H04N 19/80* (2014.11)

(58) Field of Classification Search
USPC .................................................... 375/240.12
See application file for complete search history.

(56) References Cited

U.S. PATENT DOCUMENTS

| | | | |
|---|---|---|---|
| 9,049,452 | B2 | 6/2015 | Liu et al. |
| 9,788,019 | B2 | 10/2017 | Liu et al. |
| 10,284,860 | B1 | 5/2019 | Zhao et al. |
| 10,284,866 | B1 | 5/2019 | Zhao et al. |
| 10,404,980 | B1 | 9/2019 | Zhao et al. |
| 10,419,754 | B1 | 9/2019 | Zhao et al. |
| 10,432,929 | B2 | 10/2019 | Zhao et al. |
| 10,462,486 | B1 | 10/2019 | Zhao et al. |
| 10,469,845 | B1 | 11/2019 | Zhao et al. |
| 10,491,893 | B1 | 11/2019 | Zhao et al. |
| 10,536,720 | B2 | 1/2020 | Zhao et al. |
| 10,567,752 | B2 | 2/2020 | Zhao et al. |
| 10,567,801 | B2 | 2/2020 | Zhao et al. |
| 10,609,384 | B2 | 3/2020 | Chen et al. |
| 10,609,402 | B2 | 3/2020 | Zhao et al. |
| 2006/0165181 | A1* | 7/2006 | Kwan .................. H04N 19/82 375/240.24 |
| 2008/0187044 | A1 | 8/2008 | Kim et al. |
| 2013/0182779 | A1* | 7/2013 | Lim ..................... H04N 19/117 375/240.29 |
| 2013/0188719 | A1* | 7/2013 | Chen ..................... H04N 19/46 375/240.16 |
| 2013/0251026 | A1* | 9/2013 | Guo ....................... H04N 19/90 375/240.02 |
| 2015/0103918 | A1* | 4/2015 | Wang ................... H04N 19/176 375/240.24 |
| 2015/0139298 | A1* | 5/2015 | Seregin ................ H04N 19/109 375/240.02 |
| 2015/0264402 | A1* | 9/2015 | Zhang .................... H04N 19/44 375/240.18 |
| 2016/0100191 | A1* | 4/2016 | Mishra ................. H04N 19/176 375/240.12 |
| 2016/0316229 | A1* | 10/2016 | Helle ..................... H04N 19/30 |
| 2016/0318385 | A1* | 11/2016 | Terayama ................ B60K 6/52 |
| 2016/0337649 | A1* | 11/2016 | Chuang ............... H04N 19/102 |
| 2016/0353117 | A1* | 12/2016 | Seregin .................. H04N 19/70 |
| 2017/0048553 | A1 | 2/2017 | Mukherjee et al. |
| 2017/0094285 | A1* | 3/2017 | Said .................... H04N 19/157 |
| 2017/0094313 | A1* | 3/2017 | Zhao ..................... H04N 19/12 |
| 2019/0052883 | A1* | 2/2019 | Ikeda .................. H03M 7/4018 |
| 2019/0158870 | A1* | 5/2019 | Xu ......................... H04N 19/51 |
| 2020/0221108 | A1* | 7/2020 | Xu ....................... H04N 19/105 |

OTHER PUBLICATIONS

International Search Report and Written Opinion dated Oct. 6, 2020 in PCT/US2020/035147.
Andrew Segall et al., Joint call for Proposals on Video Compression with Capability beyond HEVC, Joint Video Exploration Team (JVET) of ITU-T SG 16 WP3 and ISO/IEC JTC 1/SC 29/WG 11; JVET-H1002 (v6), 8$^{th}$ Meeting: Macao, CN Oct. 18-24, 2017, 12 pages.
Annex A: Detailed description of test sequences, 4 pages.
Annex B: Distribution formats for test sequences and decoded results, delivery of bitstreams and binary decoders, utilities and cross-check meeting day, 1 page.
Annex C: Description of testing environment and methodology, 4 pages.
Annex D: Description of HDR video category test metrics, 4 pages.
Annex E: Description of 3600 video objective test metrics, 2 pages.
Peter De Rivas, et al., "AV1 Bitstream & Decoding Process Specification", The Alliance for Open Media, Errata 1, Version 1.0.0, 2018, (681 pages).
Benjamin Bross, et al., "Versatile Video Coding (Draft 2)", Joint Video Experts Team (JVET) of ITU-T SG 16 WP 3 and ISO/IEC JTC 1/SC 29/WG 11, JVET-K1001-v6, 11$^{th}$ Meeting, Ljubljana, SI, Jul. 10-18, 2018 (139 pages).
Benjamin Bross, et al., "General Video Coding Technology in Responses to the Joint Call for Proposals on Video Compression with Capability beyond HEVC", IEEE Transactions on Circuits and Systems for Video Technology, 2019, pp. 1-16.
Yao-Jen Chang, et al., "Intra prediction using multiple reference lines for the versatile video coding standard," Proceedings of SPIE, Applications of Digital Image Processing XLII, vol. 11137, Sep. 6, 2019 (8 pages).
Fabien Recapé, et al., "CE3-related: Wide-angle intra prediction for non-square blocks", JVET-K0500 (9 pages).
Fabien Recapé, et al., "CE3-related: Wide-angle intra prediction for non-square blocks," Joint Video Experts Team (JCET) of ITU-T SG 16 WP 3 and ISO/IEC JTC 1/SC 29/WG 11, JVET-K0500_r1, 11th Meeting: Ljubljana, SI, Jul. 10-18, 2018 (7 pages).
Fabien Recapé, et al., "CE3-related: Wide-angle intra prediction for non-square blocks," Joint Video Experts Team (JVET) of ITU-T SG 16 WP 3 and ISO/IEC JTC 1/SC 29/WG 11, JVET-K0500_r2, 11th Meeting: Ljubljana, SI, Jul. 10-18, 2018 (7 pages).
Fabien Recapé, et al., "CE3-related: Wide-angle intra prediction for non-square blocks," Joint Video Experts Team (JVET) of ITU-T SG 16 WP 3 and ISO/IEC JTC 1/SC 29/WG 11, JVET-K0500_r3, 11th Meeting: Ljubljana, SI, Jul. 10-18, 2018 (12 pages).
Fabien Recapé, et al., "CE3-related: Wide-angle intra prediction for non-square blocks," Joint Video Experts Team (JVET) of ITU-T SG 16 WP 3 and ISO/IEC JTC 1/SC 29/WG 11, JVET-K0500_r4, 11th Meeting: Ljubljana, SI, Jul. 10-18, 2018 (13 pages).
Appendix A, JVET-K0500 Results Table 1 (19 pages).
Appendix B, JVET-K0500 Results Table 2 (19 pages).
Appendix C, JVET-K0500 Results Table 3 (17 pages).
Benjamin Bross, et al., "CE3: Multiple reference line intra prediction (Test 1.1.1, 1.1.2, 1.1.3 and 1.1.4)", Joint Video Experts Team (JVET) of ITU-T SG 16 WP 3 and ISO/IEC JTC 1/SC 29/WG 11, JVET-L0283-v2, 12$^{th}$ Meeting, Macao, CN, Oct. 3-12, 2018 (7 pages).
Appendix D, JVET-L0283_CE3—Test Table 1.1.1 (22 pages).
Appendix E, JVET-L0283_CE3—Test Table 1.1.2 (23 pages).
Appendix F, JVET-L0283_CE3—Test Table 1.1.3_C1 (23 pages).
Appendix G, JVET-L0283_CE3—Test Table 1.1.3_C2 (28 pages).
Appendix H, JVET-L0283_CE3—Test Table 1.1.3_C3 (23 pages).
Appendix I, JVET-L0283_CE3—Test Table 1.1.3 (28 pages).
Appendix J, JVET-L0283_CE3—Test Table 1.1.4 (28 pages).
Xin Zhao, et al., "CE6: On 8-bit primary transform core (Test 6.1.3)", Joint Video Experts Team (JVET) of ITU-T SG 16 WP 3 and ISO/IEC JTC 1/SC 29/WG 11, JVET-L0285, 12$^{th}$ Meeting: Macao, CN, Oct. 3-12, 2018 (17 pages).
Xin Zhao, et al., "CE6: On 8-bit primary transform core (Test 6.1.3)", Joint Video Experts Team (JVET) of ITU-T SG 16 WP 3 and ISO/IEC JTC 1/SC 29/WG 11, JVET-L0285-r1, 12$^{th}$ Meeting: Macao, CN, Oct. 3-12, 2018 (17 pages).
Appendix K, JVET-L0285_CE6—Results Table 1.3a (49 pages).
Appendix L, JVET-L0285_CE6—Results Table 1.3a_Low (49 pages).
Appendix M, JVET-L0285_CE6—Results Table 1.3b (49 pages).
Appendix N, JVET-L0285_CE6—Results Table 1.3b_Low (49 pages).
Xin Zhao, et al., "CE6: Fast DST-7/DCT-8 with dual implementation support (Test 6.2.3)", Joint Video Experts Team (JVET) of ITU-T SG 16 WP 3 and ISO/IEC JTC 1/SC 29/WG 11, JVET-M0497, 13th Meeting: Marrakech, MA, Jan. 9-18, 2019 (11 pages).
Appendix O, JVET-M0497 Results Table 1 (49 pages).
Appendix P, JVET-M0497 Results Table 2 (67 pages).

(56) References Cited

OTHER PUBLICATIONS

Xin Zhao, et al., "CE6-related: Unified LFNST using block size independent kernel", Joint Video Experts Team (JVET) of ITU-T SG 16 WP 3 and ISO/IEC JTC 1/SC 29/WG 11, JVET-O0539-v2, 15th Meeting: Gothenburg, SE, Jul. 3-12, 2019 (13 pages).
Appendix Q, JVET-O0539-vs-CE6 Results Table 1 (27 pages).
Appendix R, JVET-O0539-vs-CE6 Results Table 2 (24 pages).
Appendix S, JVET-O0539-vs-CE6 Results Table 3 (27 pages).
Appendix T, JVET-O0539-vs-CE6 Results Table 4 (24 pages).
Appendix U, JVET-O0539-vs-VTM5 Results Table 1 (32 pages).
Appendix V, JVET-O0539-vs-VTM5 Results Table 2 (28 pages).
Xin Zhao, et al., "Non-CE6: Configurable max transform size in VVC" Joint Video Experts Team (JVET) of ITU-T SG 16 WP 3 and ISO/IEC JTC 1/SC 29/WG 11, JVET-O0545-v2, 15th Meeting: Gothenburg, SE, Jul. 3-12, 2019 (6 pages).
Appendix W, JVET-O0545 Results Table 1 (31 pages).
Appendix X, JVET-O0545 Results Table 2 (31 pages).
Appendix Y, JVET-O0545 Results Table 3 (31 pages).
Benjamin Bross, et al., "Versatile Video Coding (Draft 6)", Joint Video Experts Team (JVET) of ITU-T SG 16 WP 3 and ISO/IEC JTC 1/SC 29/WG 11, JVET-O2001-vE, 15th Meeting Gothenburg, SE, Jul. 3-12, 2019 (456 pages).
Zhaobin Zhang, et al., "Fast Adaptive Multiple Transform for Versatile Video Coding", Data Compression Conference (DCC), 2019, pp. 63-72.
Zhaobin Zhang, et al., "Fast DST-7/DCT-8 with Dual Implementation Support for Versatile Video Coding", IEEE Transactions on Circuits and Systems for Video Technology, 2020, pp. 1-17.
Xin Zhao, et al., "Novel Statistical Modeling, Analysis and Implementation of Rate-Distortion Estimation for H.264/AVC Coders", IEEE Transactions on Circuits and Systems for Video Technology, vol. 20, No. 5, May 2010, pp. 647-660.
Xin Zhao, et al., "Non-Separable Secondary Transforms for Next Generation Video Coding", IEEE Picture Coding Symposium (PCS), Dec. 4-7, 2016, 5 pages.
Xin Zhao, et al., "Low-Complexity Intra Prediction Refinements for Video Coding", IEEE Picture Coding Symposium (PCS), 2018, pp. 139-143.
Xin Zhao, et al., "Joint Separable and Non-Separable Transforms for Next-Generation Video Coding," IEEE Transactions on Image Processing, vol. 27, No. 5, May 2018, pp. 2514-2525.
Xin Zhao, et al., "Coupled Primary and Secondary Transform for Next Generation Video Coding", IEEE Visual Communications and Image Processing (VCIP), 2018, pp. 1-4.
Liang Zhao, et al., "Wide Angular Intra Prediction for Versatile Video Coding", Data Compression Conference (DCC), 2019, pp. 53-62.
Liang Zhao, et al., "CE3-related: Unified MPC list based on CE3-3.3 and CE3-3.5.1", Tencent, JVET-N0394, Mar. 2019 (12 pages).
Liang Zhao, et al., "CE3-related: Unified MPM list based on CE3-3.3 and CE3-3.5.1", Joint Video Experts Team (JVET) of ITU-T SG 16 WP 3 and ISO/IEC JTC 1/SC 29/WG 11, JVET-N0394-r2, 14th Meeting: Geneva, CH, Mar. 19-27, 2019 (11 pages).
Appendix Z, JVET-N0394 Test Results Table 1 (24 pages).
Appendix AA, JVET-N0394 Test Results Table 2 (24 pages).
Appendix AB, JVET-N0394 Test Results Table 3 (24 pages).
Appendix AC, JVET-N0394 Test Results Table 4 (24 pages).
Appendix AD, JVET-N0394 Test Results Table 5 (24 pages).
Appendix AE, JVET-N0394 Test Results Table 6 (24 pages).
Appendix AF, JVET-N0394 Test Results Table 7 (22 pages).
Chun-Chi Chen, et al., "Screen Content Coding Using Non-Square Intra Block Copy for HEVC", IEEE International Conference on Multimedia and Expo (ICME), Jul. 14-18, 2014, 6 pages.
Mei Guo, et al., "Inter-layer Adaptive Filtering for Scalable Extension of HEVC", IEEE Picture Coding Symposium (PCS), Dec. 8-11, 2013, pp. 165-168.
Mei Guo, et al., "Inter-layer Intra Mode Prediction for Scalable Extension of HEVC", IEEE Picture Coding Symposium (PCS), Dec. 8-11, 2013, pp. 317-320.
PoLin Lai, et al., "Low Latency Directional Filtering for Inter-layer Prediction in Scalable Video Coding using HEVC", IEEE Picture Coding Symposium (PCS), Dec. 2013, pp. 269-272.
PoLin Lai, et al., "Combined Temporal and Inter-layer Prediction for Scalable Video Coding using HEVC", IEEE Picture Coding Symposium (PCS), Dec. 8-11, 2013, pp. 117-120.
Shan Liu, et al., "Global/Local Motion-Compensated Frame Interpolation for Low Bitrate Video", Proceedings of SPIE—The International Society for Optical Engineering, Apr. 2000, 12 pages.
Shan Liu, et al., "Non-linear Motion-compensated Interpolation for Low Bit Rate Video", Proceedings of SPIE, Applications of Digital Image Processing XXIII, International Symposium on Optical Science and Technology, vol. 4115, Dec. 28, 2000, pp. 203-213.
Shan Liu, et al., "MCI-embedded Motion Compensated Prediction for Quality Enhancement of Frame Interpolation", Proceedings of SPIE, Multimedia Systems and Applications III, vol. 4209, Mar. 22, 2001, pp. 251-261.
Shan Liu, et al., "Bit Allocation for Video Coding with Temporal-Spatial Tradeoff", Advances in Multimedia Information Processing—PCM, Second IEEE Pacific Rim Conference on Multimedia, 2001, pp. 466-473.
Shan Liu, et al., "Improved Video Coding via Adaptive Selection of Generalized Motion Prediction Modes for B Frames", Picture Coding Symposium (PCS), 2001, pp. 358-361.
Shan Liu, et al., "Complexity Reduction of Joint Temporal-Spatial Bit Allocation Using R-D Models for Video Streaming", International Conference on Image Processing (ICIP), vol. 1, 2002, pp. I-729-I-732.
Shan Liu, et al., "MPEG Video Transcoding with Joint Temporal-Spatial Rate Control", Proceedings of SPIE, Applications of Digital Image Processing XXV, International Symposium on Optical Science and Technology, vol. 4790, Nov. 21, 2002, pp. 278-289.
Shan Liu, et al., "Joint Temporal-Spatial Rate Control with Approximating Rate-Distortion Models", Proceedings of SPIE, Visual Communications and Image Processing, vol. 4671, 2002, pp. 746-755.
Shan Liu, et al., "Joint Temporal-Spatial Rate Control for Adaptive Video Transcoding", International Conference on Multimedia and Expo. ICME '03, Jul. 6-9, 2003, pp. I1-225-I1-228.
Shan Liu, et al., "Hybrid global-local motion compensated frame interpolation for low bit rate video coding", J. Vis. Commun. Image R., vol. 14, 2003, pp. 61-79.
Shan Liu, et al., "Efficient MPEG-2 to MPEG-4 Video Transcoding", Proceedings of SPIE, Image and Video Communications and Processing, vol. 5022, 2003, pp. 186-195.
Shan Liu, et al., "Joint Temporal-Spatial Bit Allocation for Video Coding With Dependency", IEEE Transactions on Circuits and Systems for Video Technology, vol. 15, No. 1, Jan. 2005, pp. 15-26.
Shan Liu, et al., "Video Prediction Block Structure and the Emerging High Efficiency Video Coding Standard", Proceedings of the 2012 Asia Pacific Signal and Information Processing Association Annual Summit and Conference, Dec. 3-6, 2012, 4 pages.
Shan Liu, et al., "Rectangular Partitioning for Intra Prediction in HEVC", Visual Communications and Image Processing, Nov. 27-30, 2012, 6 pages.
Jian Lou, et al., "Complexity and Memory Efficient GOP Structures Supporting VCR Functionalities in H.264/AVC", IEEE International Symposium on Circuits and Systems, May 18-21, 2008, 636-639 pages.
Jian Lou, et al., "Trick-Play Optimization for H.264 Video Decoding", Journal of Information Hiding and Multimedia Signal Processing, vol. X, 2009, 14 pages.
Wei Pu, et al., "Palette Mode Coding in HEVC Screen Content Coding Extension", IEEE Journal on Emerging and Selected Topics in Circuits and Systems, vol. 6, No. 4, Dec. 2016, pp. 420-432.
Shan Liu, et al., "Bit-depth Scalable Coding for High Dynamic Range Video", Mitsubishi Electric Research Laboratories, TR2007-078, Apr. 2008, 11 pages.
Yu-Chen Sun, et al., "Palette Mode—A New Coding Tool in Screen Content Coding Extensions of HEVC", International Conference on Image Processing (ICIP), 2015, pp. 2409-2413.
Yu-Chen Sun, et al., "Improved Palette Index Map Coding on HEVC SCC", International Conference on Image Processing (ICIP), 2016, pp. 4210-4214.

(56) References Cited

OTHER PUBLICATIONS

Xiaozhong Xu, et al., "PU Level Intra Block Copying with Flipping Mode", Signal and Information Processing Association Annual Summit and Conference (APSIPA), 2014, 7 pages.
Xiaozhong Xu, et al., "Block Vector Prediction in Intra Block Copy for HEVC Screen Content Coding", IEEE Data Compression Conference, 2015, pp. 273-282.
Xiaozhong Xu, et al., "Intra Block Copy in HEVC Screen Content Coding Extensions", IEEE Journal on Emerging and Selected Topics in Circuits and Systems, 2016, 11 pages.
Ximin Zhang, et al., "Intra Mode Coding in HEVC Standard", Visual Communications and Image Processing, 2012, 6 pages.

* cited by examiner

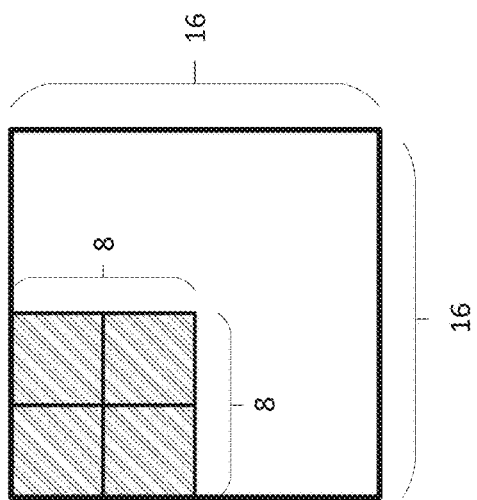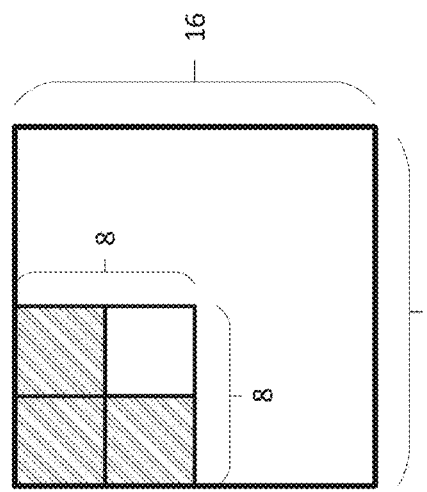

METHOD AND APPARATUS FOR PERFORMING PRIMARY TRANSFORM BASED ON FILTERING OF BLOCKS

INCORPORATION BY REFERENCE

This present application claims the benefit of priority to U.S. Provisional Application No. 62/857,141, "IMPLICIT TRANSFORM FOR INTER PREDICTION MODES" filed on Jun. 4, 2019, and U.S. Provisional Application No. 62/892,238, "HIGH-LEVEL SYNTAX ON PRIMARY TRANSFORM" filed on Aug. 27, 2019. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 gigabytes (GB) of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide a modified implicit transform method. In addition, an implicit transform selection method for an inter position dependent prediction combination (PDPC) prediction mode is provided.

According to an aspect of the disclosure, a method of video decoding for a decoder is provided. In the method, prediction information of a current block in a current picture is decoded from a coded video bitstream, where the prediction information is indicative of an inter prediction mode. Whether a filtering process is applied on the current block is determined, where the filtering process adjusts inter prediction samples of the current block based on neighboring reconstructed samples of the current block. A primary transform is thus performed for a transform block according to a pre-defined primary transform type based on that the filtering process is determined to be applied on the current block, where the transform block is partitioned from the current block.

In some embodiments, the filtering process can be operated based on a position dependent prediction combination (PDPC) mode or a combined inter and intra prediction (CIIP) mode.

In some embodiments, the pre-defined primary transform type can be a type-7 discrete sine transform (DST-7) mode for a horizontal transform that is applied to the transform block responsive to a width of the current block being smaller than or equal to a threshold value. The pre-defined primary transform type can be the DST-7 mode for a vertical transform that is applied to the transform block responsive to a height of the current block being smaller than or equal to the threshold value. The threshold value can include one of 4 pixels, 8 pixels, 16 pixels, or 32 pixels.

In the method, the pre-defined primary transform type can be a type-2 discrete cosine transform (DCT-2) mode for a horizontal transform that is applied to the transform block responsive to a width of the current block being bigger than to a threshold value. The pre-defined primary transform type can be the DCT-2 mode for a vertical transform is applied to the transform block responsive to a height of the current block being larger than the threshold value. The threshold value can include one of 4 pixels, 8 pixels, 16 pixels, or 32 pixels.

In some embodiments, the pre-defined primary transform type can be a transform skip mode (TSM), a DCT-2 mode, or a DST-7 mode.

In some embodiments, the filtering process can be a boundary filtering process in which at least one of rows adjacent to a boundary of the current block or at least one of columns adjacent to the boundary of the current block are adjusted based on the filtering process.

In some embodiments, the filtering process applies position-dependent weightings between the inter prediction samples of the current block and the neighboring reconstructed samples of the current block.

In the method, the pre-defined primary transform type can be implicit for a luma component of the current block, and a DCT-2 mode or a transform skip mode (TSM) for a chroma component of the current block.

In the method, the pre-defined primary transform type can be a type-7 discrete sine transform (DST-7) mode for a horizontal transform that is applied to the transform block responsive to (i) the filtering process being operated in the CIIP mode with a ratio of $W_{intra}/W_{inter}$ being larger than a first threshold, and (ii) a width of the current block being smaller than or equal to a second threshold value. The primary transform type can be the DST-7 mode for a vertical transform that is applied to the transform block responsive to (i) the filtering process being operated in the CIIP mode with the ratio of $W_{intra}/W_{inter}$ being larger than the first threshold, and (ii) a height of the current block being smaller than or equal to the second threshold value. The first threshold value can include one of 2, 2.5, 3, or 7. The second threshold value can include one of 4 pixels, 8 pixels, 16 pixels, or 32 pixels. $W_{intra}$ can be an intra weighting factor applied on an intra prediction information of the current block, and $W_{inter}$ can be an inter weighting factor applied on an inter prediction information of the current block.

In some embodiments, the pre-defined primary transform type can be a type-7 discrete sine transform (DST-7) mode for a horizontal transform that is applied to the transform block responsive to (i) the filtering process being operated based on the CIIP mode, (ii) both above and left neighboring blocks of the current block being intra coded, and (iii) a width of the current block being smaller than or equal to a threshold value. The pre-defined primary transform type can be the DST-7 mode for a vertical transform that is applied to the transform block responsive to (i) the filtering process being operated in the CIIP mode, (ii) both the above and the left neighboring blocks of the current block being intra coded, and (ii) a height of the current block being smaller than or equal to the threshold value. The threshold value can include one of 4 pixels, 8 pixels, 16 pixels, or 32 pixels.

In some embodiments, the pre-defined primary transform type can be a type-7 discrete sine transform (DST-7) mode for a horizontal transform that is applied to the transform block responsive to (i) the filtering process being operated based on the CIIP mode, (ii) a subset of above and left neighboring blocks of the current block being intra coded, (iii) a width of the current block being smaller than or equal to a threshold value. The pre-defined primary transform type can be the DST-7 mode for a vertical transform that is applied to the transform block responsive to (i) the filtering process being operated based on the CIIP mode, (ii) the subset of the above and the left neighboring blocks of the current block being intra coded, and (iii) a height of the current block being smaller than or equal to the threshold value. The threshold value can include one of 4 pixels, 8 pixels, 16 pixels, or 32 pixels.

In the method, a context model can be determined from a set of context models based on the prediction information, where the prediction information indicates the filtering process that is based on the PDPC mode is applied to the current block. Primary transform type information can be decoded based on the determined context model, where the primary transform type information indicates whether the pre-defined primary transform type includes one of a transform skip mode (TSM), a DCT-2 mode, a DST-7 mode, or a DCT-8 mode.

According to another aspect of the disclosure, a method of video decoding for a decoder is provided. In the method, prediction information of a current block can be acquired from a coded video bitstream. A determination can be made as to whether the prediction information indicates (i) an inter prediction merge mode, and (ii) a combined inter and intra prediction (CIIP) mode. An intra prediction mode can be determined from an intra prediction mode candidate list responsive to the prediction information indicating the inter prediction merge mode and the CIIP mode. Intra prediction information according to the intra prediction mode and inter prediction information according to the inter prediction merge mode can be determined. A weighting factor can further be determined responsive to neighboring blocks of the current block being coded according to the CIIP mode or an inter position dependent prediction combination (PDPC) mode. CIIP prediction information can thus be determined based on a sum of a weighted intra prediction information and weighted inter prediction information, where the weighted intra prediction information is based on the intra prediction information and the weighting factor, and the weighted inter prediction information is based on the inter prediction information and the weighting factor. Further, a sample of the current block can be reconstructed according to the CIIP prediction information.

In some embodiments, weighted inter prediction information can be based on the inter prediction information and a constant value minus the weighting factor, the constant value including one of 2, 4, 8, or 16.

In some embodiments, the weighting factor can be 3 responsive to both top-right/top and bottom-left/left neighboring blocks of the current block being coded using the CIIP mode. In some embodiment, the weighting factor can be 2 responsive to one of the top-right/top and the bottom-left/left neighboring blocks of the current block being coded using the CIIP mode. In some embodiments, the weighting factor can be 1 responsive to the top-right/top and the bottom-left/left neighboring blocks of the current block being coded using the CIIP mode.

In some embodiments, the weighting factor can be 3 responsive to both top-right/top and bottom-left/left neighboring blocks of the current block being coded using the PDPC mode. The weighting factor can be 2 responsive to one of the top-right/top and the bottom-left/left neighboring blocks of the current block being coded using the PDPC mode. The weighting factor can be 1 responsive to none of the top-right/top and the bottom-left/left neighboring blocks of the current block being coded using the PDPC mode.

According to yet another aspect of the disclosure, a method of video decoding for a decoder is provided. In the method, transform block signaling information can be acquired from a coded video bitstream, where the transform block signaling information includes first information associated with an inter prediction transform and second information associated with an intra prediction transform. A first value of the first information and a second value of the second information can subsequently be determined. A first transform block coded in an inter prediction mode can be transformed according to the first value and a first pre-defined transform type in an implicit multiple transform selection (MTS) mode. A second transform block coded in an intra prediction mode can be transformed according to a second value and a second pre-defined transform type in the implicit MTS mode.

In some embodiments, the first value of the first information can be equal to 1 and the second value of the second information can be equal to 1.

In some embodiments, the first value of the first information can be greater than 0, and the second value of the second information can be equal to 1.

In some embodiments, the second transform block coded in the intra prediction mode can be transformed according to the second value, the second pre-defined transform type in the implicit MTS mode, and a coding unit that includes the second transform block being intra sub-partitioning (ISP) coded. The second value is larger than 0.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 13A shows a first embodiment of RST8×8.

FIG. 13B shows a second embodiment of RST8×8.

DETAILED DESCRIPTION OF EMBODIMENTS

Figure 1:
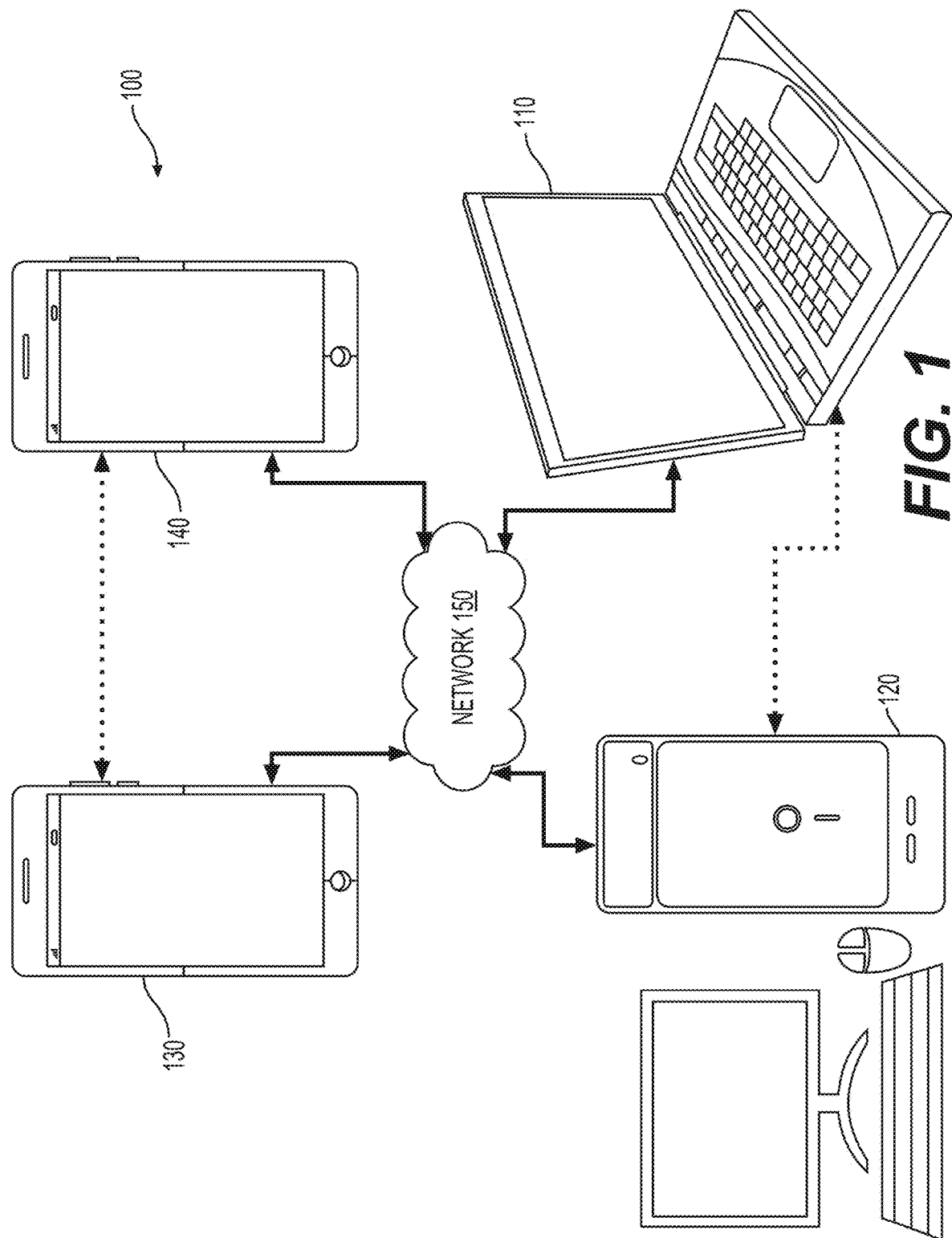
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data.

Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
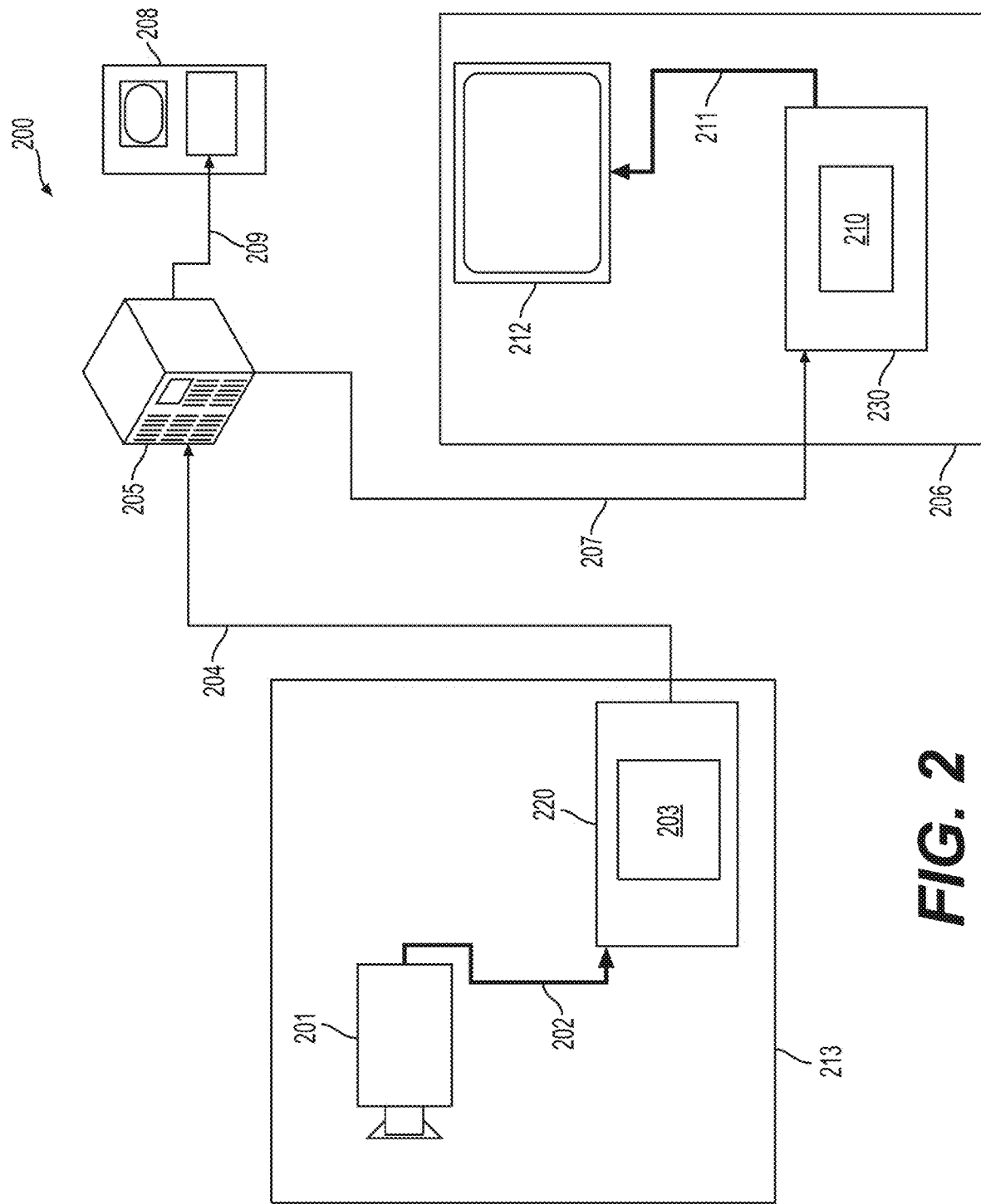
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
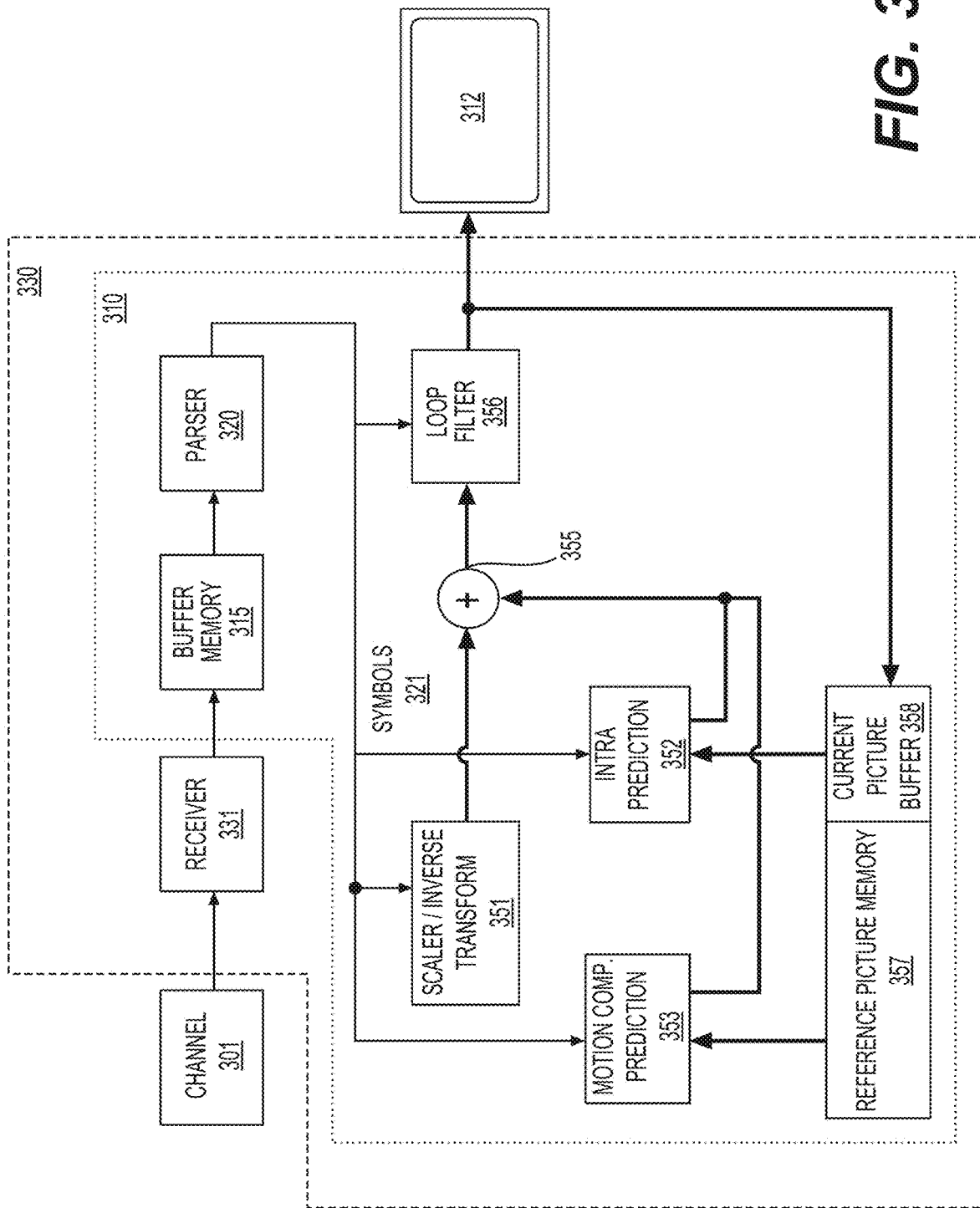
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). Instill others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320)

may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
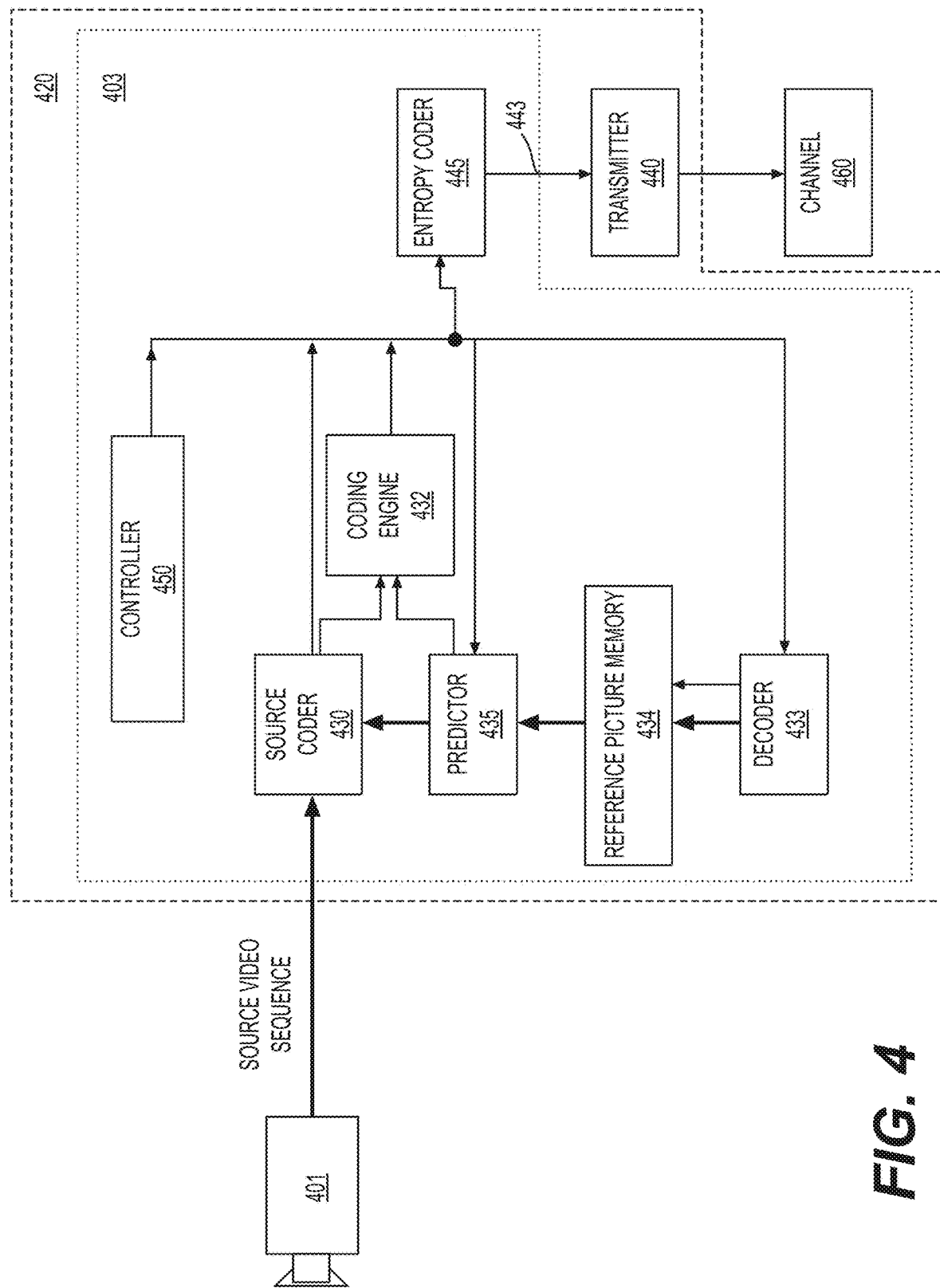
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predicatively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predicatively with reference to other (already coded) blocks as determined by the coding assignment applied to the blocks' respective pictures. For example, blocks of I pictures may be coded non-predicatively or they may be coded predicatively with reference to already coded blocks of the same picture (spatial prediction or intra prediction). Pixel blocks of P pictures may be coded predicatively, via spatial prediction or via temporal prediction with reference to one previously coded reference picture. Blocks of B pictures may be coded predicatively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
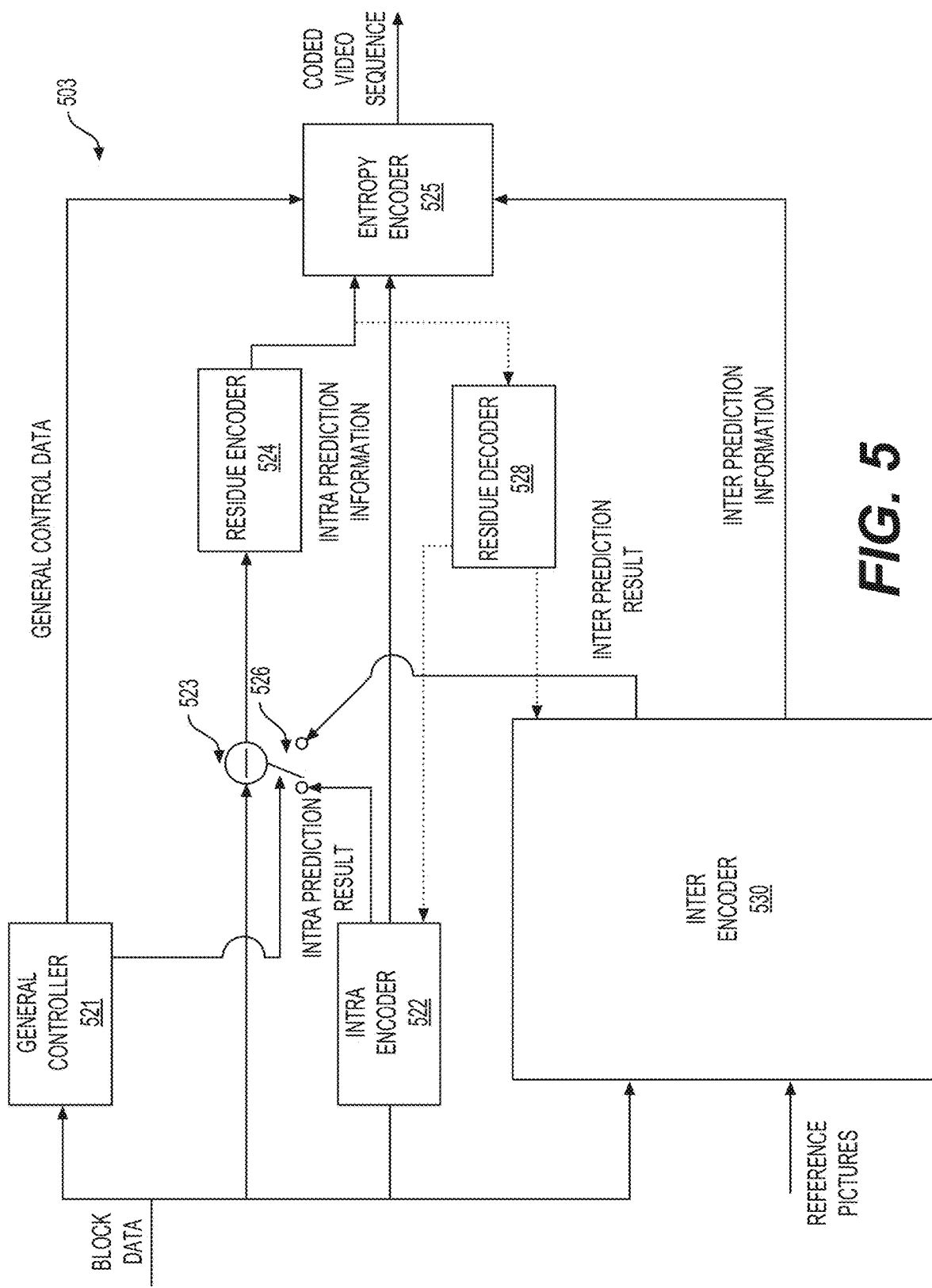
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
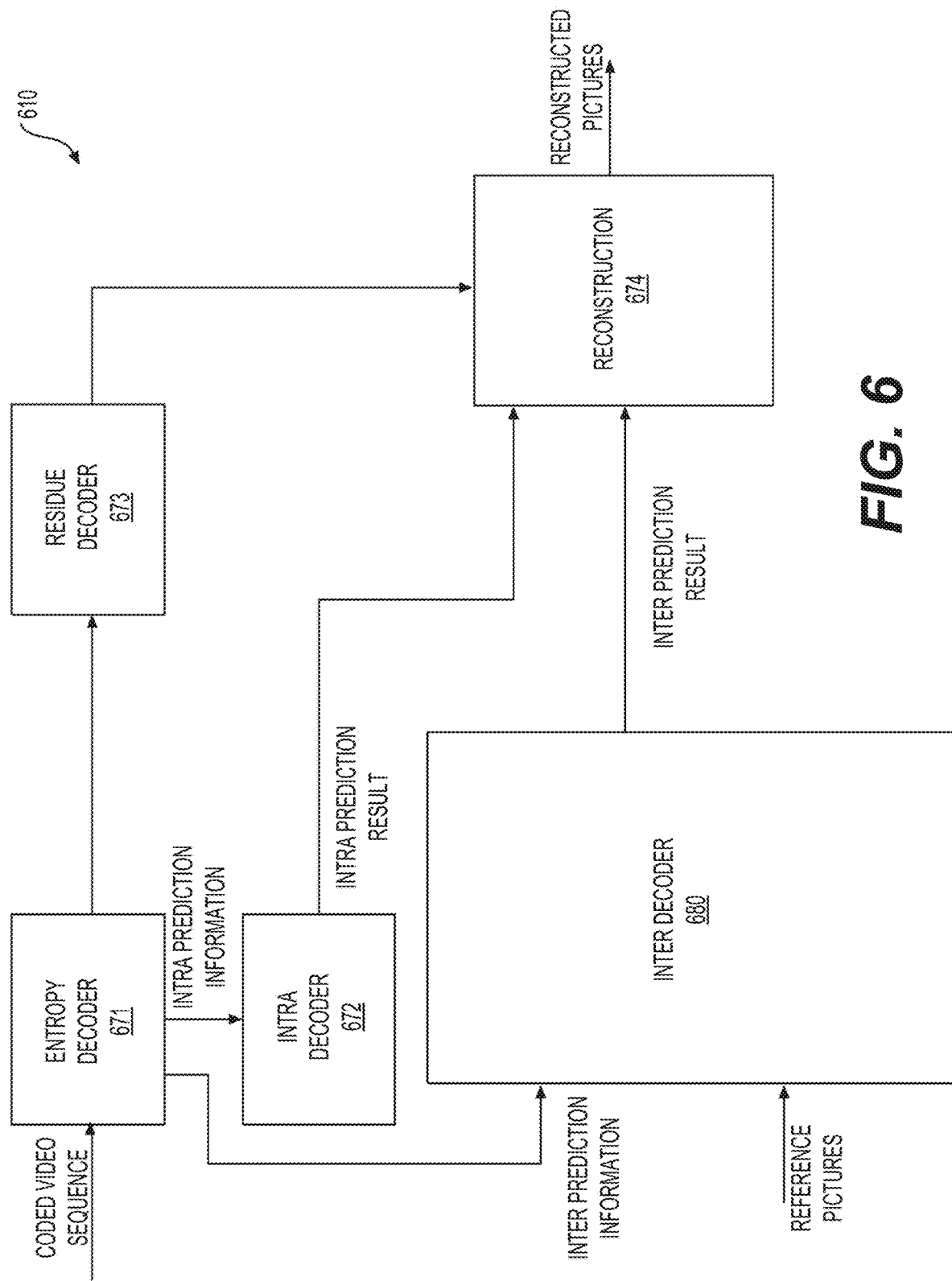
FIG. 6 shows a block diagram of a decoder in accordance with another embodiment.
Figure 7A:
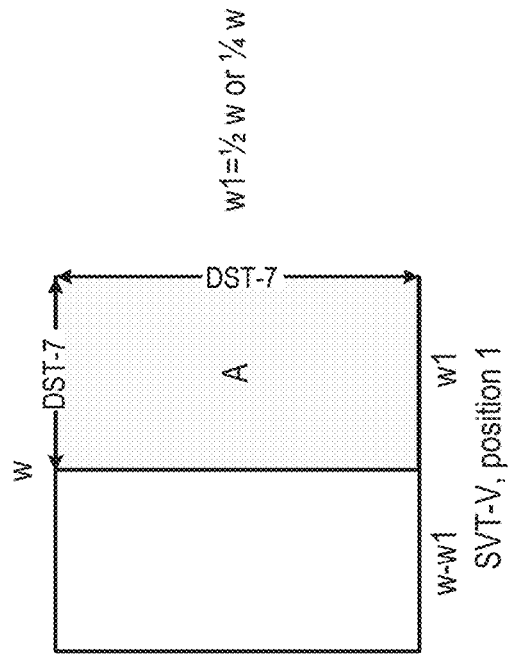
FIGS. 7A-7D show four exemplary sub-block transform modes.
Figure 7B:
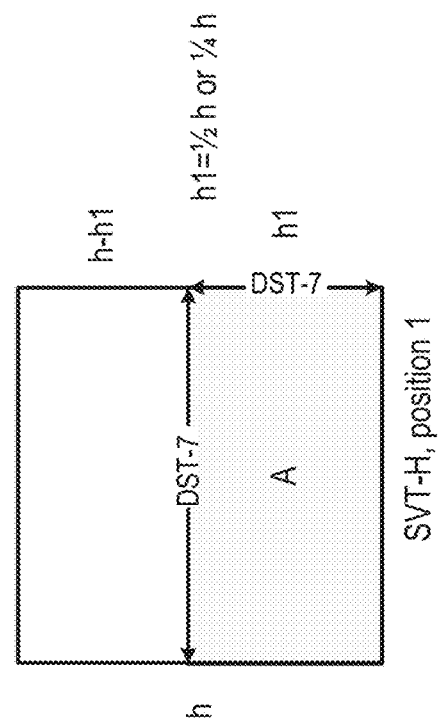
Figure 7C:
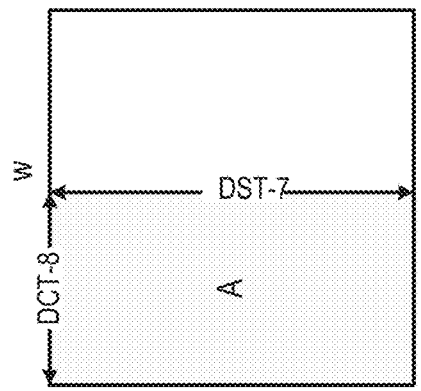
Figure 7D:
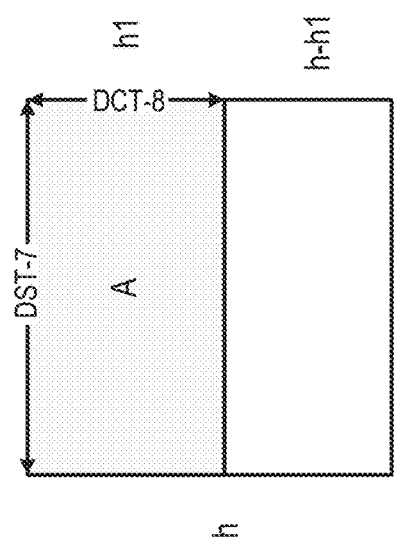

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671)(data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Primary transforms, such as in HEVC, can include 4-point, 8-point, 16-point, and 32-point type-2 discrete cosine transform (DCT-2), and the transform core matrices can be represented using 8-bit integers, i.e., 8-bit transform core. The transform core matrices of smaller DCT-2 transforms can be part of larger DCT-2, transforms as shown below.

---

4 × 4 transform
{64, 64, 64, 64}
{83, 36, −36, −83}
{64, −64, −64, 64}
{36, −83, 83, −36}

8 × 8 transform
{64, 64, 64, 64, 64, 64, 64, 64}
{89, 75, 50, 18, −18, −50, −75, −39}
{83, 36, −36, −83, −33, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

16 × 16 transform
{64 64 64 66 64 64 64 64 64 64 64 64 64 64 64 64}
{90 87 80 70 57 43 25 9 −9−25−43−57−70−80−87−90}
{89 75 50 18−18−50−75−89−89−75−50−18 18 50 75 89}
{87 57 9−43−80−90−70−25 25 70 90 80 43 −9−57−87}
{83 36−36−83−83−36 36 83 83 36−36−33 83−36 36 83}
{80 9−70−87−25 57 90 43−43−90−57 25 87 70 −9−80}
{75−18−89−50 50 89 18−75−75 18 89 50−50−89−18 75}
{70−43−87 9 90 25−80−57 57 80−25−90 −9 87 43−70}
{64−64−64 64 64−64−64 64 64−64−64 64 64−64−64 64}
{57−80−25 90 −9−87 43 70−70−43 87 9−90 25 80−57}
{50−89 18 75−75−18 89−50−50 89 18−75 75 18−89 50}
{43−90 57 25−87 70 9−80 80 −9−70 87−25−57 90−43}
{36−83 83−36 83−83 36 36−83 83−36−36 83−36 36}
{25 −70 90−80 43 9−57 87−87 57 −9−43 80−90 70−25}
{18−50 75−89 89−75 50−18−18 50−75 89−89 75−50 18}
{ 9−25 43−57 70−80 87−90 90−87 80−70 57−43 25 −9}

32 × 32 transform
{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4−13−22−31−38−46−54−61−67−73−78−82−85−88−90−90}
{90 87 80 70 57 43 25 9 −9−25−43−57−70−80−87−90−90 −87−80−70−57−43−25 −9 9 25 43 57 70 80 87 90}
{90 82 67 46 22 −4−31−54−73−85−90−88−78−61−38−13 13 38 61 78 88 90 85 73 54 31 4−22−46−67−82−90}
{39 75 50 18−18−50−75 −89−89−75−50−18 18 50 75 89 89 75 50 18−18−50−75−89−89−75−50−18 18 50 75 89}
{88 67 31−13−54−82−90−78−46 −4 38 73 90 85 61 22− 22 −61−85−90−73−38 4 46 78 90 82 54 13−31−67−88}
{87 57 9−43−80−90−70−25 25 70 90 80 43 −9−57−87− 87 −57 −9 43 80 90 70 25−25−70−90−80−43 9 57 87}
{85 46−13−67−90−73−22 38 82 88 54 −4−61−90−78 31 31 78 90 61 4−54−88−82−38 22 73 90 67 13−46−85}
{83 36−36−83−83−36 36 83 83 36−36−83−83−36 36 83 83 36−36−83−83−36 36 83 83 36−36−83−83−36 36 83}
{82 22−54−90−61 13 78 85 31−46−90−67 4 73 88 38− 38−88−73 −4 67 90 46−31−85−78−13 61 90 54−22−82}
{80 9−70−87−25 57 90 43−43−90−57 25 87 70 −9−80− 80 −9 70 87 25−57−90−43 43 90 57−25−87−70 9 80}
{78 −4−82−73 13 85 67−22−88−61 31 90 54−38−90−46 90 38−54−90−31 61 88 22−67−85−13 73 82 4−78}
{75−18−89−50−50 89 18−75−75 18 89 50−50−89−18 75 75−18−89−50 50 89 18−75−75 18 89 50−50−89−18 75}
{73−31−90−22 78 67−38−90−13 82 61−46−88 −4 85 54− 54−85 4 88 46−61−82 13 90 38−67−78 22 90 31−73}
{70−43−87 9 90 25−80−57 57 80−25−90 9 87 43−70−70 43 87 −9−90−25 80 57−57−80 25 90 9−87−43 70}
{67−54−78 38 85−22−90 4 90 13−88−31 82 46−73−61 61 73−46−82 31 88−13−90 −4 90 22−85−38 78 54−67}
{64−64−64 64 64−64−64 64 64−64−64 64 64−64−64 64 64−64−64 64 64−64−64 64 64−64−64 64 64−64−64 64}
{61−73−46 82 31−88−13 90 −4−90 22 85−38−78 54 67− 67−54 78 38−85−22 90 4−90 13 88−31−82 46 73−61}
{57−80−25 90 −9−87 43 70−70−43 87 9−90 25 80−57−57 80 25−90 9 87−43−70 70 43−87 −9 90−25−80 57}
{54−85 −4 88−46−61 82 13−90 38 67−78−22 90−31−73 73 31−90 22 78−67−38 90−13−82 61 46−88 4 85−54}
{50−89 18 75−75−18 89−50−50 89 18−75 75 18−89 50 50−89 18 75−75−18 89−50−50 89 18−75 75 18−89 50}
{46−90 38 54−90 31 61−88 22 67−85 13 73−82 4 78−78 −4 82−73−13 85−67−22 88−61 31 90−54−38 90−46}
{43−90 57 25−87 70 9−80 80 −9−70 87−25−57 90−43−43 90−57−25 87−70 −9 80−80 9 70−87 25 57−90 43}
{38−88 73 −4−67 90−46−31 85−78 13 61−90 54 22−82 82−22−54 90−61−13 78−85 31 46−90 67 4−73 88−38}
{36−83 83−36−36 83−83 36 36−83 83−36−36 83−83 36 36−83 83−36−36 83−83 36 36−83 83−36−36 83−83 36}
{31−78 90−61 4 54−88 82−38−22 73−90 67−13−46 85−85 46 13−67 90−73 22 38−82 88−54 −4 61−90 78−31}
{25 −70 90−80 43 9−57 87−87 57 −9−43 80−90 70−25− 25 70−90 80−43 −9 57−87 87−57 9 43−80 90−70 25}
{22 −61 85−90 73−38 −4 46−78 90−82 54−13−31 67−88 88−67 31 13−54 82−90 78−46 4 38−73 90−85 61−22}
{18−50 75−89 89−75 50−18−18 50−75 89−89 75−50 18 18−50 75−89 89−75 50−18−18 50−75 89−89 75−50 18}
{13−38 61−78 88−90 85−73 54−31 4 22−46 67−82 90−90 82−67 46−22 −4 31−54 73−85 90−88 78−61 38−13}
{9−25 43−57 70−80 87−90 90−87 80−70 57−43 25 −9 −9 25−43 57−70 80−87 90−90 87−80 70−57 43−25 9}
{4−13 22−31 38−46 54−61 67−73 78−82 85−88 90−90 90−90 88−85 82−78 73−67 61−54 46−38 31−22 13 −4}

---

The DCT-2 cores show symmetry/anti-symmetry characteristics. Thus, a so-called "partial butterfly" implementation is supported to reduce the number of operation counts (e.g., multiplications, adds/subs, shifts), and identical results of matrix multiplication can be obtained using partial butterfly.

Two sub-block transforms can be provided, such as in VVC. A first sub-block transform is SVT or SBT. For example, in JVET-J0024, JVET-K0139, and JVET-L0358, a spatially varying transform (SVT) scheme is proposed. With SVT, for inter prediction residuals, there may be only a residual block in the coding block. Since the residual block is smaller than the coding block, the transform size in SVT is smaller than the coding block size. For the region which is not covered by the residual block or transform, zero residual may be assumed.

SVT can also be called Sub-block Transform (SBT) such as in JVET-L0358. Examples of the sub-block types (e.g., SVT-H, SVT-V), sizes, and positions (e.g., left half, left quarter, right half, right quarter, top half, top quarter, bottom half, bottom quarter) supported in SBT are shown in FIGS. 7A-7D. FIGS. 7A-7D illustrate the sub-block types (SVT-H, SVT-V), and the positions (left half, right half, top half, bottom half) supported in SBT respectively. The shaded region labeled by the letter "A" is a residual block with transform, and the other region is assumed to be a zero residual without transform.

Figure 8:
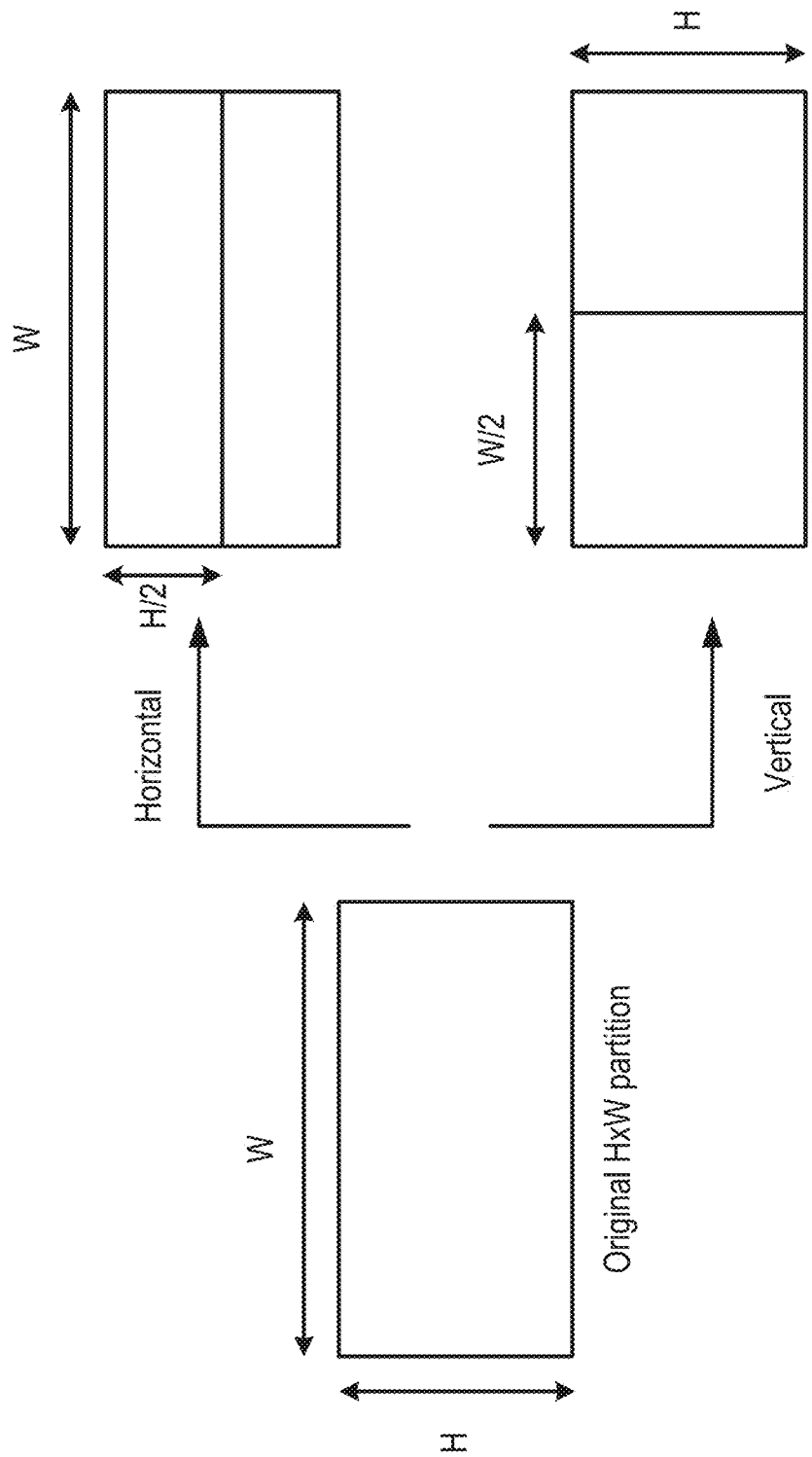
FIG. 8 shows a first exemplary division of a luma intra-predicted block based on Intra Sub-Partitions (ISP) coding mode.
Figure 9:
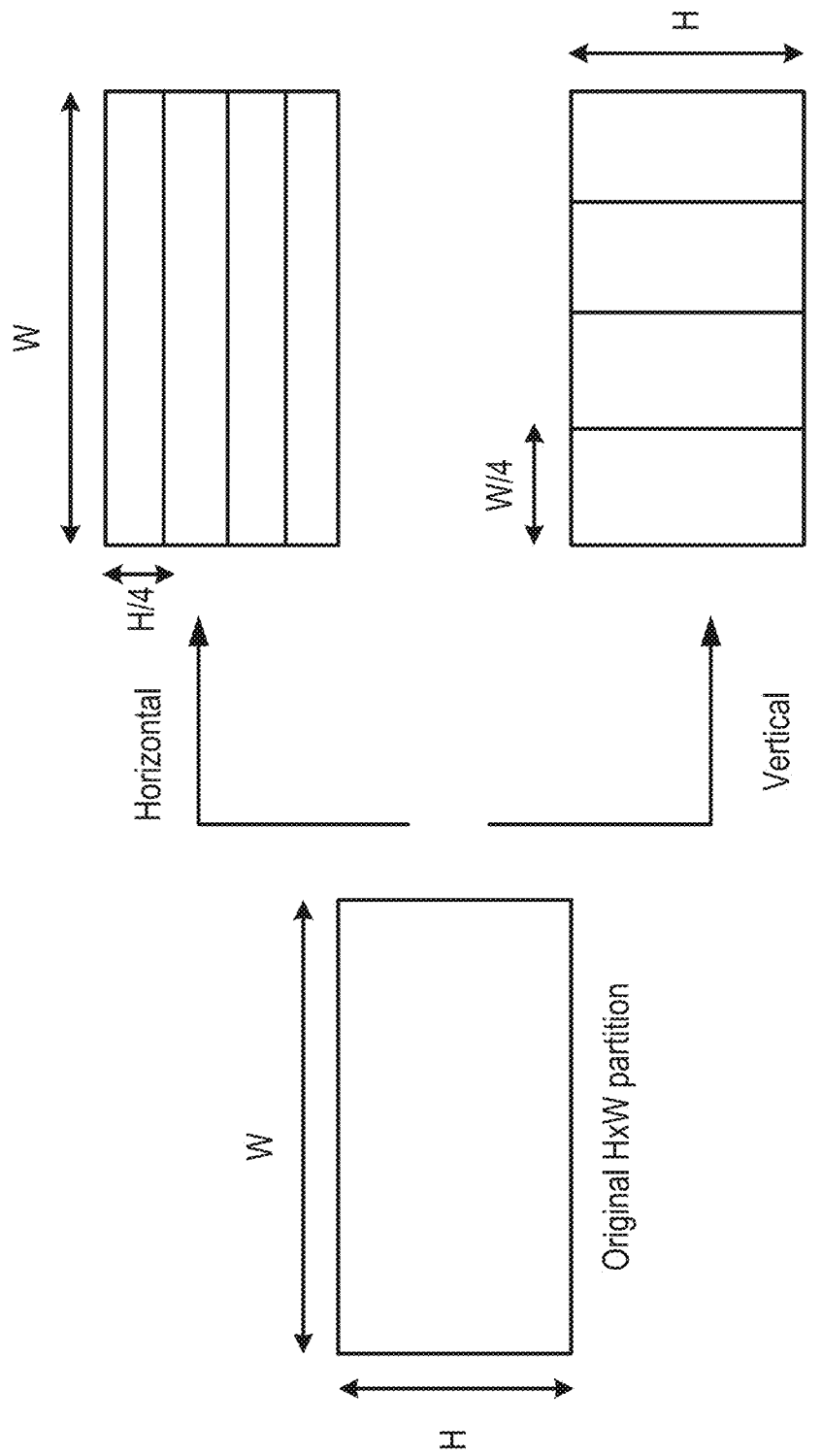
FIG. 9 shows a second exemplary division of a luma intra-predicted block based on ISP coding mode.

A second sub-block transform is Intra Sub-Partitions (ISP). The ISP coding mode divides luma intra-predicted blocks vertically or horizontally into 2 or 4 sub-partitions depending on the block size dimensions, as shown in Table 1. FIG. 8 and FIG. 9 show examples of the two possibilities. FIG. 8 illustrates an exemplary division of a 4×8 block or an 8×4 block. FIG. 9 illustrates an exemplary division of a block that is not one of a 4×8 block, an 8×4 block, or a 4×4 block. All sub-partitions can fulfill the condition of having at least 16 samples. For chroma components, ISP is not applied.

TABLE 1

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

In some embodiments, for each of these sub-partitions, a residual signal can be generated by entropy decoding the coefficients sent by the encoder and then inverse quantizing and inverse transforming the coefficients. Then, the sub-partition is intra predicted, and finally, the corresponding reconstructed samples are obtained by adding the residual signal to the prediction signal. Therefore, the reconstructed values of each sub-partition can be available to generate the prediction of the next one, which can repeat the process and so on. All sub-partitions can share the same intra mode.

In some embodiments, the ISP algorithm will only be tested with intra modes that are part of the MPM list. For this reason, if a block uses ISP, then the MPM flag can be inferred to be one. If ISP is used for a certain block, then the MPM list can be modified to exclude the DC mode and to prioritize horizontal intra modes for the ISP horizontal split and vertical intra modes for the vertical one.

In ISP, each sub-partition can be regarded as a sub-TU, since the transform and reconstruction is performed individually for each sub-partition.

Besides 4-point, 8-point, 16-point and 32-point DCT-2 transforms such as in HEVC, additional 2-point and 64-point DCT-2 can also be included as primary transforms, such as in VVC. The 64-point DCT-2 core defined in VVC can be shown below as a 64×64 matrix:

```
{
 { aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa }
 { bf, bg, bh, bi, bj, bk, bl, bm, bn, bo, bp, bq, br, bs, bt, bu, bv, bw, bx, by, bz, ca,
cb, cc, cd, ce, cf, cg, ch, ci, cj, ck, -ck, -cj, -ci, -ch, -cg, -cf, -ce, -cd, -cc, -ch, -ca, -bz, -by,
-bx, -bw, -bv, -bu, -bt, -bs, -br, -bq, -bp, -bo, -bn, -bm, -bl, -bk, -bj, -bi,
-bh, -bg, -bf }
 { ap, aq, ar, as, at, au, av, aw, ax, ay, az, ba, bb, bc, bd, be, -be, -bd, -bc, -bb, -ba, -az,
-ay, -ax, -aw, -av, -au, -at, -as, -ar,
-aq, -ap, -ap, -aq, -ar, -as, -at, -au, -av, -aw, -ax, -av, -az, -ba, -bb, -bc, -bd, -be, be, bd, bc, bb,
ba, az, ay, ax, aw, av, au, at, as, ar, aq, ap }
 { bg, bj, bm, bp, bs, bv, by, cb, ce, ch, ck, -ci, -cf, -cc, -bz, -bw, -bt, -bq, -bn, -bk, -bh, -bf,
-bi, -bl, -bo, -br, -bu, -bx, -ca, -cd,
-cg, -cj, cj, cg, cd, ca, bx, bu, br, bo, bl, bi, bf, bh, bk, bn, bq, bt, bw, bz, cc, cf, ci,
-ck, -ch, -ce, -cb, -by, -bv, -bs, -bp, -bm, -bj, -bg }
 { ah, ai, aj, ak, al, am, an, ao, -ao, -an, -am, -al, -ak, -aj, -ai, -ah, -ah, -ai, -aj, -ak, -al, -am,
-an, -ao, ao, an, am, al, ak, aj, ai, ah, ah, ai, aj, ak, al, am, an, ao, -ao, -an, -am, -al, -ak,
-aj, -ai, -ah, -ah, -ai, -aj, -ak, -al, -am, -an, -ao, ao, an, am, al, ak, aj, ai, ah }
 { bh, bm, br, bw, cb, cg, -ck, -cf, -ca, -bv, -bq, -bl, -bg, -bi, -bn, -bs, -bx, -cc, -ch, cj, ce, bz,
bu, bp, bk, bf, bj, bo, bt, by, cd, ci, -ci, -cd, -by, -bt, -bo, -bj, -bf, -bk, -bp, -bu, -bz, -ce, -cj,
ch, cc, bx, hs, bn, bi, bg, bl, bq, bv, ca, cf, ck, -cg, -cb, -bw,
-br, -bm, -bh }
 { aq, at, aw, az, bc, -be, -bb, -ay, -av, -as, -ap, -ar, -au, -ax, -ba, -bd, bd, ba, ax, au, ar, ap,
as, av, ay, bb, be, -bc, -az, -aw,
-at, -aq, -aq, -at, -aw, -az, -bc, be, bb, ay, av, as, ap, ar, au, ax, ba, bd, -bd, -ba, -ax, -au,
-ar, -ap, -as, -av, -ay, -bb, -be, bc, az, aw, at, aq }
 { bi, bp, bw, cd, ck, -ce, -bx, -bq, -bj, -bh, -bo, -bv, -cc, -cj, cf, by, br, bk, bg, bn, bu, cb,
ci, -cg, -bz, -bs, -bl, -bf, -bm, -bt, -ca, -ch, ch, ca, bt, bm, bf, bl, bs, bz, cg, -ci, -cb, -bu,
-bn, -bg, -bk, -br, -by, -cf, cj, cc, bv, bo, bh, bj, bq, bx, ce, -ck, -cd, -bw, -bp, -bi }
 { ad, ae, af, ag, -ag, -af, -ae, -ad, -ad, -ae, -af, -ag, ag, af, ae, ad, ad, ae, af, ag, -ag, -af,
-ae, -ad, -ad, -ae, -af, -ag, ag, af, ae, ad, ad, ae, af, ag, -ag, -af, -ae, -ad, -ad, -ae, -af, -ag, ag,
af, ae, ad, ad, ae, af, ag, -ag, -af, -ae, -ad, -ad, -ae, -af, -ag, ag, af, ae, ad }
 { bj, bs, cb, ck, -cc, -bt, -bk, -bi, -br, -ca, -cj, cd, bu, bl, bh, bq, bz, ci, -ce, -bv, -bm, -bg,
-bp, -by, -ch, cf, bw, bn, bf, bo, bx, cg, -cg, -bx, -bo, -bf, -bn, -bw, -cf, ch, by, bp, bg, bm,
bv, ce, -ci, -bz, -bq, -bh, -bl, -bu, -cd, cj, ca, br, bi, bk, bt, cc, -ck, -cb, -bs, -bj }
 { ar, aw, bb, -bd, -ay, -at, -ap, -au, -az, -be, ba, av, aq, as, ax, bc, -bc, -ax, -as, -aq, -av, -ba,
be, az, au, ap, at, ay, bd, -bb, -aw, -ar, -ar, -aw, -bb, bd, ay, at, ap, au, az, be, -ba, -av,
```

-continued

−aq, −as, −ax, −bc, bc, ax, as, aq, av, ca, −be, −az, −au, −ap, −at, −ay, −bd, bb, aw, ar }

{ bk, bv, cg, −ce, −bt, −bi, −bm, −bx, −ci, cc, br, bg, bo, bz, ck, −ca, −bp, −bf, −bq, −cb, cj, by, bn, bh, bs, cd, −ch, −bw, −bl, −bj, −bu, −cf, cf', bu, bj, bl, bw, ch, −cd, −bs, −bh, −bn, −by, −cj, cb, bq, bf, bp, ca, −ck, −bz, −bo, −bg, −br, −cc, ci, bx, bm, bi, bt, ce, −cg, −bv, −bk }

{ ai, al, ao, −am, −aj, −ah, −ak, −an, an, ak, ah, aj, am, −ao, −al, −ai, −ai, −aj, −ao, am, aj, ah, ak, an, −an, −ak, −ah, −aj, −am, ao, al, ai, ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai }

{ bl, by, −ck, −bx, −bk, −bm, −bz, cj, bw, bj, bn, ca, −ci, −bv, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, bv, ci, −ca, −bn, −bj, −bw, −cj, bz, bm, bk, bx, ck, −by, −bl }

{ as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as }

{ bm, cb, −cf, −bq, −bi, −bx, cj, bu, bf, bt, ci, −by, −bj, −bp, −ce, cc, bn, bl, ca, −cg, −br, −bh, −bw, ck, bv, bg, bs, ch, −bz, −bk, −bo, −cd, cd, bo, bk, bz, −ch, −bs, −bg, −bv, −ck, bw, bh, br, cg, −ca, −bl, −bn, −cc, ce, bp, bj, by, −ci, −bt, −bf, −bu, −cj, bx, bi, bq, cf, −cb, −bm }

{ ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab }

{ bn, cc, −ca, −bj, −br, −ci, bw, bf, by, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −bv, −bf, −bw, ci, br, bj, ca, −ce, −bn }

{ at, bc, −ay, −ap, −ax, bd, au, as, bb, −az, −aq, −aw, be, av, ar, ba, −ba, −ar, −av, −be, aw, aq, az, −bb, −as, −au, −bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, be, at }

{ bo, ch, −bv, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, bv, −ch, −bo }

{ aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj }

{ bp, ck, −bq, −ho, −cj, br, bn, ci, −bs, −bm, −ch, bt, bl, cg, −bu, −bk, −cf, bv, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −bv, cf, bk, bu, −cg, −bl, −bt, ch, bm, bs, −ci, −bn, −br, cj, bo, bq, −ck, −bp }

{ au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au }

{ bq, −ci, −bl, −bv, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bm, −bu, −cj, bp, br, −ch, −bk, −bw, cc, bf, ch, −bx, −bj, −cg, bs, bo, −ck, −bn, −bt, cf, bi, by, −ca, −bg, −cd, bv, bl, ci, −bq }

{ ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae }

{ br, −cf, −bg, −cc, bu, bo, −ci, −bj, −bz, bx, bl, ck, −bm, −bw, ca, bi, ch, −bp, −bt, cd, bf, ce, −bs, −bq, cg, bh, ch, −bv, −bn, cj, bk, by, −by, −bk, −cj, bn, bv, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br }

{ av, −bb, −ap, −bc, au, aw, −ba, −aq, −bd, at, ax, −az, −ar, −be, as, ay, −ay, −as, be, ar, az, −ax, −at, bd, aq, ha, −aw, −au, bc, ap, bb, −av, −av, bb, ap, bc, −au, −aw, ba, aq, bd, −at, −ax, az, ar, be, −as, −ay, ay, as, −be, −ar, −az, ax, at, −bd, −aq, −ba, aw, au, −bc, −ap, −bb, av }

{ bs, −cc, −bi, −cj, bl, bz, −bv, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf, −cf, bp, bv, −bz, −bl, cj, bi, cc, −bs }

{ ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak }

{ bt, −bz, −bn, cf, bh, ck, −bi, −ce, bo, by, −bu, −bs, ca, bm, −cg, −bg, −cj, bj, cd, −bp, −bx, by, br, −cb, −bl, ch, bf, ci, −bk, −cc, bq, bw, −bw, −bq, cc, bk, −ci, −bf, −ch, bl, cb, −br, −by, bx, bp, −cd, −bj, cj, bg, cg, −bm, −ca, bs, bu, −by, −bo, ce, bi, −ck, −bh, −cf, bn, bz, −bt }

{ aw, −ay, −au, ba, as, −bc, −aq, be, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, bc, aq, −be, −ap, −bd, ar, bb, −at, −az, av, ax, −ax, −av, az, at, −bb, −ar, bd, ap, be, −aq, −bc, as, ba −au, −ay, aw }

{ bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −bv, bv, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu } aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa. −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa }

{ bv, −bt, −bx, br, bz, −bp, −cb, bn, cd, −bl, −cf, bj, ch, −bh, −cj, bf, −ck, −bg, ci, bi, −ce, −bk, ce, bm, −cc, −bo, ca, bq, −by, −bs, bw, bu, −bw, bs, by, −bq, −ca, bo, cc, −bm, −ce, bk, cg, −bi, −ci, bg, ck, −bf, cj, bh, −ch, −bj, cf, bl, −cd, −bn, cb, bp, −bz, −br, bx, bt, −bv }

{ ax, −av, −az, at, bb, −ar, −bd, ap, −be, −aq, bc, as, −ba, −au, ay, aw, −aw, −ay, au, ba, −as, −bc, aq, bc, −ap, bd, ar, −bb, −at, az, av, −ax, −ax, av, az, −at, −bb, ar, bd, −ap, be, aq, −bc, −as, ba, au, −ay, −aw, aw, ay, −au, −ba, as, bc, −aq, −be, ap, −bd, −ar, bb, at, −az, −ay, ax }

{ bw, −bq, −cc, bk, ci, −bf, ch, bt, −cb, −br, bv, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −bv, br, cb, −bl, −ch, bf, −ci, −bk, cc, bq, −bw }

{ al, −aj, −an, ah, −ao, −ai, am, ak, −ak, −am, ai, ao, −ah, an, aj, −at, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al }

{ bx, −bn, −ch, bg, −ce, −bq, bu, ca, −bk, −ck, bj, −cb, −bt, br, cd, −bh, ci, bm, −by, −bw, bo, cg, −bf, cf, bp, −bv, −bz, bl, cj, −bi, cc, bs, −bs, −cc, bi, −cj, −bl, bz, bv, −bp, −cf, bf, −cg, −bo, bw, by, −bm, −ci, bh, −cd, −br, bt, cb, −bj, ck, bk, −ca, −bu, bq, cc, −bg, ch, bn, −bx }

{ ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay }

−{ by, −bk, cj, bn, −bv, −cb, bh, −cg, −bq, bs, cc, −bf, cd, bt, −bp, −ch, bi, −ca, −bw, bm, ck, −bl, bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, bv, −bn, −cj, bk, −by }

{ af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af }

{ bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, bv, −bl, ci, bq, −bq, −ci, bl, −bv, −cd, bg, −ca, −by, bi, −cf, −bt, bn, −ck, −bo, bs, cg, −bj, bx, cb, −bf, cc, bw, −bk, ch, hr, −bp, −cj, bm, −bu, −ce, bh, −hz }

{ az, −ap, ba, ay, −aq, bb, ax, −ar, bc, aw, −as, bd, av, −at, be, au, −au, −be, at, −ay, −bd, as, −aw, −bc, ar, −ax, −bb, aq, −ay, −ba, ap, −az, −az, ap, −ba, −ay, aq, −bb, −ax, ar, −bc, −aw, as, −bd, −ay, at, −be, −au, au, be, −at, av, bd, −as, aw, bc, −ar, ax, bb, −aq, ay, ba, −ap, az }

{ ca, −bf, bz, cb, −bg, by, cc, −bh, bx, cd, −bi, bw, ce, −bj, bv, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −bv, bj, −ce, −bw, bi, −cd, −bx, bh, −cc, −by, bg, −cb, −bz, bf, −ca }

{ am, −ah, al, am, −ai, ak, ao, −aj, aj, −ao, −ak, ai, −an, −al, −am, ah, −al, −an, ai, −ak, −ao, aj, −aj, ao, ak, −ai, an, al, −ah, am, am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am }

{ cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −bv, −ch, bo, −bo, ch, bv, −bh, ca, cc, −bj, bt, cj, −bq, bm, −cf −bx, bf, −by, −ce, bl, −br, ck, bs, −bk, cd, bz, −bg, bw, cg, −bn, bp, −ci, −bu, bi, −cb }

{ ba, −ar, av, −be, −aw, aq, −az, −bb, as, −au, bd, ax, −ap, ay, bc, −at, at, −bc, −ay, ap, −ax, −bd, au, −as, bb, az, −ay, aw, be, −av, ar, −ba, −ba, ar, −av, be, aw, −ay, az, bb, −as, au, −bd, −ax, ap, −ay, −bc, at, −at, bc, ay, −ap, ax, bd, −au, as, −bb, −az, aq, −aw, −be, av, −ar, ba }

{ cc, −bl, bp, −cg, −by, bh, −bt, ck, bu, −bg, bx, ch, −bq, bk, −cb, −cd, bm, −bo, cf, bz, −bi, bs, −cj, −bv, bf, −bw, −ci, br, −bj, ca, ce, −bn, bn, −ce, −ca, bj, −br, ci, bw, −bf, bv, cj, −bs, bi, −bz, −cf, bo, −bm, cd, ch, −bk, bq, −ch, −bx, bg, −hu, −ck, bt, −bh, by, cg, −bp, bl, −cc }

{ ac, −ab, ab, −ac, −ac, ab, −ab, ac, ac, −ab, ac, ac, −ab, ab, −ac, −ac, ab, −ab, ac, ac, −ab, ab, −ac, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac }

{ cd, −bo, bk, −bz, −ch, bs, −bg, bv, −ck, −bw, bh, −br, cg, ca, −bl, bn, −cc, −ce, bp, −bj, by, ci, −bt, bf, −bu, cj, bx, −bi, bq, −cf, −cb, bm, −bm, ch, cf, −bq, bi, −bx, −cj, bu, −bf, bt, −ci, −by, bj, −bp, ce, cc, −bn, bl, −ca, −cg, br, −bh, bw, ck, −bv, bg, −bs, ch, bz, −bk, bo, −cd }

{ bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −bc, −ba, at, −ar, ay, be, −ax, aq, −au, bb }

{ ce, −br, bf, −bs, cf, cd, −bq, bg, −bt, cg, cc, −bp, bh, −bu, ch, cb, −bo, bi, −bv, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, bv, −bi, bo, −cb, −ch, bu, −bh, bp, −cc, −cg, bt, −bg, bq, −cd, −cf, bs, −bf, br, −ce } an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an }

{ cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −bv, bk, −bk, bv, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf }

{ bc, −ax, as, −aq, av, −ba, −be, az, −au, ap, −at, ay, −bd, −bb, aw, −ar, ar, −aw, bb, bd, −ay, at, −ap, an, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, bc }

{ cg, −bx, bo, −bf, bn, −bw, cf, ch, −by, bp, −bg, bm, −bv, ce, ci, −hz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, bv, −bm, bg, −bp, by, −ch, −cf, bw, −bn, bf, −bo, bx, −cg }

{ ag, −af, ae, −ad, ad, −ae, af, −ag, −ag, af, −ae, ad, −ad, ae, −af, ag, ag, −af, ae, −ad, ad, −ae, af, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, af, −ae, ad, −ad, ae, −af, ag }

{ ch, −ca, bt, −bm, bf, −bl, bs, −bz, cg, ci, −cb, bu, −bn, bg, −bk, br, −by, cf, cj, −cc, bv, −bo, bh, −bj, bq, −bx, ce, ck, −cd, bw, −bp, bi, −bi, bp, −bw, cd, −ck, −cc, bx, −bq, bj, −bh, bo, −bv, cc, −cj, −cf, by, −br, bk, −bg, bn, −bu, cb, −ci, −cg, bz, −bs, bl, −bf, bm, −bt, ca, −ch }

{ bd, −ba, ax, −au, ar, −ap, as, −av, ay, −bb, be, bc, −az, aw, −at, aq, at, −aw, az, −bc, −be, bb, −ay, av, −as, ap, −ar, au, −ax, ha, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd }

{ ci, −cd, by, −bt, bo, −bj, bf, −bk, bp, −bu, bz, −ce, cj, ch, −cc, bx, −bs, bn, −bi, bg, −bl, bq, −bv, ca, −cf, ck, cg, −cb, bw, −br, bm, −bh, bh, −bm, br, −bw, cb, −cg, −ck, cf, −ca, bv, −bq, bl, −bg, bi, −bn, bs, −bx, cc, −ch, −cj, ce, −bz, bu, −bp, bk, −bf, bj, −bo, bt, −by, cd, −ci }

{ ao, −an, am, −al, ak, −aj, ai, −ah, ah, −ai, aj, −ak, al, −am, an, −ao, −ao, an, −am, al, −ak, aj, −ai, ah, ah, −ai, aj, −ak, al, −am, an, −ao, −ao, an, −am, al, −ak, aj, −ai, ah, ah, −ai, aj, −ak, al, −am, an, −ao, −ao, an, −am, al, −ak, aj, −ai, ah, −ah, ai, −aj, ak, −al, am, −an, ao }

{ cj, −cg, cd, −ca, bx, −bu, br, −bo, bl, −bi, bf, −bh, bk, −bn, bq, −bt, bw, −bz, cc, −cf, ci, ck, −ch, ce, −cb, by, −bv, bs, −bp, bm, −bj, bg, −bg, bj, −bm, bp, −bs, bv, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj }

{ be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, am, −ax, ay, −az, ba, −bb, bc, −bd, be }

{ ck, −cj, ci, −ch, cg, −cf, ce, −cd, cc, −cb, ca, −bz, by, −bx, bw, −bv, bu, −bt, bs, −br, bq, −bp,

-continued

```
    bo, −bn, bm, −bl, bk, −bj, bi, −bh, bg, −bf, bf, −bg, bh, −bi, bj, −bk, bl, −bm, bn, −bo, bp, −bq,
    br, −bs, bt, −bu, bv, −bw, bx, −by, bz, −ca, cb, −cc, cd, −ce, cf, −cg, ch, −ci, cj, −ck }
}
``` where
{aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck}={64, 83, 36, 89, 75, 50, 18, 90, 87, 80, 70, 57, 43, 25, 9, 90, 90, 88, 85, 82, 78, 73, 67, 61, 54, 46, 38, 31, 22, 13, 4, 91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}

In addition to DCT-2 and 4×4 DST-7 which have been employed in HEVC, an Adaptive Multiple Transform (AMT, or also known as Enhanced Multiple Transform (EMT) or Multiple Transform Selection (MTS)) scheme has been used in VVC for residual coding for both inter and intra coded blocks. The MTS uses multiple selected transforms from the DCT/DST families other than the current transforms in HEVC. The newly introduced transform matrices are DST-7, DCT-8. Table 2 shows the basis functions of the selected DST/DCT.

TABLE 2

Transform basis functions of DCT-2, DST-7 and DCT-8 for N-point input

| Transform Type | Basis function $T_i(j)$, $i, j = 0, 1, \ldots, N-1$ |
| --- | --- |
| DCT-2 | $T_i(j) = \omega_0 \cdot \sqrt{\dfrac{2}{N}} \cdot \cos\left(\dfrac{\pi \cdot i \cdot (2j+1)}{2N}\right)$ <br> where $\omega_0 = \begin{cases} \sqrt{\dfrac{2}{N}} & i = 0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

All the primary transform matrices, such as in VVC, may be used with 8-bit representation. The AMT applies to the CUs with both width and height smaller than or equal to 32, and whether applying AMT or not is controlled by a flag called mts_flag. When the mts_flag is equal to 0, only DCT-2 may be applied for coding the residue. When the mts_flag is equal to 1, an index mts_idx is further signalled using 2 bins to specify the horizontal and vertical transform to be used according to Table 3, where value 1 means using DST-7 and value 2 means using DCT-8.

TABLE 3

Specification of trTypeHor and trTypeVer depending on mts_idx[ x ][ y ][ cIdx ]

| mts_idx[ xTbY ][ yTbY ][ cIdx ] | trTypeHor | trTypeVer |
| --- | --- | --- |
| −1 | 0 | 0 |
| 0 | 1 | 1 |
| 1 | 2 | 1 |
| 2 | 1 | 2 |
| 3 | 2 | 2 |

An implicit MTS, such as in VVC Draft 4, may also be applied in case that the above signaling based MTS (i.e., explicit MTS) is not used. With implicit MTS, the transform selection is made according to the block width and height instead of signaling. More specifically, with implicit MTS for example as proposed in JVET-M0303, DST-7 is selected for the shorter side of the block and DCT-2 is selected for the longer side of the block. The transform core, which is a matrix composed by the basis vectors, of DST-7 can be represented below:

```
4-point DST-7:
    { a, b, c, d }
    { c, c, 0, −c }
    { d, −a, −c, b }
    { b, −d, c, −a }
    where {a, b, c, d} = { 29, 55, 74, 84}.
8-point DST-7:
    { a, b, c, d, e, f, g, h,}
    { c, f, h, e, b, −a, −d, −g,}
    { e, g, b, −c, −h, −d, a, f,}
    { g, c, −d, −f, a, h, b, −e,}
    { h, −a, −g, b, f, −c, −e, d,}
    { f, −e, −a, g, −d, −b, h, −c,}
    { d, −h, e, −a, −c, g, −f, b,}
    { b, −d, f, −h, g, −e, c, −a,}
    where {a, b, c, d, e, f, g, h} = {17, 32, 46, 60, 71, 78, 85, 86}.
16-point DST-7:
    { a, b, c, d, e, f, g, h, i, j, k, l, m, n, o, p,}
    { c, f, i, l, o, o, l, i, f, c, 0, −c, −f, −i, −l, −o,}
    { e, j, o, m, h, c, −b, −g, −l, −p, −k, −f, −a, d, i, n,}
    { g, n, l, e, −b, −i, −p, −j, −c, d, k, o, h, a, −f, −m,}
```

-continued

{ i, o, f, -c, -l, -l, -c, f, o, i, 0, -i, -o, -f, c, l,}
{ k, k, 0, -k, -k, 0, k, k, 0, -k, -k, 0, k, k, 0, -k,}
{ m, g, -f, -n, -a, l, h, -e, -o, -b, k, i, -d, -p, -c, j,}
{ o, c, -l, -f, i, l, -f, -l, c, o, 0, -o, -c, l, f, -i,}
{ p, -a, -o, b, n, -c, -m, d, l, -e, -k, f, j, -g, -i, h,}
{ n, -e, -i, j, d, -o, a, m, -f, -h, k, c, -p, b, l, -g,}
{ l, -i, -c, o, -f, -f, o, -c, -i, l, o, -l, i, c, -0, f,}
{ j, -m, c, g, -p, f, d, -n, i, a, -k, l, -b, -h, o, -e,}
{ h, -p, i, -a, -g, o, -j, b, f, -n, k, -c, -e, in, -l, d,}
{ f, -l, o, -i, c, c, -i, o, -i, f, 0, -f, l, -o, i, -c,}
{ d, -h, l, -p, m, -i, e, -a, -c, g, -k, o, -n, j, -f, b,}
{ b, -d, f, -h, j, -l, n, -p, o, -m, k, -i, g, -e, c, -a,}
where {a, b, c, d, e, f, g, h, i, j, k, l, m, n, o, p} = { 9, 17, 25, 33, 41, 49, 56, 62, 66, 72, 77, 81, 83, 87, 89, 90}.

32-point DST-7:
{ a, b, c, d, e, f, g, h, i, j, k, l, m, n, o, p, q, r, s, t, u, v, w, x, y, z, A, B, C, D, E, F,}
{ c, f, i, l, o, r, u, x, A, D, F, C, z, w, t, q, n, k, h, e, b, -a, -d, -g, -j, -m, -p, -s, -v, -y, -B, -E,}
{ e, j, o, t, y, D, D, y, t, o, j, e, 0, -e, -j, -o, -t, -y, -D, -D, -y, -t, -o, -j, -e, 0, c, j, o, t, y, D,}
{ g, n, u, B, D, w, p, i, b, -e, -l, -s, -z, -F, -y, -r, -k, -d, c, j, q, x, E, A, t, m, f, -a, -h, -o, -v, -C,}
{ i, r, A, C, t, k, b, -g, -p, -y, -E, -v, -m, -d, e, n, w, F, x, o, f, -c, -l, -u, -D, -z, -q, -h, a, j, s, B,}
{ k, v, F, u, j, -a, -l, -w, -E, -t, -i, b, m, x, D, s, h, -c, -n, -y, -C, -r, -g, d, o, z, B, q, f, -e, -p, -A,}
{ m, z, z, m, 0, -m, -z, -z, -m, 0, m, z, z, m, 0, -m, -z, -z, -m, 0, m, z, z, m, 0, -m, -z, -z, -m, 0, m, z,}
{ o, D, t, e, -j, -y, -y, -j, e, t, D, 0, 0, -o, -D, t, -e, j, y, y, j, -e, -t, -D, -o, 0, 0, D, t, e, -j, -y,}
{ q, E, n, -c, -t, -B, -k, f, w, y, h, -i, -z, -v, -e, l, C, s, b, -o, -F, -p, a, r, D, m, -d, -u, -A, -j, g, x,}
{ s, A, h, -k, -D, -p, c, v, x, e, -n, -F, -m, f, y, u, b, -q, -C, -j, i, B, r, -a, -t, -z, -g, l, E, o, -d, -w,}
{ u, w, b, -s, -y, -d, q, A, F, -o, -C, -h, m, E, j, -k, -F, -l, i, D, n, -g, -B, -p, e, z, r, -c, -x, -t, a, v,}
{ w, s, -d, -A, -o, h, E, k, -l, -D, -g, p, z, c, -t, -v, a, x, r, -e, -B, -n, i, F, j, -m, -C, -f, q, y, b, -u,}
{ y, o, -j, -D, -e, t, t, -e, -D, -j, o, y, 0, -y, -o, j, D, e, -t, -t, e, D, j, -o, -y, 0, y, o, -j, -D, -e,t,}
{ A, k, -p, -v, e, E, f, -u, -q, j, B, a, -z, -l, o, w, -d, -E, -g, t, r, -i, -C, -b, y, m, -n, -x, c, D, h, -s,}
{ C, g, -v, -a, o, u, -h, -B, a, D, f, -w, -m, p, t, -i, -A, B, r, -a, -t, -z, -g, l, E, o, -d, -w,}
{ E, c, -B, -f, y, i, -v, -l, s, o, -p, -r, m, u, -j, -x, g, A, -d, -D, a, F, b, -C, -e, z, h, -w, -k, l, n, -q,}
{ F, -a, -E, b, D, -c, -C, d, B, -e, -A, f, Z, -g, -y, h, x, -i, -w, j, v, -k, -u, l, t, -m, -s, n, r, -o, -q, p,}
{ D, -e, -y, j, t, -o, -o, t, j, -y, -e, D, 0, -D, e, y, -j, -t, o, o, -t, -j, y, e, -D, 0, D, -e, -y, j, t, -o,}
{ B, -i, -s, r, j, -A, -a, C, -h, -t, q, k, -z, -b, D, -g, -u, p, l, -y, -c, E, -f, -v, o, m, -x, -d, E, -e, -w, n,}
{ z, -m, -m, z, 0, -z, m, m, -z, 0, z, -m, -m, z, 0, -z, m, m, -z, 0, z, -m, -m, z, 0, -z, m, m, -z, 0, z, -m,}
{ x, -q, -g, E, -j, -n, A, -c, -u, t, d, -B, m, k, -D, f, r, -w, -a, y, -p, -h, F, -i, -o, z, -b, -v, s, e, -C, l,}
{ v, -u, -a, w, -t, -b, x, -s, -c, y, -r, -d, z, -q, -e, A, -p, -f, B, -o, -g, C, -n, -h, D, -m, -i, E, -l, -j, F, -k,}
{ t, -y, e, o, -D, j, j, -D, o, e, -y, t, 0, -t, y, -e, -o, D, -j, -j, D, -o, -e, y, -t, 0, t, -y, e, o, -D, j,}
{ r, -C, k, g, -y, v, -d, -n, F, -o, -c, u, -z, h, j, -B, s, -a, -q, D, -l, -f, x, -w, e, m, -E, p, b, -t, A, -i,}
{ p, -F, q, -a, -o, E, -r, b, n, -D, s, -c, -m, C, -t, d, l, -B, u, -e, -k, A, -v, f, j, -z, w, -g, -i, y, -x, h,}
{ n, -B, w, -l, -e, s, -F, r, -d, -j, x, -A, m, a, -o, C, -v, h, f, t, E, -q, c, k, -y, z, -l, -b, p, -D, u, -g,}
{ l, -x, C, -q, c, g, -s, E, -v, j, b, -n, z, -A, o, -c, -i, u, -F, t, -h, -d, p, -B, y, -m, a, k, -w, D, -r, f,}
{ j, -t, D, -y, o, -e, -e, o, -y, D, -t, j, 0, -j, t, -D, y, -o, e, e, -o, y, -D, t, -j, 0, j, -t, D, -y, o, -e,}
{ h, -p. x, -F, y, -q, i, -a, -g, o, -w, E, -z, r, -j, b, f, -n, v, -D, A, -s, k, -c, -e, m, -u, C, -B, t, -l, d,}
{ f, -l, r, -x, D, -C, w, -q, k, -e, -a, g, -m, s, -y, E, -B, v, -p, j, -d, -b, h, -n, t, -z, F, -A, U, -o, i, -c,}
{ d, -h, l, -p, t, -x, B, -F, C. -y, u, -q, m, -i, e, -a, -c, g, -k, o, -s, w, -A, E, -D, z, -v, r, -n, j, -f, b,}
{ b, -d, f, -h, j, -l, n, -p, r, -t, v, -x, z, -B, D, -F, E, -C, A, -y, w, -u, s, -q, o, -m, k, -i, g, -e, c, -a,}
where {a, b, c, d, e, f, g, h, i, j, k, l, m, n, o, p, q, r, s, t, u, v, w, x, y, z, A, B, C, D, E, F } = { 4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90 }.

4-point DCT-8:
{ a, b, c, d,}
{ b, 0, -b, -b,}
{ c, -b, -d, a,}
{ d, -b, a, -c,}
where {a, b, c, d} = { 84, 74, 55, 29}.

8-point DCT-8:
{ a, b, c, d, e, f, g, h,}
{ b, e, h, -g, -d, -a, -c, -f,}
{ c, h, -e, -a, -f, g, b, d}
{ d, -g, -a, -h, c, e, -f, -b,}
{ e, -d, -f, c, g, -b, -h, a,}
{ f, -a, g, e, -b, h, d, -c,}
{ g, -c, b, -f, -h, d, -a, e,}
{ h, -f, d, -b, a, -c, e, -g,}
where {a, b, c, d, e, f, g, h} = { 86, 85, 78, 71, 60, 46, 32, 17}.

16-point DCT-8:
{ a, b, c, d, e, f, g, h, i, j, k, l, m, n, o, p,}
{ b, e, h, k, n, 0, -n, -k, -h, -e, -b, -b, -e, -h, -k, -n,}
{ c, h, m, -p, -k, -f, -a, -e, -j, -o, n, i, d, b, g, l,}
{ d, k, -p, -i, -b, -f, -m, a, g, a, h, o, -l, -e, -c, -j,}
{ e, n, -k, -b, -h, 0, h, b, k, -n, -e, -e, -n, k, b, h,}
{ f, 0, -f, -f, 0, f, f, 0, -f, -f, 0, f, f, 0, -f, -f,}
{ g, -a, -a, -m, h, f, -o, -b, -l, i, e, -p, -c, -k, j, d,}
{ h, -k, -e, n, b, 0, -b, -n, e, k, -h, -h, k, e, -n, -b,}
{ i, -h, -j, g, k, -f, -l, e, m, -d, -n, c, o, -b, -p, a,}
{ j, -e, -o, a, -n, -f, i, k, -d, -p, b, -m, -g, h, l, -c,}
{ k, -b, n, h, -e, 0, e, -h, -n, b, -k, -k, b, -n, -h, e,}
{ l, -b, i, o, -e, f, -p, -h, c, -m, -k, a, -j, -a, d, -g,}

{ m, -e, d, -l, -n, f, -c, k, o, -g, b, -j, -p, h, -a, i,}
{ n, -h, b, -e, k, 0, -k, e, -b, h, -n, -n, h, -b, e, -k,}
{ o, -k, g, -c, b, -f, j, -n, -p, l, -h, d, -a, e, -i, m,}
{ p, -n, l, -j, h, -f, d, -b, a, -c, e, -g, i, -k, m, -o,}
where {a, b, c, d, e, f, g, h, i, j, k, l, m, n, o, p} = {90, 89, 87, 83, 81, 77, 72, 66, 62, 56, 49, 41, 33, 25, 17, 9}.
32-point DCT-8:
{ a, b, c, d, e, f, g, h, i, j, k, l, m, n, o, p, q, r, s, t, u, v, w, x, y, z, A, B, C, D, E, F,}
{ b, e, h, k, n, q, t, w, z, C, F, -E, -B, -y, -v, -s, -p, -m, -j, -g, -d, -a, -c, -f, -i, -l, -o, -r, -u, -x, -A, -D,}
{ c, h, m, r, w, B, 0, -B, -w, -r, -m, h, -c, -c, -h, -m, -r, -w, -B, 0, B, w, r, m, h, c, c, h, m, r, w, B,}
{ d, k, r, y, F, -A, -t, -m, -f, -b, -i, -p, -w, -D, C, v, o, h, a, g, n, u, B -E, -x, -q, -j, -c, -e, -l, -s, -z,}
{ e, n, w, F, -y, -p, -g, -c, -l, -u, -D, A, r, i, a, j, s, B, -C, -t, -k, -b, -h, -q, -z, E, v, m, d, f, o, x,}
{ f, q, B, -A, -p, -e, -g, -r, -C, o, d, h, s, -y, -n, -c, -i, -t, -E, x, m, b, j, u, F, -w, -l, -a, -k, -v,}
{ g, t, 0, -t, -g, -g, -t, 0, t, g, g, t, 0, -t, -g, -g, -t, 0, t, g, g, t, 0, -t, -g, -g, -t, 0, t, g, g, t,}
{ h, w, -B, -m, -c, -r, 0 r, c, m, B, -w, -h, -h, -w, B, m, c, r, 0, -r, -c, -m, -B, w, h, h, w, -B, -m, -c, -r,}
{ i, z, -w, -f, -l, -C, t, c, o, F, -q, -a, -r, E, n, d, u, -B, -k, -g, -x, y, h, j, A, -v, -e, -m, -D, s, b, p,}
{ j, C, -r, -b, -u, z, g, m, F, -o, -e, -x, w, d, p, -E, -l, -h, -A, t, a, s, -B, -i, -k, -D, q, c, v, -y, -f, -n,}
{ k, F, -m, -i, -D, o, g, B, -q, -e, -z, s, c, x, -u, -a, -v, w, b, t, -y, -d, -r, A, f, p, -C, -h, -n, E, j, l,}
{ l, -E, -h, -p, A, d, t, -w, -a, -x, s, e, B, -o, -i, -F, k, m, -D, -g, -q, z, c, u, -v, -b, -y, r, f, C, -n, -j,}
{ m, -B, -c, -w, r, h, 0, -h, -r, w, c, B, -m, -m, B, c, w, -r, -h, 0, h, r, -w, -c, -B, m, m, -B, -c, -w, r, h,}
{ n, -y, -c, -D, i, s, -t, -h, E, d, x, -o, -m, z, b, C, -j, -r, u, g, -F, -e, -w, p, l, -A, -a, -B, k, q, -v, -f,}
{ o, -v, -h, C, a, D, -g, -w, n, p, -u, -i, B, b, E, -f, -x, m, q, -t, -j, A, c, F, -e, -y, l, r, -s, -k, z, d,}
{ p, -s, -m, v, j, -y, -g, B, d, -E, -a, -F, c, C, -f, -z, l, w, -l, -t, o, q, -r, -n, u, k, -x, -h, A, e, -D, -b,}
{ q, -p, -r, o, s, -n, -t, m, u, -l, -v, k, w, -j, -x, i, y, -h, -z, g, A, -f, -B, e, C, -d, -D, c, E, -b, -F, a,}
{ r, -m, -w, h, B, -c, 0, c, -B, -h, w, m, -r, -r, m, w, -h, -B, c, 0, -c, B, h, -w, -m, r, r, -m, -w, h, B, -c,}
{ s, -j, -B, a, -C, -i, t, r, -k, -A, b, -D, -h, u, q, -l, -z, c, -E, -g, v, p, -m, -y, d, -F, -f, w, o, -n, -x, e,}
{ t, -g, 0, g, -t, -t, g, 0, -g, t, t, -g, 0, g, -t, -t, g, 0, -g, t, t, -g, 0, g, -t, -t, g, 0, -g, t, t, -g,}
{ u, -d, B, n, -k, -E, g, -r, -x, a, -y, -q, h, -F, -j, o, A, -c, v, t, -e, C, m, -l -D, f, -s, -w, b, -z, -p, i,}
{ v, -a, w, u, -b, x, t, -c, y, s, -d, z, r, -e, A, q, -f, B, p, -g, C, o, -h, D, n, -i, E, m, -j, F, l, -k,}
{ w, -c, r, B, -h, m, 0, -m , h, -B, -r, c, -w, -w, c, -r, -B, h, -m, 0, -h, B, r, -c, w, w, -c, r, B, -h, m,}
{ x, -f, m, -E, -q, b, -t, -B, j, -i, A, u, -c, p, F, -n, e, -w, -y, g, -l, D, r, -a, s, C, k, h, -z, -v, d, -o,}
{ y, -i, h, -x, -z, j, -g, A, -k, f, -v, -B, l, -e, u, C, -m, d, -t, -D, n, -c, s, E, -o, b, -r, -F, p, -a, q,}
{ z, -l, c, -q, E, u, -g, l, -v, -D, p, -b, m, -A, -y, -k, -d, r, -F, -t, f, -i, w, C, -o, a, -n, B, x, -j, e, -s,}
{ A, -o, c, -j, v, F, -t, h, -e, q, -C, -y, m, -a, l, -x, r, -f, g, -s, E, w, -k, b, -n, z, B, -p, d, -i, u,}
{ B, -r, h, -c, m, -w, 0, w, -m, c, -h, r, -B, -B, r, -h, c, -m, w, 0, -w, m, -c, h, -r, B, , -r, h, -c, m, -w,}
{ C, -u, m, -e, d, -l, t, -B, -D, v, -n, f, -c, k, -s, A, E, -w, o, -g, b, -j, r, -z, -F, x, -p, h, -a, i, -q, y,}
{ D, -x, r, -l, f, -a, g, -m, s, -y, E, C, -w, q, -k, e, -b, -n, t, -z, F, B, -v, p, -j, d, -c, i, -o, u, -A,}
{ E, -A, w, -s, o, -k, g, -c, b, -f, j, -n, r, -v, z, -D, -F, B, -x, t, -p, l, -h, d, -a, e, -i, m, -q, u, -y, C,}
{ F, -D, B, -z, x, -v, t, -r, p, -n, l, -j, h, -f, d, -b, a, -c, e, -g, i, -k, m, -o, q, -s, u, -w, y, -A, C, -E,}
where {a, b, c, d, e, f, g, h, i, j, k, l, m, n, o, p, q, r, s, t, u, v, w, x, y, z, A, B, C, D, E, F } = {90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4}.

In some examples, such as in VVC, when both the height and width of the coding block is smaller than or equal to 64, the transform size can always the same as the coding block size. When either the height or width of the coding block is larger than 64, when performing the transform or intra prediction, the coding block can be further split into multiple sub-blocks, where the width and height of each sub-block is smaller than or equal to 64, and one transform is performed on each sub-block.

MTS can be enabled or disabled in SPS, such as in VVC Draft v5, with the following syntaxes in Table 4.

TABLE 4

Syntax for enabling MTS in SPS

| seq_parameter_set_rbsp( ) { | Descriptor |
|---|---|
| ...... | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| ...... | |

In addition, syntaxes elements for controlling implicit MTS, explicit MTS for intra coding and explicit MTS for inter coding can be described in Table 5.

TABLE 5

Syntax elements for enabling implicit MTS, explicit MTS for intra and explicit MTS

| | Implicit MTS | Explicit MTS intra | Explicit MTS inter |
|---|---|---|---|
| sps_mts_enabled_flag | 1 | 1 | 1 |
| sps_explicit_mts_intra_enabled_flag | 0 | 1 | 0/1 |
| sps_explicit_mts_inter_enabled_flag | 0/1 | 0/1 | 1 |

For some cases, DST-7 and/or DCT-8 can be used without being explicitly signaled, such as in VVC Draft v5. For example, DST-7 and/or DCT-8 can be used implicitly based on information that is available for both an encoder and a decoder. Exemplary cases include:

(a) ISP: For ISP mode, the horizontal transform is selected as DST-7 as long as the block width is greater than or equal to 4 and less than or equal to 16, and the vertical transform is selected as DST-7 as long as the block height is greater than or equal to 4 and less than or equal to 16.

(b) SBT: For SBT mode, for a sub-TU located at the left half (or quarter) or right half (or quarter) of current CU, the horizontal transform is DCT-8 and DST-7, respectively. Otherwise, when sub-TU has a same width as the current CU, DCT-2 is used. For a sub-TU located at the top half (or quarter) or bottom half (or quarter) of the current CU, the vertical transform is DCT-8 and DST-7, respectively. Otherwise, when a sub-TU has a same height as the current CU, DCT-2 is used.

(c) MTS disabled in SPS: When sps_mts_enabled_flag is signaled as true, but both sps_explicit_mts_intra_enabled_flag and sps_explicit_mts_inter_enabled_flag are signaled as false, for intra prediction residuals, the horizontal transform is selected as DST-7 as long as the block width is greater than or equal to 4 and less than or equal to 16, and the vertical transform is selected as DST-7 as long as the block height is greater than or equal to 4 and less than or equal to 16.

A mode-dependent non-separable secondary transform (NSST), such as in VVC, can be applied between the forward core transform and quantization (at the encoder), and between the de-quantization and inverse core transform (at the decoder). To keep complexity low, NSST can only be applied to the low frequency coefficients after the primary transform. If both a width (W) and a height (H) of a transform coefficient block is larger than or equal to 8, then 8×8 non-separable secondary transform can be applied to the top-left 8×8 region of the transform coefficients block. Otherwise, if either W or H of a transform coefficient block is equal to 4, a 4×4 non-separable secondary transform can be applied and the 4×4 non-separable transform can be performed on the top-left min(8, W)×min(8, H) region of the transform coefficient block. The above transform selection rule can be applied for both luma and chroma components.

Matrix multiplication implementation of a non-separable transform can be described as follows in formula (1) by using a 4×4 input block as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (1)$$

is represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform can be calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller indices can be placed with the smaller scanning indices in the 4×4 coefficient block. A Hypercube-Givens Transform (HyGT) with butterfly implementation, such as in JEM, can be used instead of matrix multiplication to reduce the complexity of the non-separable transform.

In one design of NSST, a total of 35×3 non-separable secondary transforms can be applied for both 4×4 and 8×8 block sizes, where 35 is the number of transform sets specified by the intra prediction mode, denoted as set, and 3 is the number of NSST candidates for each intra prediction mode. The mapping from the intra prediction mode to the transform set is defined in Table 6 for example. The transform set applied to luma/chroma transform coefficients can be specified by the corresponding luma/chroma intra prediction modes, according to Table 6. For intra prediction modes larger than 34 (diagonal prediction direction), the transform coefficient block can be transposed before/after the secondary transform at the encoder/decoder.

TABLE 6

Mapping from intra prediction mode to transform set index

| intro mdoe | set | intro mode | set |
|---|---|---|---|
| 0 | 0 | 34 | 34 |
| 1 | 1 | 35 | 33 |
| 2 | 2 | 36 | 32 |
| 3 | 3 | 37 | 31 |
| 4 | 4 | 38 | 30 |
| 5 | 5 | 39 | 29 |
| 6 | 6 | 40 | 28 |
| 7 | 7 | 41 | 27 |
| 8 | 8 | 42 | 26 |
| 9 | 9 | 43 | 25 |

TABLE 6-continued

Mapping from intra prediction mode to transform set index

| intro mdoe | set | intro mode | set |
|---|---|---|---|
| 10 | 10 | 44 | 24 |
| 11 | 11 | 45 | 23 |
| 12 | 12 | 46 | 22 |
| 13 | 13 | 47 | 21 |
| 14 | 14 | 48 | 20 |
| 15 | 15 | 49 | 19 |
| 16 | 16 | 50 | 18 |
| 17 | 17 | 51 | 17 |
| 18 | 18 | 52 | 16 |
| 19 | 19 | 53 | 15 |
| 20 | 20 | 54 | 14 |
| 21 | 21 | 55 | 13 |
| 22 | 22 | 56 | 12 |
| 23 | 23 | 57 | 11 |
| 24 | 24 | 58 | 10 |
| 25 | 25 | 59 | 9 |
| 26 | 26 | 60 | 8 |
| 27 | 27 | 61 | 7 |
| 28 | 28 | 62 | 6 |
| 29 | 29 | 63 | 5 |
| 30 | 30 | 64 | 4 |
| 31 | 31 | 65 | 3 |
| 32 | 32 | 66 | 2 |
| 33 | 33 | 67 (LM) | Null |

For each transform set, the selected non-separable secondary transform candidate can be further specified by the explicitly signalled CU-level NSST index. The index may be signalled in a bitstream one time for each intra CU after transform coefficients and truncated unary binarization is used. The truncated value is 2 in case of planar or DC mode, and 3 for angular intra prediction mode. This NSST index may be signalled only when there is more than one non-zero coefficient in a CU. The default value may be zero when it is not signalled. A zero value of this syntax element may indicate that the secondary transform is not applied to the current CU, values 1-3 indicate which secondary transform from the set should be applied.

In some embodiments, NSST cannot be applied for a block coded with transform skip mode. When the NSST index is signalled for a CU and not equal to zero, NSST is not used for a block with a component (e.g., chroma component, or luma component) that is coded with transform skip mode in the CU. When a CU with blocks having all components are coded in transform skip mode or the number of non-zero coefficients of non-transform-skip mode CBs is less than 2, the NSST index is not signalled for the CU.

Figure 10:
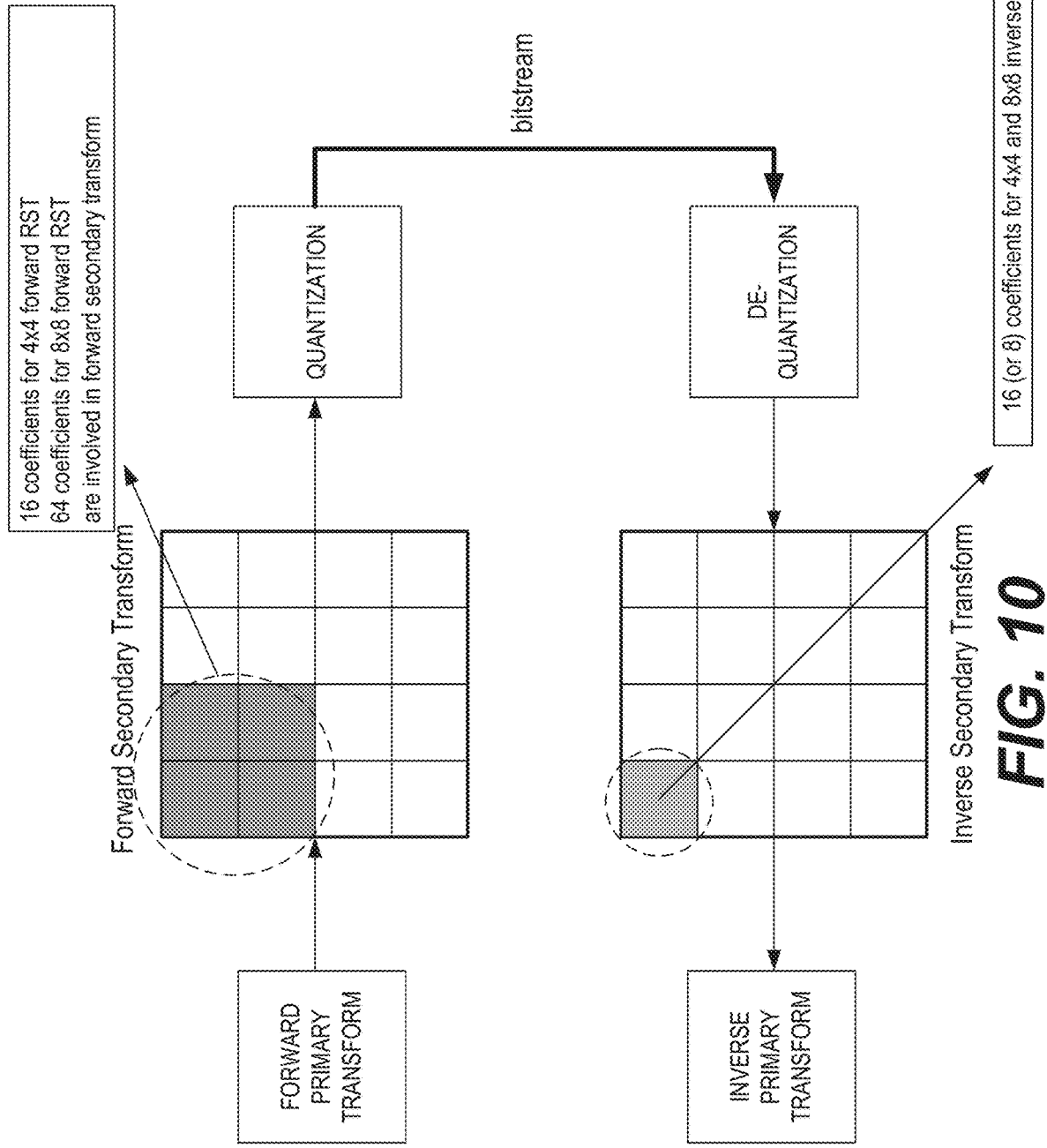
FIG. 10 shows an example of reduced secondary transform (RST) using a 16×64 secondary transform core.
Figure 11:
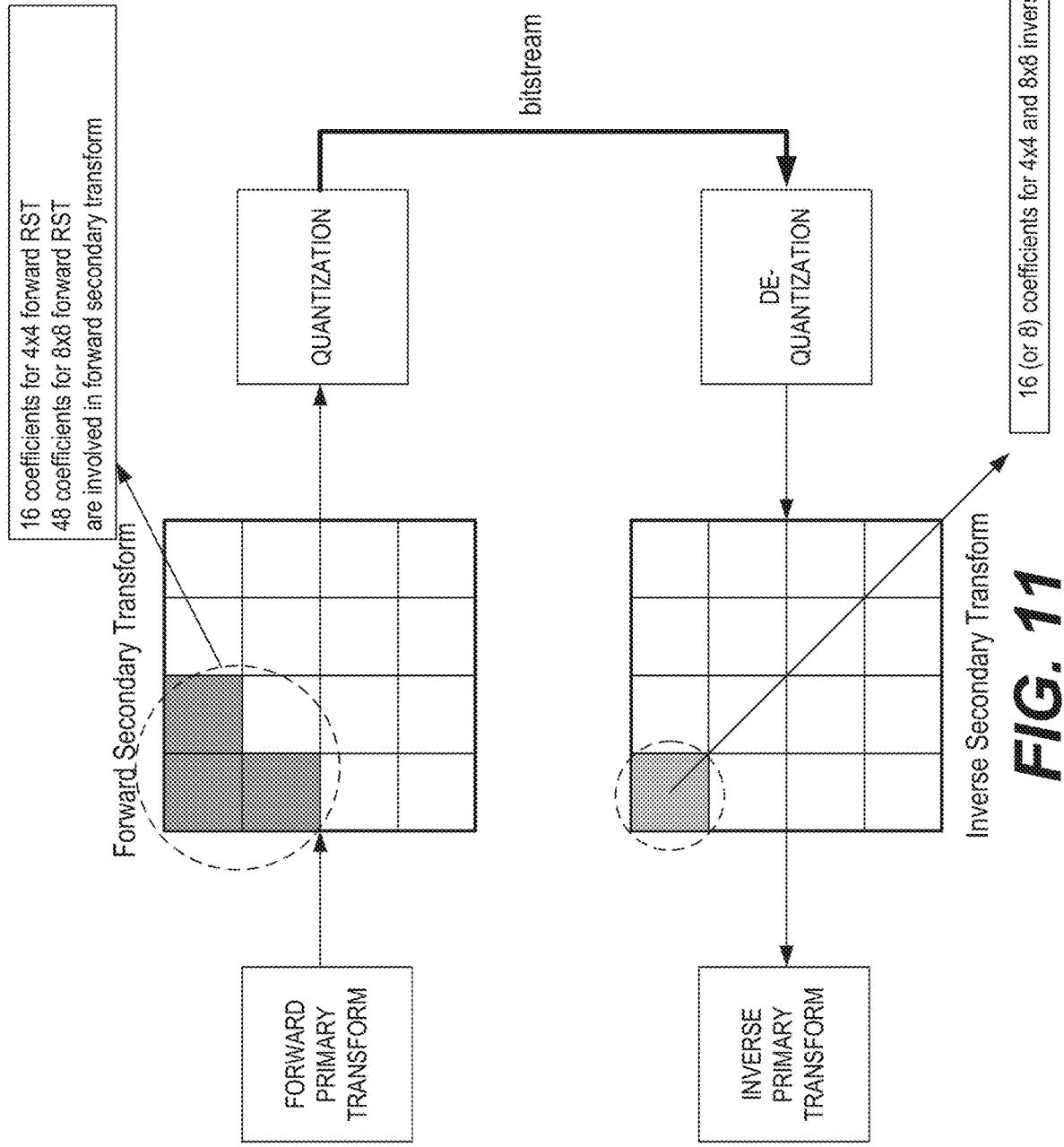
FIG. 11 shows an example of RST using a 16×48 secondary transform core.

A variant of NSST using transform zero-out scheme, namely Reduced Size Transform (RST), which is also called Low-Frequency Non-Separable Secondary Transform (LFNST) such as in VVC Draft 5, has been proposed in JVET-N0193. In RST, whether the intra prediction mode is Planar or DC can be checked for entropy coding the transform index of NSST. Four transform sets can be applied, and each transform set can include three RST transform cores. The three RST transform cores can be either size 16×48 (or 16×64) (applied for a transform coefficient block with a height and a width both being greater than or equal to 8) or 16×16 (applied for a transform coefficient block with either a height or a width being equal to 4). For notational convenience, the 16×48 (or 16×64) transform is denoted as RST8×8 and the 16×16 transform is denoted as RST4×4. For RST8×8, the two alternatives using 16×64 transform cores and 16×48 transform cores are shown in FIG. 10 and FIG. 11, respectively. FIG. 10 shows a an RST using a 16×64 secondary transform core. FIG. 11 shows an RST using a 16×48 secondary transform core. The transform using 16×48 transform cores is adopted in VVC Draft 5 for example.

The index indicating the selection of LFNST kernel (e.g., lfnst_idx) can be signaled at the end of CU-level syntax, as indicated in Table 7. Table 7 provides syntax at a CU-level.

TABLE 7

Syntax of signaling an index for selection of LFNST kernel

| coding_unit( x0, y0, cbWidth, cbHeight, treeType ) { | Descriptor |
|---|---|
| ...... | |
| numSigCoeff = 0 | |
| numZeroOutSigCoeff = 0 | |
| transform_tree( x0, y0, cbWidth, cbHeight, treeType ) | |
| lfnstWidth = ( treeType = = DUAL_TREE_CHROMA ) ? | |
|     cbWidth / SubWidthC : cbWidth | |
| lfnstHeight = ( treeType = = DUAL_TREE_CHROMA ) ? | |
|     cbHeight / SubHeightC : cbHeight | |
| if( Min( lfnstWidth, lfnstHeight ) >= 4 && sps_lfnst_enabled_flag = = 1 && | |
|   CuPredModer[ x0 ][ y0 ] = = MODE_INTRA && | |
|   IntraSubPartitionsSplitType = = ISP_NO_SPLIT && | |
|   !intra_mip_flag[ x0 ][ y0 ] ) { | |
|   if( ( numSigCoeff > ( ( treeType = = SINGLE_TREE ) ? 2 : 1 ) ) && | |
|     numZeroOutSigCoeff = = 0 ) | |
|     lfnst_idx[ x0 ][ y0 ] | ae(v) |
|   } | |
|  } | |
| } | |
| } | |

Figure 12A:
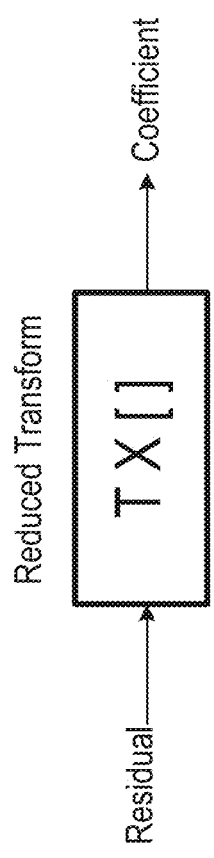
FIG. 12A shows an example of a forward reduced transform.
Figure 12B:
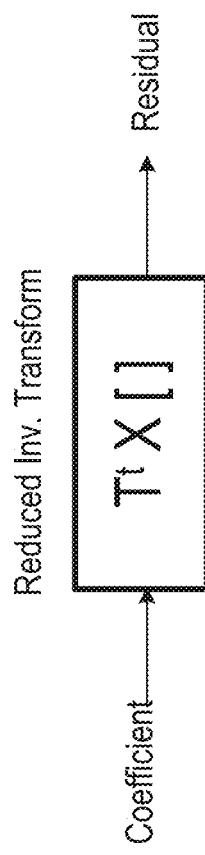
FIG. 12B shows an example of an inverse reduced transform.

In some examples, a Reduced Transform (RT) maps an N dimensional vector to an R dimensional vector in a different space, where R/N (R<N) is the reduction factor. The RST matrix is an R×N matrix as follows in formula (2):

$$T_{R \times N} = \begin{bmatrix} t_{11} & t_{12} & t_{13} & \ldots & t_{1N} \\ t_{21} & t_{22} & t_{23} & & t_{2N} \\ \vdots & & \ddots & & \vdots \\ t_{R1} & t_{R2} & t_{R3} & \ldots & t_{RN} \end{bmatrix} \quad (2)$$

where the R rows of the transform are R bases of the N dimensional space. The inverse transform matrix for RT is the transpose of its forward transform. FIG. 12A is a schematic view of forward and transform and FIG. 12B is a schematic view of inverse reduced transform.

The RST8×8 with a reduction factor of 4(¼ size) can be applied. Hence, instead of 64×64, which is atypical 8×8 non-separable transform matrix size, a 16×64 direct matrix is used. In other words, the 64×16 inverse RST matrix is used at the decoder side to generate core (primary) transform coefficients in 8×8 top-left regions. The forward RST8×8 uses 16×64 (or 8×64 for 8×8 block) matrices so that the forward RST8×8 produces non-zero coefficients only in the top-left 4×4 region within the given 8×8 region. In other words, if RST is applied then the 8×8 region except the top-left 4×4 region can have only zero coefficients. For RST4×4, 16×16 (or 8×16 for a 4×4 block) direct matrix multiplication can be applied.

In addition, for RST8×8, to further reduce the transform matrix size, instead of using the whole top-left 8×8 coefficients as input for calculating a secondary transform, the top-left three 4×4 coefficients can be used as the input for calculating the secondary transform. FIGS. 13A-13B show different alternatives of RST8×8. FIG. 13A shows an example for 16×64 transform matrices and the whole top-left 8×8 coefficients are applied as input for calculating the secondary transform. FIG. 13B shows an example for 16×46 transform matrices and the top-left three 4×4 coefficients are used as the input for calculating secondary transform.

In some embodiments, an inverse RST can be conditionally applied when the following two conditions are satisfied: (a) block size is greater than or equal to the given threshold (W>=4 && H>=4); and (b) transform skip mode flag is equal to zero. If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If the RST index is equal to 0, RST is not applied. Otherwise, if the RST index is equal to one, RST is applied, and a corresponding kernel (or transform set) can be chosen in accordance with the RST index.

Furthermore, RST can be applied for intra CU in both intra and inter slices, and for both Luma and Chroma. If a dual tree is enabled, RST indices for Luma and Chroma are signaled separately. For inter slice (the dual tree is disabled), a single RST index is signaled and used for both luma and chroma components. When the ISP mode is selected, RST is disabled, and RST index is not signaled.

In some embodiments, an RST matrix can be chosen from four transform sets, and each of the transform sets includes, or consists of, two transforms. Which transform set is applied can be determined from an intra prediction mode as follows: (a) if one of three CCLM modes is indicated, transform set 0 is selected, or (b) otherwise, transform set selection is performed according to Table 8:

TABLE 8

The transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |

TABLE 8-continued

The transform set selection table

| IntraPredMode | Tr. set index |
|---|---|
| 45 <= IntraPredMode <= 55 | 2 |
| 56 <= IntraPredMode | 1 |

The index (i.e., IntraPredMode) to access Table 8 has a range of [−14, 83], which is a transformed mode index used for wide angle intra prediction.

A Matrix-based intra prediction (MIP) mode can be provided such as in VVC. For predicting the samples of a rectangular block of width (W) and height (H), MIP takes one line of H reconstructed neighbouring boundary samples that are located to the left of the block, and one line of W reconstructed neighbouring boundary samples above the block as input. If the reconstructed samples are unavailable, they can be generated, for example as it is done in the conventional intra prediction.

The generation of the prediction signal can be based on the following three steps:

(a) Out of the boundary samples, four samples in the case of W=H=4 and eight samples in all other cases are extracted by averaging.

(b) A matrix vector multiplication, followed by addition of an offset, is carried out with the averaged samples as an input. The result is a reduced prediction signal on a sub-sampled set of samples in the original block.

(c) The prediction signal at the remaining positions is generated from the prediction signal on the subsampled set by linear interpolation which is a single step linear interpolation in each direction.

The matrices and offset vectors needed to generate the prediction signal are taken from three sets $S_0$, $S_1$, $S_2$ of matrices. The set $S_0$ includes, or consists of, 18 matrices $A_0^i$, $i \in \{0, \ldots, 17\}$. Each of the matrices has 16 rows, 4 columns, and 18 offset vectors $b_0^i$, $i \in \{0, \ldots, 17\}$. Each of the offset vectors $b_0^i$ has a size 16. Matrices and offset vectors of the set $S_0$ are used for blocks of size 4×4. The set $S_1$ includes, or consists of, 10 matrices $A_1^i$, $i \in \{0, \ldots, 9\}$. Each of the matrices has 16 rows, 8 columns, and 10 offset vectors $b_1^i$, $i \in \{0, \ldots, 9\}$. Each of the offset vectors $b_1^i$ has a size 16. Matrices and offset vectors of the set $S_1$ are used for blocks of sizes 4×8, 8×4, and 8×8. Finally, the set $S_2$ includes, or consists of, 6 matrices $A_2^i$, $i \in \{0, \ldots, 5\}$. Each of the matrices has 64 rows, 8 columns, and 6 offset vectors $b_2^i$, $i \in \{0, \ldots, 5\}$ of size 64. Matrices and offset vectors of the set $S_2$ or parts of these matrices and offset vectors are used for all other block-shapes.

Figure 14:
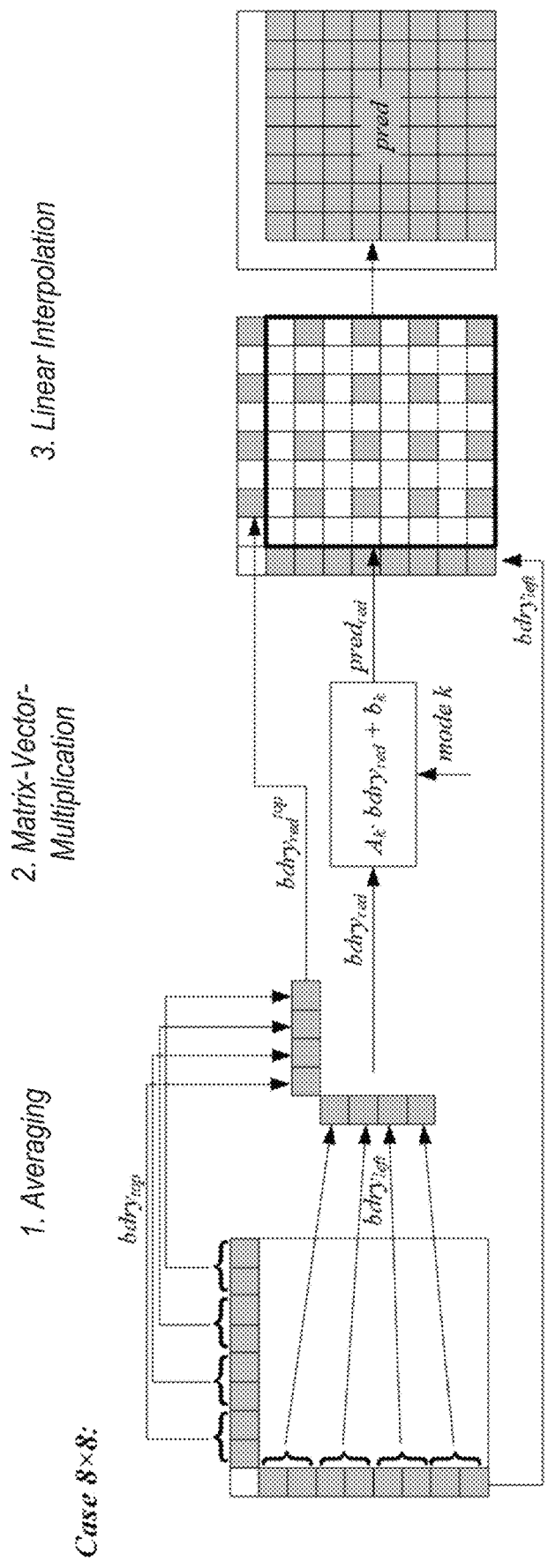
FIG. 14 shows a Matrix-based intra prediction (MIP) mode.

FIG. 14 is an illustration of an example MIP for 8×8 blocks. As shown in FIG. 14, given an 8×8 block, MIP takes four averages along each axis of the boundary. The resulting eight input samples enter the matrix vector multiplication. The matrices are taken from the set $S_1$. This yields 16 samples on the odd positions of the prediction block. Thus, a total of (8*16)/(8*8)=2 multiplications per sample are performed. After adding an offset, these samples are interpolated vertically by using the reduced top boundary. Horizontal interpolation follows by using the original left boundary. The interpolation process does not require any multiplications in this case.

In terms of signaling of MIP mode, for each CU in intra mode, a flag indicating whether an MIP mode is applied on the corresponding PU or not can be sent in the bitstream. If an MIP mode is applied, the index predmode of the MIP mode can be signaled using an MPM-list including 3 MPMs.

The derivation of the MPMs can be performed using the intra-modes of the above and the left PU as follows. There are three fixed mapping tables map_angular_to_mip$_{idx}$, idx∈{0,1,2}, and each table can be associated with a conventional intra prediction mode predmode$_{Angular}$ with a specific MIP mode, as described in the following formula (3).

$$\text{predmode}_{MIP} = \text{map\_angular\_to\_mip}[\text{predmode}_{Angular}] \quad (3)$$

where map_angular_to_mip is a fixed look-up table. The index of the mapping table can be decided based on the width (W) and height (H) of PU, and in total three indices are available, as described below in formula (4)

$$\text{idx}(PU) = \text{idx}(W,H) \in \{0,1,2\} \quad (4)$$

The formula (4) indicates from which of the three sets the MIP parameters are to be taken.

To generate the MPM list for a current block which is coded by MIP mode, an above MIP mode, namely mode$_{MIP}^{above}$, and a left MIP mode, namely mode$_{MIP}^{left}$, are firstly derived. The value of mode$_{MIP}^{above}$ can be derived as follows:

(a) If the above PU PU$_{above}$ is available, and it belongs to the same CTU where the current PU resides, and PU$_{above}$ is coded by MIP using an MIP mode predmode$_{MIP}^{above}$ and idx(PU)=idx(PU$_{above}$), $$\text{mode}_{MIP}^{above} = \text{predmode}_{MIP}^{above} \quad (5)$$

(b) If the above PU PU$_{above}$ is available, and it belongs to the same CTU where the current PU resides, and PU$_{above}$ is coded using a conventional intra prediction mode predmode$_{Angular}^{above}$, $$\text{mode}_{MIP}^{above} = \text{map\_angular\_to\_mip}[\text{predmode}_{Angular}^{above}] \quad (6)$$

(c) Otherwise, $$\text{mode}_{MIP}^{above} = -1 \quad (7)$$

which means that this mode is unavailable. The value of mode$_{MIP}^{left}$ can be derived in the same way as deriving mode$_{MIP}^{above}$ but without checking whether the left PU belongs to the same CTU where the current PU resides.

Finally, given the derived mode$_{MIP}^{above}$ and mode$_{MIP}^{left}$ and three pre-defined fixed default MPM lists list$_{idx}$, idx∈{0, 1,2}, where each of the MPM lists contains three distinct MIP modes, an MPM list is constructed. The MPM list can be constructed based on the given default list list$_{idx(PU)}$ and mode$_{MIP}^{above}$ and mode$_{MIP}^{left}$, by substituting −1 by default values as well as removing duplicate MIP modes.

Exemplary flags for signaling MIP modes are illustrated in Table 9 which is a CU-level syntax table.

TABLE 9

| Syntax of flags signaling MIP modes at CU-level | |
|---|---|
| coding_unit( x0, y0, cbWidth, cbHeight, treeType ) { | Descriptor |
| ...... | |
|   if( sps_mip_enabled_flag && | |
|     ( Abs( Log2( cbWidth ) − Log2( cbHeight ) ) <= 2 ) && | |
|     cbWidth <= MaxTbSizeY && cbHeight <= MaxTbSizeY ) | |
|     intra_mip_flag[ x0 ][ y0 ] | ae(v) |
|   if( intra_mip_flag[ x0 ][ y0 ] ) { | |
|     intra_mip_mpm_flag[ x0 ][ y0 ] | ae(v) |
|     if( intra_mip_mpm_flag[ x0 ][ y0 ] ) | |
|       intra_mip_mpm_idx[ x0 ][ y0 ] | ae(v) |
|     else | |
|       intra_mip_mpm_remainder[ x0 ][ y0 ] | ae(v) |
|   } else { | |
|     if( sps_mrl_enabled_flag && ( ( y0 % CtbSizeY ) > 0 ) ) | |
|       intra_luma_ref_idx[ x0 ][ y0 ] | ae(v) |
|     if( sps_isp_enabled_flag && intra_luma_ref_idx[ x0 ][ y0 ] = = 0 && | |
|       ( cbWidth <= MaxTbSizeY && cbHeight <= MaxTbSizeY ) && | |
|       ( cbWidth * cbHeight > MinTbSizeY * MinTbSizeY ) ) | |
|       intra_subpartitions_mode_flag[ x0 ][ y0 ] | ae(v) |
|     if( intra_subpartitions_mode_flag[ x0 ][ y0 ] = = 1 && | |
|       cbWidth <= MaxTbSizeY && cbHeight <= MaxTbSizeY ) | |
|       intra_subpartitions_split_flag[ x0 ][ y0 ] | ae(v) |
|     if( intra_luma_ref_idx[ x0 ][ y0 ] ) = = 0 && | |
|       intra_subpartitions_mode_flag[ x0 ][ y0 ] = = 0 ) | |
|       intra_luma_mpm_flag[ x0 ][ y0 ] | ae(v) |
|     if( intra_luma_mpm_flag[ x0 ][ y0 ] ) { | |
|       if( intra_luma_ref_idx[ x0 ][ y0 ] = = 0 ) | |
|         intra_luma_not_planar_flag[ x0 ][ y0 ] | ae(v) |
|       if(intra_luma_not_planar_flag[ x0 ][ y0 ] ) | |
|         intra_luma_mpm_idx[ x0 ][ y0 ] | ae(v) |
|     } else | |
|       intra_luma_mpm_remainder[ x0 ][ y0 ] | ae(v) |
|   } | |
| } | |
| } | |
| ...... | |

In some embodiments, the MIP modes can be harmonized with the MPM-based coding of the conventional intra-prediction modes as follows. The luma and chroma MPM-list derivation processes for the conventional intra-prediction modes use separate fixed tables map_mip_to_angular$_{idx}$, idx∈{0,1,2}, which map an MIP-mode predmode$_{MIP}$ to one of the conventional intra-prediction modes $$predmode_{Angular} = map\_mip\_to\_angular[predmode_{MIP}] \quad (8)$$

where map_mip_to_angular is a fixed look-up table. For the luma MPM-list derivation, whenever a neighboring luma block is coded by an MIP mode predmode$_{MIP}$, this block can be treated as if it was using the conventional intra-prediction mode predmode$_{Angular}$. For the chroma MPM-list derivation, whenever the current luma block uses an MIP-mode, the same mapping can be used to translate the MIP-mode to a conventional intra prediction mode.

Figure 15:
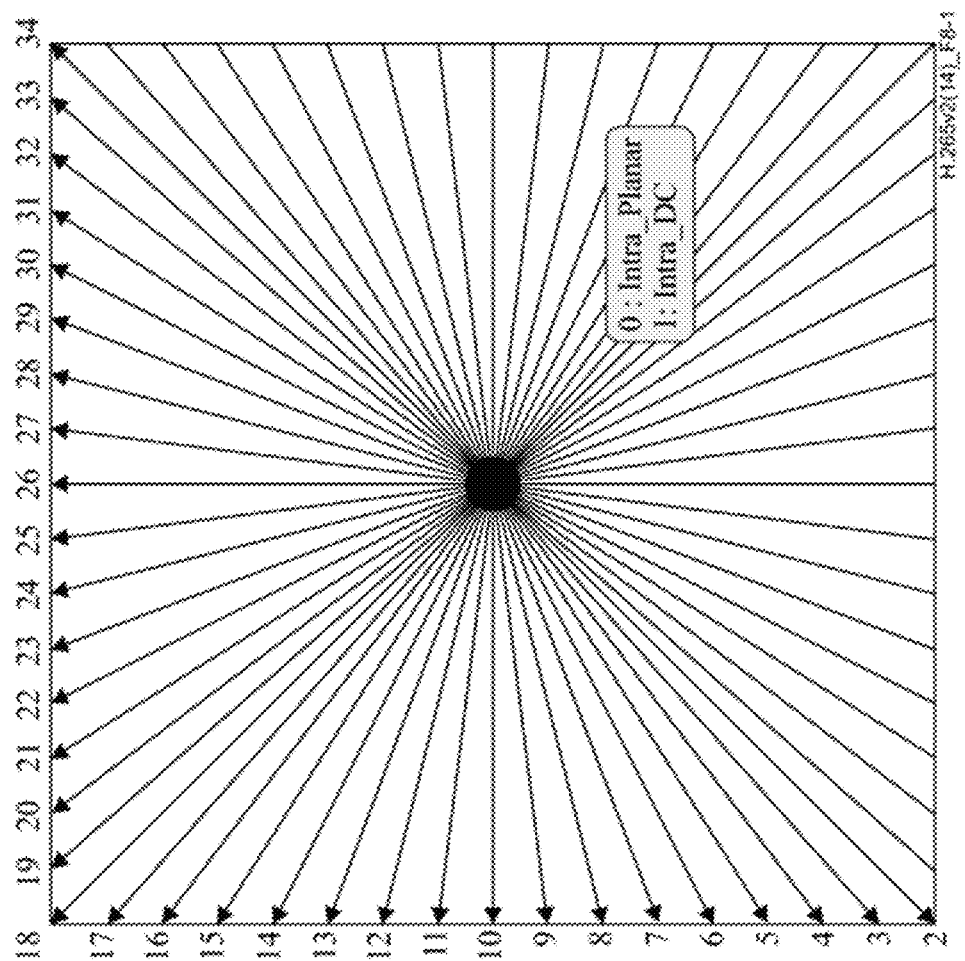
FIG. 15 shows 35 intra prediction modes in accordance with an embodiment.

Exemplary intra prediction modes are illustrated in FIG. 15. A total of 35 intra prediction modes is illustrated in FIG. 15, for example as used in HEVC. Among the 35 intra prediction modes, mode 10 is a horizontal mode and mode 26 is a vertical mode. Modes 2, 18, and 34 are diagonal modes. The 35 intra prediction modes can be signalled by three most probable modes (MPMs) and 32 remaining modes.

Figure 16:
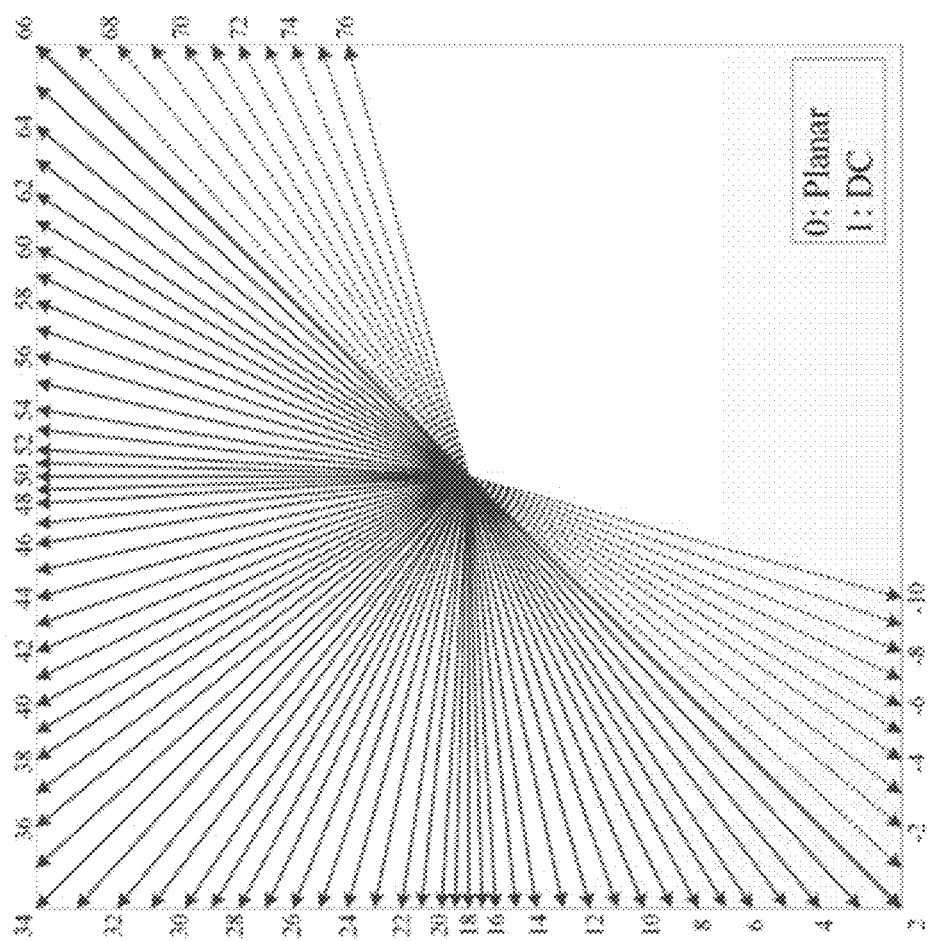
FIG. 16 shows 95 intra prediction modes in accordance with an embodiment.

A total of 95 intra prediction modes is illustrated in in FIG. 16, for example as used in VVC. Mode 18 is a horizontal mode and mode 50 is a vertical mode. Modes 2, 34, and 66 are diagonal modes. Modes −1 to −14 and Modes 67 to 80 can be referred to as Wide-Angle Intra Prediction (WAIP) modes.

Position dependent prediction combination (PDPC), such as in VVC, can be applied to the following intra modes without signaling: planar, DC, WAIP modes, horizontal, vertical, bottom-left angular mode (mode 2), 8 adjacent angular modes (mode 3~10) of the bottom-left angular mode, top-right angular mode (mode 66), and 8 adjacent angular modes (mode 58~65) of the top-right angular mode. A prediction sample pred(x,y) located at position (x, y) of a current block can be predicted using an intra prediction mode (e.g., DC, planar, angular) and a linear combination of reference samples according to the PDPC expression that is shown in formula (9).

$$pred(x,y) = (wL \times R_{-1,y} + wT \times R_{x,-1} - wTL \times R_{-1,-1} + (64 - wL - wT + wTL) \times pred(x,y) + 32) >> 6 \quad (9)$$

where $R_{x,-1}$ and $R_{-1,y}$ represent reference samples located at the top and left of a current sample (x, y), respectively, and $R_{-1,-1}$ represents a reference sample located at the top-left corner of the current block.

The weights applied in the DC mode can be calculated according to formula (10) for a block with a width and a height.

$$wT=32>>((y<<1)>>nScale), wL=32>>((x<<1)>>nScale), wTL=(wL>>4)+(wT>>4) \quad (10)$$

In formula (10), nScale=(log 2(width)−2+log 2(height)−2+2)>>2, wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block. nScale can specify how fast the weighting factors (e.g., wL, wTL, and wT) decrease along the axis (wL decreasing from left to right or wT decreasing from top to bottom), and denote a weighting factor decrement rate. The weighting factor decrement rate weighting factor decrement rate nScale is the same along x-axis (from left to right) and y-axis (from top to bottom) in VVC. In addition, 32 denotes the initial weighting factors for the neighboring samples, and the initial weighting factors are also the top (left or top-left) weightings assigned to top-left samples in current CB. The weighting factors of neighboring samples in a PDPC process should be equal to or less than the initial weighting factors.

In some embodiments, wTL=0 in Planar mode, wTL=wT in horizontal mode, and wTL=wL in vertical mode. The PDPC weights (or weighting factors) can be calculated with adds and shifts. The value of pred(x, y) can be computed in a single step using formula (9) for example.

Figure 17B:
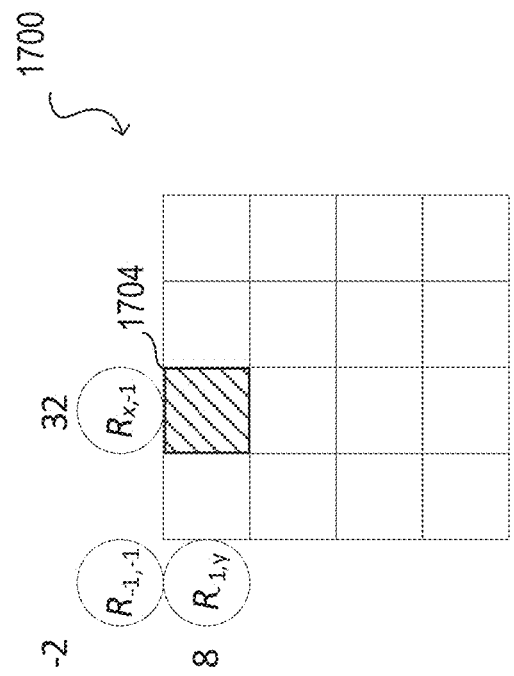
FIG. 17B shows a second example of PDPC weights in accordance with an embodiment.
Figure 17A:
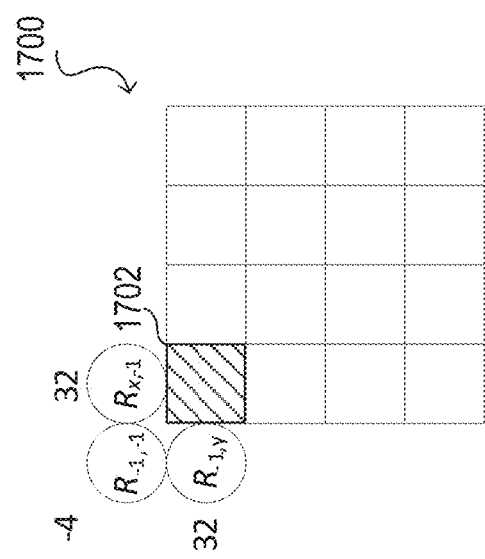
FIG. 17A shows a first example of position dependent prediction combination (PDPC) weights in accordance with an embodiment.

FIG. 17A illustrates the PDPC weights (wL, wT, wTL) in DC mode for a sample 1702 located in (0, 0) inside a 4×4 block 1700. As shown in FIG. 17A, wL=32, wT=32, and wTL=−4. FIG. 17B illustrates the PDPC weights (wL, wT, wTL) in DC mode for a sample 1704 located in (1, 0) inside the 4×4 block 1700. As shown in FIG. 17B, wL=8, wT=32, and wTL=−2. If PDPC is applied to DC, planar, horizontal, or vertical intra modes, additional boundary filters are not needed, such as the HEVC DC mode boundary filter or horizontal/vertical mode edge filters.

FIG. 17A can also illustrate the definition of reference samples $R_{x,-1}$, $R_{-1,y}$, and $R_{-1,-1}$ when PDPC is applied to the top-right diagonal mode. The prediction sample pred(x', y') is located at (x', y') within the prediction block (or the 4×4 block) 1700. The coordinate x of the reference sample $R_{x,-1}$ is given by: x=x'+y'+1, and the coordinate y of the reference sample $R_{-1,y}$ is similarly given by: y=x'+y'+1.

The following clause describes an example of the PDPC, such as in VVC draft 2, where nScale is used to specify the weighting factor decrement rate, and "32" in formulas (14), (15), (19), and (20) specifies the initial weighting factors. Inputs to the position-dependent intra prediction combination process can include: the intra prediction mode predModeIntra; a variable nTbW specifying the transform block width; a variable nTbH specifying the transform block height; a variable refW specifying the reference samples width; a variable refH specifying the reference samples height; the predicted samples predSamples[x][y], with x= 0 . . . nTbW−1 and y=0 . . . nTH−1; the neighbouring samples p[x][y], with
x=−1, y=−1 . . . refH−1 and x=0 . . . refW−1, y=−1; and a variable cIdx specifying the colour component of the current block.

Outputs of the position-dependent intra prediction combination process can include the modified predicted samples predSamples[x][y] with
x=0 . . . nTbW−1, y=0 . . . nTbH−1. Depending on the value of cIdx, the function clip1Cmp can set as follows. If cIdx is equal to 0, clip1Cmp can beset equal to Clip1Y. Otherwise, clip1Cmp can be set equal to Clip1C. The variable nScale can be set to ((Log 2(nTbW)+Log 2(nTbH)−2)>>2).

The reference sample arrays mainRef[x] and sideRef[y], with x=0 . . . refW and y=0 . . . refH can be derived as follows:

$$mainRef[x] = p[x][-1]$$

$$sideRef[y] = p[-1][y] \quad (11)$$

The variables refL[x][y], refT[x][y], wT[y], wL[y] and wTL[x][y] with x=0 . . . nTbW−1, y=0 . . . nTbH−1 can be derived as follows. If predModeIntra is equal to INTRA_PLANAR, INTRA_DC, INTRA_ANGULAR18, or INTRA_ANGULAR50, the following applies:

$$refL[x][y] = p[-1][y] \quad (12)$$

$$refT[x][y] = p[x][-1] \quad (13)$$

$$wT[y] = 32 >> ((y<<1) >> nScale) \quad (14)$$

$$wL[x]=32>>((x<<1)>>n\text{Scale}) \quad (15)$$

$$wTL[x][y]=(\text{predModeIntra}==\text{INTRA\_DC})?\\((wL[x]>>4)+(wT[y]>>4)):0 \quad (16)$$

Otherwise, if predModeIntra is equal to INTRA_ANGULAR2 or INTRA_ANGULAR66, the following applies:

$$\text{refL}[x][y]=p[-1][x+y+1] \quad (17)$$

$$\text{refT}[x][y]=p[x+y+1][-1] \quad (18)$$

$$wT[y]=(32>>1)>>((y<<1)>>n\text{Scale}) \quad (19)$$

$$wL[x]=(32>>1)>>((x<<1)>>n\text{Scale}) \quad (20)$$

$$wTL[x][y]=0 \quad (21)$$

Otherwise, if predModeIntra is less than or equal to INTRA_ANGULAR10, the following ordered steps apply: The variables dXPos[y], dXFrac[y], dXInt[y] and dX[y] are derived as follows using invAngle depending on intraPredMode:

$$d\text{XPos}[y](((y+1)*\text{invAngle}+2)>>2$$

$$d\text{XFrac}[y]=d\text{XPos}[y]\&63$$

$$d\text{XInt}[y]=d\text{XPos}[y]>>6$$

$$dX[y]=x+d\text{XInt}[y] \quad (22)$$

The variables refL[x][y], refT[x][y], wT[y], wL[y] and wTL[x][y] are derived as follows:

$$\text{refL}[x][y]=0 \quad (23)$$

$$\text{refT}[x][y]=(dX[y]<\text{refW}-1)?((64-d\text{XFrac}[y])*\text{mainRef}\\ [dX[y]]+d\text{XFrac}[y]*\text{mainRef}[dX[y]+1]+32)>>6:0 \quad (24)$$

$$wT[y]=(dX[y]<\text{refW}-1)?32>>((y<<1)>>n\text{Scale}):0 \quad (25)$$

$$wL[x]=0 \quad (26)$$

$$wTL[x][y]=0 \quad (27)$$

Otherwise, if predModeIntra is greater than or equal to INTRA_ANGULAR58, the following ordered steps apply: The variables dYPos[x], dYFrac[x], dYInt[x] and dY[x] are derived as follows using invAngle depending on intraPredMode:

$$d\text{YPos}[x]=((x+1)*\text{invAngle}+2)>>2$$

$$d\text{YFrac}[x]=d\text{YPos}[x]\&63$$

$$d\text{YInt}[x]=d\text{YPos}[x]>>6$$

$$dY[x]=x+d\text{YInt}[x] \quad (28)$$

The variables refL[x][y], refT[x][y], wT[y], wL[y] and wTL[x][y] are derived as follows:

$$\text{refL}[x][y]=(dY[x]<\text{refH}-1)?((64-d\text{YFrac}[x])*\text{sideRef}\\ [dY[x]]+d\text{YFrac}[x]*\text{sideRef}[dY[x]+1]+32)>>6:0 \quad (29)$$

$$\text{refT}[x][y]=0 \quad (30)$$

$$wT[y]=0 \quad (31)$$

$$wL[x]=(dY[x]<\text{refH}-1)?32>>((x<<1)>>n\text{Scale}):0 \quad (32)$$

$$wTL[x][y]=0 \quad (33)$$

Otherwise, refL[x][y],refT[x][y], wT[y], wL[y] and wTL [x][y] are all set equal to 0.

The values of the filtered samples filtSamples[x][y], with x=0 . . . nTbW−1, y=0 . . . nTbH−1 can derived as follows:

$$\text{filtSamples}[x][y]=\text{clip1Cmp}((\text{refL}[x][y]*wL+\text{refT}[x]\\ [y]*wT-p[-1][-1]*wTL[x][y]+(64-wL[x]-wT\\ [y]+wTL[x][y])*\text{predSamples}[x][y]+32)>>6)$$

For the chroma component of an intra coded block, the encoder selects the best chroma prediction modes among five modes including Planar (mode index 0), DC (mode index 1), Horizontal (mode index 18), Vertical (mode index 50), Diagonal (mode index 66), and a direct copy of the intra prediction mode for the associated luma component, namely DM mode. An example eof the mapping between intra prediction direction and intra prediction mode number for chroma is shown in Table 10.

TABLE 10

Mapping between intra prediction direction and intra prediction mode for chroma

| intra_chroma_pred_mode[ xCb ][ yCb ] | IntraPredModeY[ xCb + cbWidth/2 ][ yCb + cbHeight/2 ] | | | | |
|---|---|---|---|---|---|
| | 0 | 50 | 18 | 1 | X ( 0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

As shown in Table 10, the intra prediction directions for a chroma component can be indicated using a syntax element intra_chroma_pred_mode [xCb][yCb], which can have five values (e.g., 0-5), and each value can indicate a respective intra prediction direction for the chroma component. A syntax element IntraPredModeY[xCb+cbWidth/2][yCb+cbHeight/2] can indicate corresponding intra prediction modes for the chroma component responsive to the intra prediction directions for chroma component.

To avoid a duplicate mode, the four modes other than DM can be assigned according to the intra prediction mode of the associated luma component. When the intra prediction mode number for the chroma component is 4, the intra prediction direction for the luma component can be used for the intra prediction sample generation for the chroma component. When the intra prediction mode number for the chroma component is not 4 and is identical to the intra prediction mode number for the luma component, the intra prediction direction of 66 can be used for the intra prediction sample generation for the chroma component.

Merge mode for inter-picture prediction indicates that the motion data is inferred instead of being explicitly signaled for a block. A merge candidate list of candidate motion parameters can be firstly constructed, and then an index can be signaled to identify which candidate in the merge candidate list is to be used.

The merge candidate list can include a non sub-CU merge candidate list and a sub-CU merge candidate list. The non sub-CU merge candidates can be constructed based on the spatial neighboring motion vectors, collocated temporal motion vectors, and history based motion vectors. The sub-CU Merge candidate list can include affine merge candidates and ATMVP merge candidates. A sub-CU merge candidate can be used to derive multiple MVs for a current CU, and a different part of the samples in the current CU can have different motion vectors.

Skip mode for inter-picture prediction indicates that the motion data for a block is inferred instead of being explicitly signaled, and that the prediction residual is zero, i.e., no transform coefficients are transmitted. At the beginning of each CU in an inter-picture prediction slice, a skip_flag can be signaled that implies: (a) the merge mode is used to derive the motion data; and (b) no residual data is present in the bitstream.

Multi-hypothesis intra-inter prediction (also referred to as combined intra-inter prediction (CIIP) mode) combines one intra prediction and one merge indexed prediction (or one inter prediction in merge mode), namely intra-inter prediction mode. When a CU is coded in the merge mode, and if the CU contains at least 64 luma samples (i.e., CU width times CU height is equal to or larger than 64), an additional flag can be signaled to indicate if the combined inter/intra prediction (CIIP) mode is applied to the CU. The additional flag can be signaled to select an intra mode from an intra candidate list when the additional flag is true. For a luma component of the CU, the intra candidate list can be derived from 4 intra prediction modes including DC, planar, horizontal, and vertical modes, and the size of the intra candidate list can be 3 or 4 depending on the block shape. When the CU width is larger than a double value of CU height, horizontal mode is removed from the intra mode list. When the CU height is larger than the double value of CU width, vertical mode is removed from the intra mode list. Further, one intra prediction mode selected by the intra mode index and one merge indexed prediction selected by the merge index can be combined using a weighted average. For a chroma component of the CU, DM can be always applied without extra signaling.

The weights (or weighting factors) for combining predictions can be described as follows. When DC or planar mode is selected or a Coding Block (CB) with a width or a height smaller than 4, equal weights are applied. For a CB with a width and a height larger than or equal to 4, when horizontal/vertical mode is selected, the CB is first vertically/horizontally split into four equal-area regions. Each weight set, denoted as ($w\_intra_i$, $w\_inter_i$), where i is from 1 to 4 and ($w\_intra_1$, $w\_inter_1$)=(6, 2), ($w\_intra_2$, $w\_inter_2$)=(5, 3), ($w\_intra_3$, $w\_inter_3$)=(3, 5), and ($w\_intra_4$, $w\_inter_4$)=(2, 6), can be applied to a corresponding region. ($w\_intra_1$, $w\_inter_1$) is applied to a region closest to the reference samples and ($w\_intra_4$, $w\_inter_4$) is applied to a region farthest away from the reference samples. Then, the combined prediction can be calculated by summing up the two weighted predictions (e.g., the inter prediction and the intra prediction in merge mode) and right-shifting 3 bits. Moreover, the intra prediction mode for the intra hypothesis of predictors can be saved for the intra mode coding of the following neighboring CBs if they are intra coded.

Inter PDPC mode can apply a PDPC filtering process directly to inter prediction samples (or reconstructed samples of an inter coded CU), such as in VVC. One flag, namely interPDPCFlag, can be signaled to indicate whether to apply the PDPC filtering process or not. When interPDPCFlag is true, the prediction samples (or reconstructed samples of an inter coded CU) are further modified in the PDPC process. Inter PDPC mode can be combined with any inter coded modes to further improve the inter prediction samples. However, in some embodiments, restrictions can be applied to prohibit the inter PDPC modes from comingling with certain inter coded modes. In one example, inter PDPC mode can only be applied to regular merge mode and/or sub-block merge mode. In another example, inter PDPC mode cannot be applied to merge skip mode.

Figure 18B:
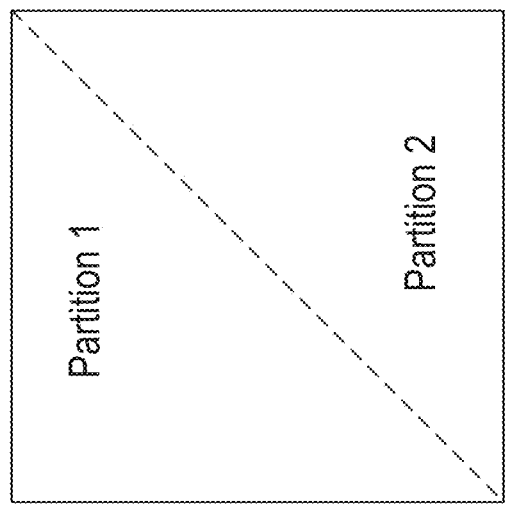
FIG. 18B shows a second example of triangle partition based inter prediction.
Figure 18A:
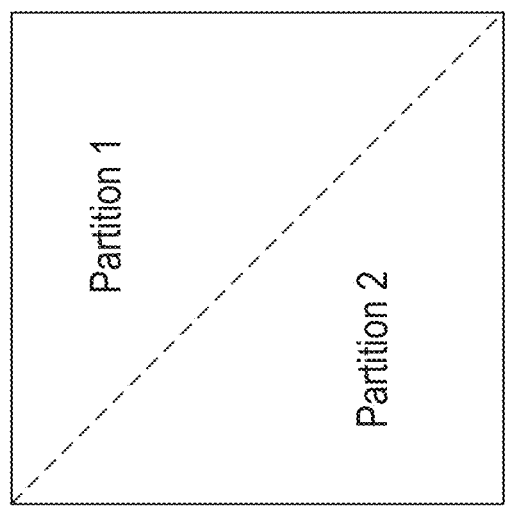
FIG. 18A shows a first example of triangle partition based inter prediction.

A triangle partition mode for inter prediction, such as in VTM3, can only be applied to CUs that are 8×8 or larger and are coded in skip or merge mode. For a CU satisfying these conditions, a CU-level flag can be signalled to indicate whether the triangle partition mode is applied or not. When the triangle partition mode is applied, a CU can be split evenly into two triangle-shaped partitions, using either the diagonal split or the anti-diagonal split that are illustrated for example in FIG. 18A and FIG. 18B respectively. Each triangle partition in the CU can be inter-predicted using its own motion. In addition, only a uni-prediction can be allowed for each partition. That is, each partition can have one motion vector and one reference index. The uni-prediction motion constraint can be applied to ensure that, same as a conventional bi-prediction, only two motion compensated predictions are needed for each CU. The uni-prediction motion for each partition can be derived from a uni-prediction candidate list that can be constructed using a construction process. In the construction process, the uni-prediction candidate list can include five uni-prediction motion vector candidates. The uni-prediction candidate list can be derived from seven neighboring blocks including five spatial neighboring blocks and two temporal co-located blocks.

If the CU-level flag indicates that the current CU is coded using the triangle partition mode, an index (or triangle partition index) in the range of [0, 39] can be further signalled. Using the triangle partition index, a direction of the triangle partition (e.g., diagonal or anti-diagonal), as well as a motion for each of the partitions can be obtained through a look-up table. After each of the triangle partitions is predicted, the sample values along the diagonal or anti-diagonal edge can be adjusted using a blending processing with adaptive weights. Accordingly, the prediction signal for the whole CU can be obtained. A transform and quantization process can further be applied to the whole CU as in other prediction modes. Finally, the motion field of a CU that is predicted using the triangle partition mode can be stored in 4×4 units.

Embodiments of the present disclosure include implicit transform selection methods for an inter PDPC prediction mode. The method can be based on inter PDPC mode and a CIIP mode, for example as proposed for VVC.

In a case that MTS is not used (e.g., disabled by high level syntax (HLS) indicating MTS cannot be applied for coding the current bitstream segment) or an ISP prediction mode is applied, an implicit MTS method can be used such as in VVC. When implicit MTS is enabled, for an intra prediction residual, the horizontal transform can be set as DST-7 as long as the block width is smaller than or equal to 16 and greater than or equal to 4, the vertical transform can be set as DST-7 as long as the block height is smaller than or equal to 16 and greater than or equal to 4.

Since inter PDPC mode can be combined with different modes of an inter-coded CU, such as regular merge mode or sub-block merge mode, the energy distribution of inter predicted residuals after applying a PDPC filter can be different for different modes. Therefore, different transform designs should be considered for the different combinations of inter PDPC mode and other inter modes. The consideration of different transform designs has not been addressed for inter PDPC mode.

In the disclosure, inter PDPC mode and/or CIIP mode can generate prediction residuals which have similar statistics of an intra prediction residual. Therefore, DST-7 may be a more efficient transform other than DCT-2. In some embodiments, DST-4 may be used to replace DST-7 for certain small block sizes or all block sizes. Further, in some embodiments, PDPC refers to simpled PDPC.

In the disclosure, the transform design used for inter predicted residuals after applying the PDPC filter can be dependent on the coded information of a current block and neighboring blocks of the current block, which includes but is not limited to inter prediction mode, merge flag, block size, color component, etc.

In one embodiment, when the inter PDPC mode is on, sub-block transform (SBT) is always on/off regardless which inter coded modes the inter PDPC is applied to. In another embodiment, when inter PDPC is applied to sub-block merge mode, SBT is allowed. Otherwise, when inter PDPC is applied to the merge mode except the sub-block merge mode, SBT is always off. In another embodiment, when inter PDPC is applied to triangle merge mode, SBT is allowed. Alternatively, when interPDPC is applied to tri-angle merge mode, SBT is not allowed.

In another embodiment, when the inter PDPC mode is on, only a subset of SBT types can be allowed. In a first example, when the inter PDPC mode and a SBT flag are both on, the residual partition (e.g., partition that is allowed to have non-zero coefficients) of the current CU is always the rightmost or bottommost partition. In a second example, when the inter PDPC mode and the SBT flag are both on, the leftmost or topmost partition of the current CU is always the zero-residual partition.

In another embodiment, when the inter PDPC mode is on, only a subset of available transform types can be used. In a first example, when the PDPC mode is on, type-8 discrete cosine transform (DCT-8) is excluded from the allowed transform types. For example, when the PDPC mode is on, only type-2 discrete cosine transform (DCT-2) and type-7 discrete sine transform (DST-7) can be used for the inter predicted residuals. In a second example, when the PDPC mode is on, DST-7 is excluded from the allowed transform types. For example, when the PDPC mode is on, only DCT-2 and DCT-8 can be used for the inter predicted residuals. In a third example, when the PDPC mode is on, only DST-7 can be applied.

In a fourth example, when the inter PDPC mode is on, DST-7 is always used as both the horizontal and vertical transform for some block sizes, and DCT-2 is used as both the horizontal and vertical transform for other block sizes. In a first embodiment, implicit transform scheme (or mode) is applied for the inter PDPC mode. For example, the horizontal transform is set as DST-7 as long as the block width is smaller than or equal to a threshold T, and the vertical transform is set as DST-7 as long as the block height is smaller than or equal to the threshold T. Example values of the threshold T include, but are not limited to 4 pixels, 8 pixels, 16 pixels, and 32 pixels. In a second embodiment, implicit transform scheme can only be applied for a luma component of the current CU, and only DCT-2 and/or TSM can be applied for a chroma component of the current CU.

In another embodiment, when the inter PDPC mode is on, in addition to TSM, two transform schemes can be applied for the prediction residual and the selection is signaled. In an example, the two transform schemes can include: (1) DCT-2 as both horizontal and vertical transforms, and (2) DST-7 as both horizontal and vertical transforms.

In yet another one embodiment, when inter PDPC mode is on, MTS is always on/off regardless which inter coded modes the inter PDPC is applied to.

A selection of a context that is applied to entropy code an index for transform signaling (e.g., a flag/index indicating whether or which of DCT2, TSM, DST7, DCT8 is applied) can depend on whether the CIIP is applied for current block, and/or whether the inter PDPC mode is applied for a current block.

The flag of the inter PDPC mode can be context coded and the context used can be dependent on the coded information of a current block and neighboring blocks of the current block, including but not limited to intra-inter flag, intra mode flag, inter mode flag, skip flag, merge flag, inter PDPC flag, etc. In one embodiment, only one context is used for the entropy coding of inter PDPC mode. In another embodiment, M contexts are used for the entropy coding of inter PDPC mode. M can be any positive integer greater than 1, such as 2 or 3. In a first example, if one of the neighboring modes is intra coded, intra-inter coded, or inter PDPC coded, a first context is used. Otherwise, a second context is used. In a second example, if both neighboring modes are intra coded, intra-inter coded, or inter PDPC coded, the first context is used. Otherwise if only one of the neighboring modes is intra coded, intra-inter coded, or inter PDPC coded, the second context is used. Otherwise, none of the neighboring modes is intra coded, intra-inter coded, or inter PDPC coded the third context is used.

In some embodiments, the inter PDPC mode cannot be used together with Intra Block Copy (IBC) mode.

In the disclosure, the weightings applied in the inter PDPC mode (e.g., wL, wT and/or wTL) can depend on coded information, including whether a neighboring block is coded by intra-inter mode, intra prediction mode, inter prediction mode, skip mode, merge mode, or inter PDPC mode.

An implicit transform scheme can be used for prediction residuals of CIIP. In one embodiment, for prediction residuals of CIIP, the horizontal transform can be set as DST-7 as long as the block width is smaller than or equal to a threshold T, and the vertical transform can be set as DST-7 as long as the block height is smaller than or equal to the threshold T. Example values of the threshold T include, but are not limited to 4 pixels, 8 pixels, 16 pixels, and 32 pixels. In one embodiment, the transform selection of CIIP can depend on the weightings between intra prediction part ($w_{intra}$) and inter prediction part ($w_{inter}$). In one example, if $w_{intra}/w_{inter}$ is larger than a given threshold T1, the horizontal transform is set as DST-7 as long as the block width is smaller than or equal to a threshold T2, and the vertical transform is set as DST-7 as long as the block height is smaller than or equal to the threshold T2. Example values of the T1 can include, but are not limited to 2, 2.5, 3, and 7. Example values of the T2 can include, but are not limited to 4 pixels, 8 pixels, 16 pixels, and 32 pixels.

In one embodiment, the transform selection of CIIP can depend on the number of intra coded neighboring blocks. In a first example, if both the above and left neighboring blocks are intra coded, the horizontal transform is set as DST-7 as long as the block width is smaller than or equal to a threshold T2, and the vertical transform is set as DST-7 as long as the block height is smaller than or equal to a threshold T2. Otherwise, DCT2 is used as the horizontal and vertical transforms. Example values of the T2 include, but are not limited to 4 pixels, 8 pixels, 16 pixels, and 32 pixels. In a second example, if more than N of the above and left neighboring blocks are intra coded, the horizontal transform is set as DST-7 as long as the block width is smaller than or equal to a threshold T2, and the vertical transform is set as DST-7 as long as the block height is smaller than or equal to a threshold T2. Otherwise, DCT2 is used as the horizontal and vertical transforms. Example values of the T2 include, but are not limited to 4 pixels, 8 pixels, 16 pixels, and 32 pixels. Example values of N include, but are not limited to 1, 2, 3, and 4.

In the disclosure, the weightings (or weighting factors) applied on intra prediction part ($w_{intra}$) and weightings applied on inter prediction part ($w_{inter}$) in CIIP can also depend on whether neighboring blocks are coded using the CIIP mode and/or the inter PDPC mode. In one embodiment, if both the top-right (or top) and bottom-left (or left) neighboring blocks are coded using the CIIP mode, the $w_{intra}$ is assigned as a first value (e.g., 3). If one of the top-right and bottom-left neighboring blocks are coded using the CIIP mode, the $w_{intra}$ is assigned as a second value (e.g., 2). If none of the top-right and bottom-left neighboring blocks are coded using the CIIP mode, then the $w_{intra}$ is assigned as a third value (e.g., 1). The value of $w_{inter}$ can be assigned according to $w_{intra}$, e.g., $w_{inter}=N-w_{intra}$. Example values of N include but are not limited to 2, 4, 8, and 16. In one embodiment, if both the top-right (or top) and bottom-left (or left) neighboring blocks are coded using the inter PDPC mode, then the $w_{intra}$ is assigned as a first value (e.g., 3). If one of the top-right and bottom-left neighboring blocks are coded using the inter PDPC mode, then the $w_{intra}$ is assigned as a second value (e.g., 2). If none of the top-right and bottom-left neighboring blocks are coded using the inter PDPC mode, the $w_{intra}$ is assigned as a third value (e.g., 1). The value of $w_{inter}$ can be assigned according to $w_{intra}$, e.g., $w_{inter}=N-w_{intra}$. Example values of N include but are not limited to 2, 4, 8, and 16.

In the disclosure, if a filtering process is applied on the inter prediction block and the filtering process uses the neighboring reconstructed samples to further adjust the inter prediction samples of the current block, a default primary transform can be applied. In one embodiment, the predefined primary transform is DST-7 for both horizontal and vertical transforms. In one embodiment, the pre-defined primary transform is DCT-2 for both horizontal and vertical transforms. In one embodiment, the pre-defined horizontal primary transform is DST-7 as long as the block width is smaller than or equal to a threshold T. Otherwise, DCT-2 is used. Example values of the threshold T include, but are not limited to 4 pixels, 8 pixels, 16 pixels, and 32 pixels. In one embodiment, the pre-defined vertical primary transform is DST-7 as long as the block height is smaller than or equal to the threshold T. Otherwise, DCT-2 is used.

In one embodiment, the filtering process can be a boundary filtering process, in which only a few of first rows and/or a few of first columns of inter prediction samples that are adjacent to the boundary of a inter prediction block can be further adjusted using the neighboring reconstructed samples, but the whole inter prediction block is not modified. In one embodiment, the filtering process can apply position-dependent weightings between the inter prediction samples and the neighboring reconstructed samples used for the filtering. In one embodiment, implicit transform scheme can only be applied for a luma component of the inter prediction block, and only DCT-2 and/or TSM can be applied for a chroma component of the inter prediction block. In one embodiment, MTS is not signaled when the filtering process is applied. In a first example, the filtering process refers to the inter-PDPC mode. In a second example, the filtering process refers to the CIIP mode.

Embodiments of the present disclosure include modifications to an implicit transform. The semantics of MTS related syntax elements, such as in VVC, can be confusing. For example, to enable explicit intra MTS, both sps_mts_enabled_flag and sps_explicit_mts_intra_enabled_flag need to be 1. However, to enable implicit MTS, sps_mts_enabled_flag needs to be 1 but sps_explicit_mts_intra_enabled_flag needs to be 0. In another example, to enable explicit inter MTS, both sps_mts_enabled_flag and sps_explicit_mts_inter_enabled_flag need to be 1, but only one coding tool (or one syntax element) is under control.

In the disclosure, MTS selection for intra prediction residual (whether DCT-2, implicit MTS or explicit intra MTS) and inter prediction residual (whether DCT-2, or explicit inter MTS and implicit MTS for SBT) can be indicated using separate syntax elements.

In one embodiment, the following HLS syntaxes are designed for indicating the usage of MTS, as shown in Table 11 for example.

TABLE 11

| Syntaxes elments indicating the usage of MTS | |
| --- | --- |
| seq_parameter_set_rbsp( ) { | Descriptor |
| ...... | |
| sps_intra_mts_selection | ue(v) |
| sps_inter_mts_selection_flag | u(1) |
| ...... | |

As shown in Table 11, sps_intra_mts_selection can have a value of 0, 1, and 2. When sps_intra_mts_selection is equal to 0 or 1, tu_mts_idx is not present in the transform unit syntax for intra coding units. When sps_intra_mts_selection is equal to 2, tu_mts_idx can be present in the transform unit syntax for intra coding units. Moreover, when sps_intra_mts_selection is equal to 0, implicit MTS is not applied for intra prediction residuals. When sps_intra_mts_selection is equal to 1, implicit MTS is applied for intra prediction residuals. sps_inter_mts_selection_flag can have a value of 0 and 1. When sps_inter_mts_selection_flag is equal to 1, tu_mts_idx can be present in the transform unit syntax for inter coding units. When sps_inter_mts_selection_flag is equal to 0, tu_mts_idx is not present in the transform unit syntax for inter coding units. Exemplary syntax designed for indicating the usage of MTS based on the syntax elements in Table 11 is shown in Table 12.

TABLE 12

| Syntaxes designed for indicating usage of MTS | |
| --- | --- |
| if( ( ( CuPredMode[ chType ][ x0 ][ y0 ] = = MODE_INTER && sps_inter_mts_selection_flag ) \|\| ( CuPredMode[ chType ][ x0 ][ y0 ] = = MODE_INTRA && sps_intra_mts_selection = = 2) ) && ( !transform_skin_flag[ x0 ][ y0 ] ) ) | |
| tu_mts_idx[ x0 ][ y0 ] | ae(v) |

An example of a modified transformation process for scaled transform coefficients according to some embodiments is described below. Inputs to this process can include a luma location (xTbY, yTbY) specifying the top-left sample of the current luma transform block relative to the top-left luma sample of the current picture; a variable nTbW specifying the width of the current transform block; a variable nTbH specifying the height of the current transform block; a variable cIdx specifying the colour component of the current block; and/or an (nTbW)×(nTbH) array d[x][y] of scaled transform coefficients with x=0 . . . nTbW−1, y=0 . . . nTbH−1. An output of this process is the (nTbW)×(nTbH) array r[x][y] of residual samples with x=0 . . . nTbW−1, y=0 . . . nTbH−1.

The variable implicitMtsEnabled can be derived as follows. If one of a plurality of conditions is true, implicitMtsEnabled is set equal to 1. The plurality of conditions can include IntraSubPartitionsSplitType is not equal to ISP_NO_ SPLIT; cu_sbt_flag is equal to 1 and Max(nTbW, nTbH) is less than or equal to 32 and sps_inter_mts_selection_flag is equal to 1; and/or sps_intra_mts_selection is equal to 1 and CuPredMode[0][xTbY][yTbY] is equal to MODE_INTRA and lfnst_idx[x0][y0] is equal to 0 and intra_mip_flag[x0][y0] is equal to 0. Otherwise, implicitMtsEnabled is set equal to 0.

In another embodiment, the exemplary HLS syntaxes in Table 13 are designed for indicating the usage of MTS, where implicit MTS can be enabled for SBT without enabling explicit MTS.

TABLE 13

Syntaxes elments designed for indicating the usage of MTS

| seq_parameter_set_rbsp( ) { | Descriptor |
|---|---|
| ...... | |
| sps_intra_mts_selection | ue(v) |
| sps_inter_mts_selection | ue(v) |
| ...... | |

As shown in Table 13, sps_intra_mts_selection can have a value of 0, 1, or 2. When sps_intra_mts_selection is equal to 0 or 1, tu_mts_idx is not present in the transform unit syntax for intra coding units. When sps_intra_mts_selection is equal to 2, tu_mts_idx can be present in the transform unit syntax for intra coding units. Moreover, when sps_intra_mts_selection is equal to 0, implicit MTS is not applied for intra prediction residuals. When sps_intra_mts_selection is equal to 1, implicit MTS is applied for intra prediction residuals. sps_inter_mts_selection can have a value of 0, 1, or 2. When sps_inter_mts_selection is equal to 0 or 1, tu_mts_idx can be present in the transform unit syntax for inter coding units. When sps_inter_mts_selection is equal to 2, tu_mts_idx can be present in the transform unit syntax for inter coding units. Further, when sps_inter_mts_selection is equal to 0, implicit MTS is not applied for inter prediction residuals. When sps_inter_mts_selection is equal to 1, implicit MTS is applied for inter prediction residuals. An exemplary syntax designed for indicting the usage of MTS based on the syntax elements in Table 13 is shown in Table 14 for example.

TABLE 14

Syntaxes designed for indicating the usage of MTS

| if( ( ( CuPredMode[ chType ][ x0 ][ y0 ] = = MODE_INTER && sps_inter_mts_selection == 2 ) |
|---|
| \|\| ( CuPredMode[ chType ][ x0 ][ y0 ] = = MODE_INTRA && sps_intra_mts_selection ==2) ) && |
| ( !transform_skip_flag[ x0 ][ y0 ] ) ) |
|    tu_mts_idx[ x0 ][ y0 ]                                                                              ae(v) |

An example of a modified transformation process for scaled transform coefficients for some embodiments is described below. Inputs to this process can include a luma location (xTbY, yTbY) specifying the top-left sample of the current luma transform block relative to the top-left luma sample of the current picture; a variable nTbW specifying the width of the current transform block; a variable nTbH specifying the height of the current transform block; a variable cIdx specifying the colour component of the current block; and/or an (nTbW)×(nTbH) array d[x][y] of scaled transform coefficients with x=0 ... nTbW−1, y=0 ... nTbH−1. An output of this process is the (nTbW)×(nTbH) array r[x][y] of residual samples with x=0 ... nTbW−1, y= 0 ... nTbH−1.

The variable implicitMtsEnabled can be derived as follows. If one of a plurality of conditions is true, implicitMtsEnabled is set equal to 1. The plurality of conditions can include IntraSubPartitionsSplitType is not equal to ISP_NO_ SPLIT; cu_sbt_flag is equal to 1 and Max(nTbW, nTbH) is less than or equal to 32 and sps-inter-mts-selection is not equal to 0; and/or sps_intra_mts_selection is equal to 1 and CuPredMode[0][xTbY][yTbY] is equal to MODE_INTRA and lfnst_idx[x0][y0] is equal to 0 and intra_mip_flag[x0][y0] is equal to 0. Otherwise, implicitMtsEnabled is set equal to 0.

In the disclosure, a transform selection for ISP coded blocks can be controlled by MTS related HLS to indicate whether implicit MTS or DCT-2 is applied. An example of a modified transformation process for scaled transform coefficients according to some embodiments is described below. Inputs to this process can include a luma location (xTbY, yTbY) specifying the top-left sample of the current luma transform block relative to the top-left luma sample of the current picture; a variable nTbW specifying the width of the current transform block; a variable nTbH specifying the height of the current transform block; a variable cIdx specifying the colour component of the current block; and/or an (nTbW)×(nTbH) array d[x][y] of scaled transform coefficients with x=0 ... nTbW−1, y=0 ... nTbH−1. An output of this process is the (nTbW)×(nTbH) array r[x][y] of residual samples with x=0 ... nTbW−1, y=0 ... nTbH−1.

The variable implicitMtsEnabled can be derived as follows. If one of a plurality of conditions is true, implicitMtsEnabled is set equal to 1. The plurality of conditions can include IntraSubPartitionsSplitType is not equal to ISP_ NO_SPLIT and sps_intra_mts_selection is not equal to 0; cu_sbt_flag is equal to 1 and Max(nTbW, nTbH) is less than or equal to 32 and sps_inter_mts_selection is not equal to 0; and/or sps_intra_mts_selection is equal to 01 and CuPredMode[0][xTbY][yTbY] is equal to MODE_INTRA and lfnst_idx[x0][y0] is equal to 0 and intra_mip_flag[x0][y0] is equal to 0. Otherwise, implicitMtsEnabled is set equal to 0.

In some embodiments, the PDPC refers to a simplified PDPC mentioned above or a variant thereof. In some embodiments, DST-4 may be used to replace DST-7 for certain small block sizes or all block sizes.

In the disclosure, an "implicit transform" can indicate a transform scheme selecting a group of non-DCT2 transforms (such as DST-1, DCT-5, DST-7, DCT-8, DST-4, DCT-4) without any transform index signaling. For example, a group of non-DCT2 transforms can be selected using already coded information that is available to both encoder and decoder, including but not limited to intra prediction mode (Planar mode, DC mode, Angular modes), block size, block width, block height, block aspect ratio, block area size, intra coding mode (whether MRL, ISP, MIP is used), position of selected spatial Merge candidates (top Merge candidate, left Merge candidate), and/or inter prediction mode (inter-PDPC mode, CIIP mode etc.).

In the disclosure, an "explicit transform" can indicate a transform scheme selecting one transform from a group of transform type candidates (such as DCT-2, DST-1, DCT-5, DST-7, DCT-8, DST-4, DCT-4) with an index signaled to indicate which transform type is selected.

In the disclosure, explicit MTS applied for an intra prediction residual can be called explicit intra MTS, and MTS applied for an inter prediction residual can be called explicit inter MTS.

Figure 19:
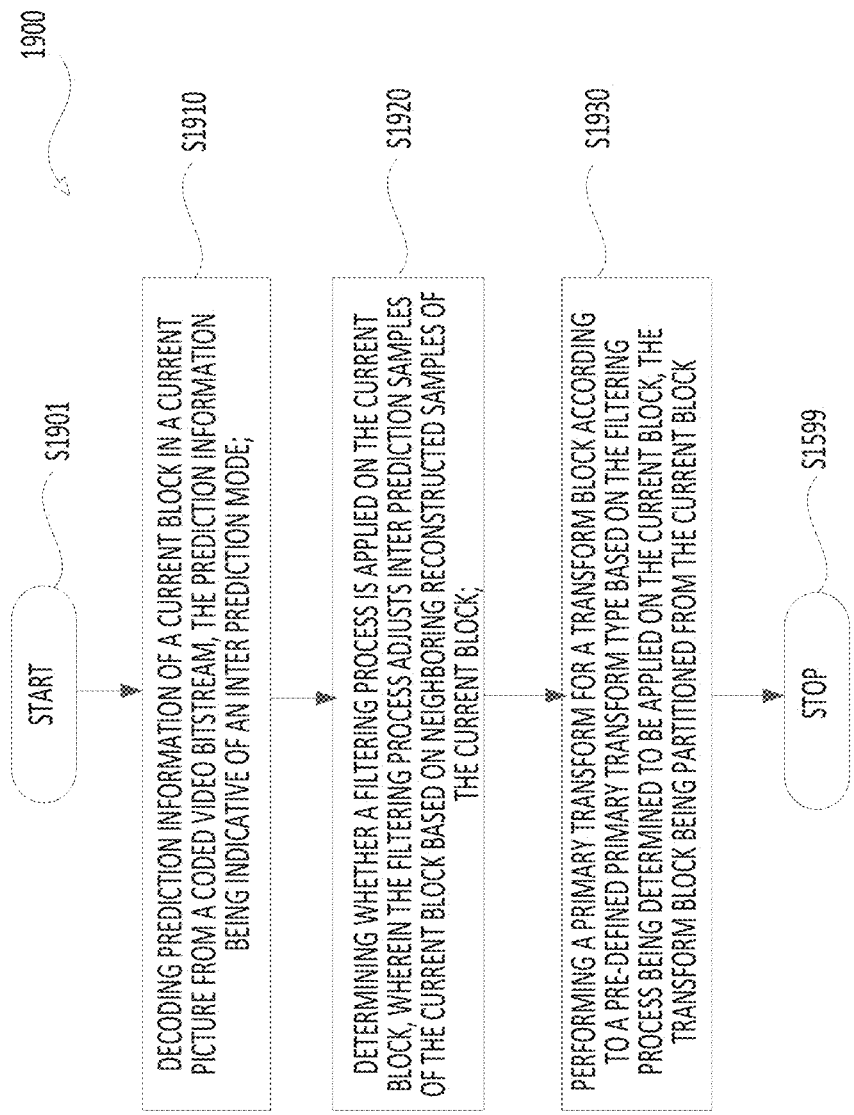
FIG. 19 shows a flow chart outlining a first process example according to some embodiments of the disclosure.
Figure 20:
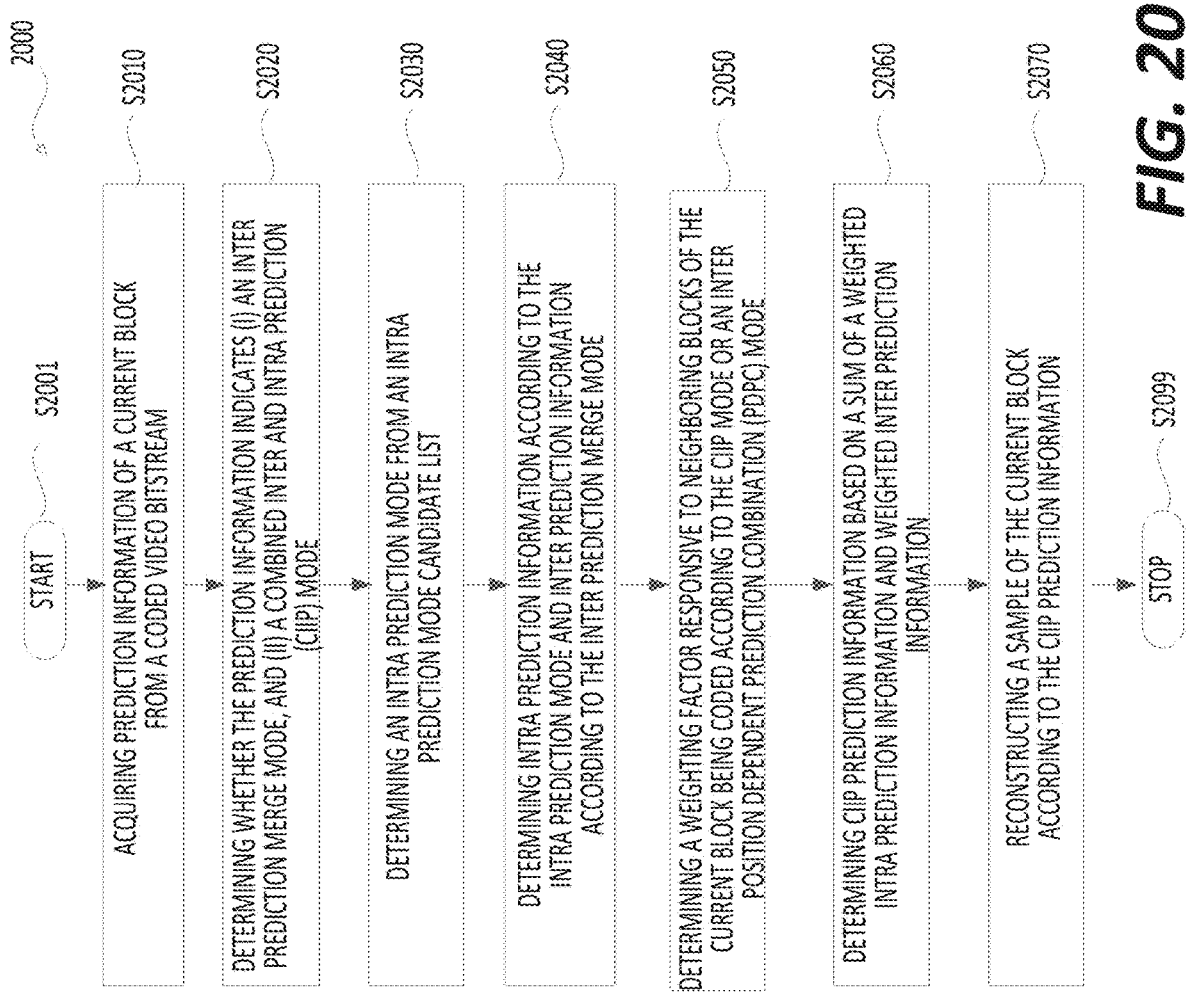
FIG. 20 shows a flow chart outlining a second process example according to some embodiments of the disclosure.
Figure 21:
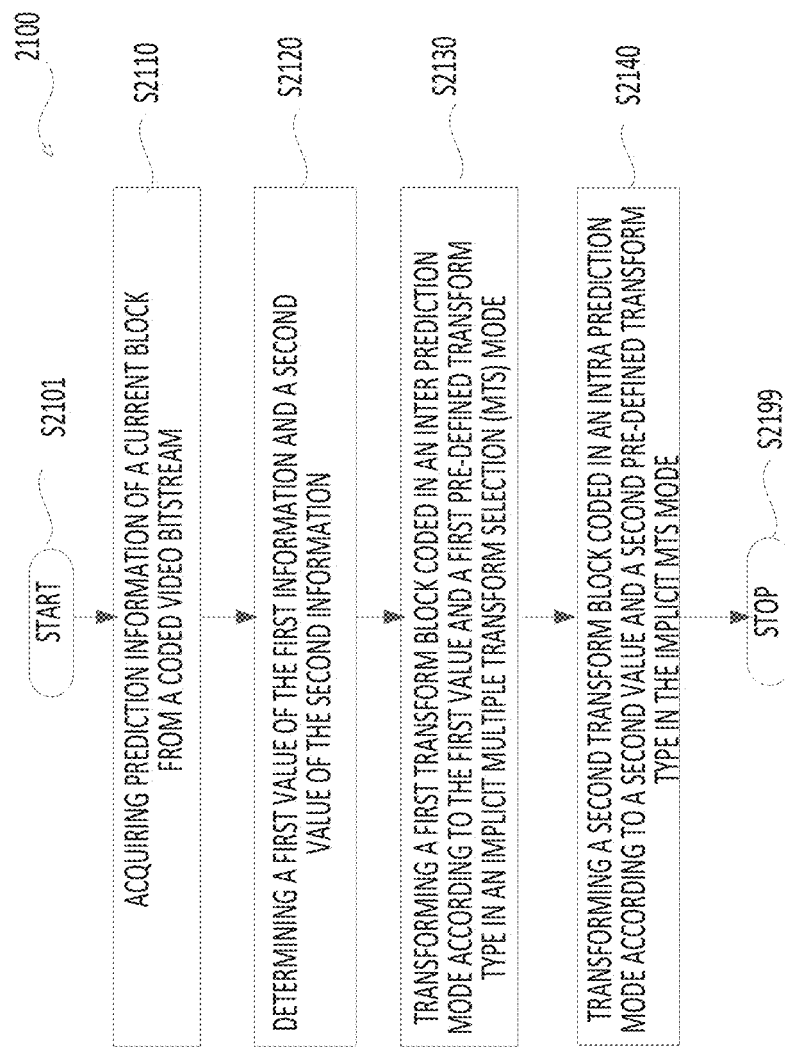
FIG. 21 shows a flow chart outlining a third process example according to some embodiments of the disclosure.

FIG. 19 shows a flow chart outlining a process (1900) according to an embodiment of the disclosure. FIG. 20 shows a flow chart outlining a process (2000) according to an embodiment of the disclosure. FIG. 21 shows a flow chart outlining a process (2100) according to an embodiment of the disclosure. In various embodiments, the process (1900), the process (2000), and the process (2100) can be executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1900), the process (2000), and the process (2100) can be implemented in software instructions, thus when the processing circuitry executes the software instructions, the processing circuitry performs the process (1900), the process (2000), and/or the process (2100) respectively.

As shown in FIG. 19, the process (1900) starts at (S1901) and proceeds to (S1910). At (S1910), prediction information of a current block in a current picture can be decoded from a coded video bitstream. The prediction information is indicative of an inter prediction mode At (S1920), whether a filtering process is applied on the current block can be determined. The filtering process can adjust inter prediction samples of the current block based on neighboring reconstructed samples of the current block. In some embodiments, the filtering process can be operated based on a position dependent prediction combination (PDPC) mode or a combined inter and intra prediction (CIIP) mode.

At (S1930), a primary transform can be performed for a transform block according to a pre-defined primary transform type based on the filtering process being determined to be applied on the current block, where the transform block is partitioned from the current block.

In some embodiments, the primary transform type can be a type-7 discrete sine transform (DST-7) mode for a horizontal transform that is applied to the transform block responsive to a width of the current block being smaller than or equal to a threshold value. The primary transform type can be the DST-7 mode for a vertical transform that is applied to the transform block responsive to a height of the current block being smaller than or equal to the threshold value. The threshold value can include one of 4 pixels, 8 pixels, 16 pixels, or 32 pixels.

In some embodiments, the primary transform type can be a type-2 discrete cosine transform (DCT-2) mode for a horizontal transform that is applied to the transform block responsive to a width of the current block being bigger than to a threshold value. The primary transform type can be the DCT-2 mode for a vertical transform and can be applied to the transform block responsive to a height of the current block being larger than the threshold value. The threshold value can include one of 4 pixels, 8 pixels, 16 pixels, or 32 pixels.

As shown in FIG. 20, the process (2000) starts at (S2001) and proceeds to (S2010). At (S2010), prediction information of a current block can be acquired from a coded video bitstream.

At (S2020), whether the prediction information indicates (i) an inter prediction merge mode, and (ii) a combined inter and intra prediction (CIIP) mode can be determined.

At (S2030), an intra prediction mode can be determined from an intra prediction mode candidate list responsive to the prediction information indicating the inter prediction merge mode and the CIIP mode.

At (S2040), intra prediction information can be determined according to the intra prediction mode and inter prediction information according to the inter prediction merge mode.

At (S2050), a weighting factor can be determined responsive to neighboring blocks of the current block being coded according to the CIIP mode or an inter position dependent prediction combination (PDPC) mode.

In some embodiments, the weighted inter prediction information is based on the inter prediction information and a constant value minus the weighting factor, where the constant value includes one of 2, 4, 8, or 16.

In some embodiments, the weighting factor can be 3 responsive to both top-right/top and bottom-left/left neighboring blocks of the current block being coded using the CIIP mode. In some embodiments, the weighting factor can be 2 responsive to one of the top-right/top and the bottom-left/left neighboring blocks of the current block being coded using the CIIP mode. In some embodiments, the weighting factor can be 1 responsive to the top-right/top and the bottom-left/left neighboring blocks of the current block being coded using the CIIP mode.

In some embodiments, the weighting factor can be 3 responsive to both top-right/top and bottom-left/left neighboring blocks of the current block being coded using the PDPC mode. The weighting factor can be 2 responsive to one of the top-right/top and the bottom-left/left neighboring blocks of the current block being coded using the PDPC mode. The weighting factor can be 1 responsive to none of the top-right/top and the bottom-left/left neighboring blocks of the current block being coded using the PDPC mode.

At (S2060), CIIP prediction information can be determined based on a sum of weighted intra prediction information and weighted inter prediction information, where the weighted intra prediction information is based on the intra prediction information and the weighting factor, and the weighted inter prediction information is based on the inter prediction information and the weighting factor.

The process (2000) then proceeds to (S2070) where a sample of the current block can be reconstructed according to the CIIP prediction information.

FIG. 21 illustrates the process (2100) that starts at (S2101) and proceeds to (S2110). At (S2110), transform block signaling information can be acquired from a coded video bitstream. The transform block signaling information can include first information associated with an inter prediction transform and second information associated with an intra prediction transform.

At (S2120), a first value of the first information and a second value of the second information can be determined.

At (S2130), a first transform block coded in an inter prediction mode can be transformed according to the first value and a first pre-defined transform type in an implicit multiple transform selection (MTS) mode.

At (S2140), a second transform block coded in an intra prediction mode can be transformed according to a second value and a second pre-defined transform type in the implicit MTS mode.

In some embodiments, the first value of the first information can be equal to 1 and the second value of the second information can be equal to 1.

In some embodiments, the first value of the first information can be greater than 0, and the second value of the second information can be equal to 1.

In some embodiments, the second transform block coded in the intra prediction mode can be transformed according to the second value, the second pre-defined transform type in the implicit MTS mode, and a coding unit that includes the second transform block being intra sub-partitioning (ISP) coded. The second value is larger than 0.

Figure 22:
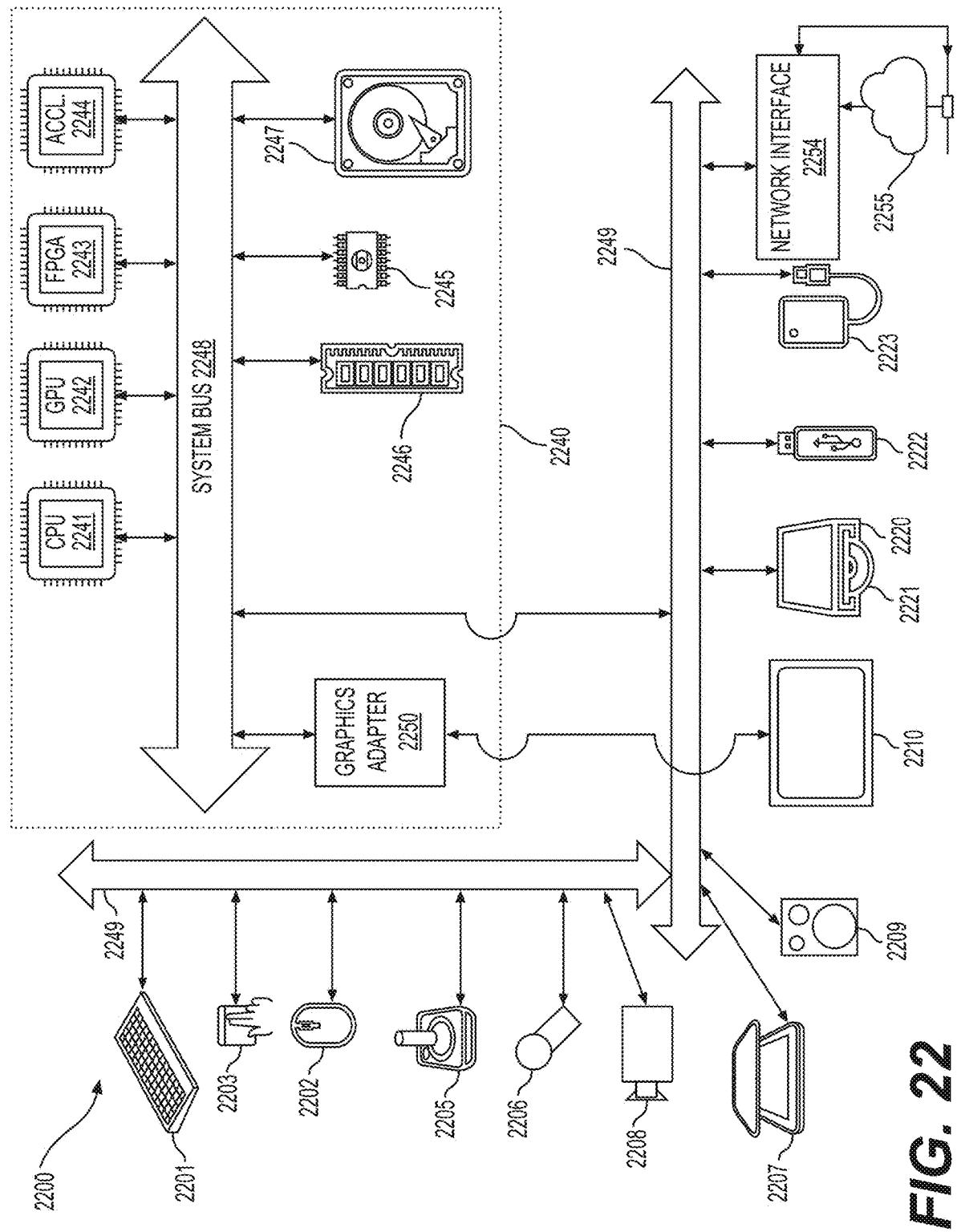
FIG. 22 is a schematic illustration of a computer system in accordance with an embodiment.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. For example, the techniques described above, can be implemented as computer software using computer-readable instructions and physically stored in one or more computer-readable media. FIG. 22 shows an exemplary computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2020) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding for a decoder, the method comprising:
    decoding prediction information of a current block in a current picture from a coded video bitstream, the prediction information being indicative of an inter prediction mode;
    determining whether a filtering process is applied on the current block, wherein the filtering process adjusts inter prediction samples of the current block based on neighboring reconstructed samples of the current block; and
    in response to determining that the filtering process is applied on the current block, performing, based on the filtering process, a primary transform for a transform block that is partitioned from the current block.

2. The method of claim 1. wherein the filtering process is operated based on a position dependent prediction combination (PDPC) mode or a combined inter and intra prediction (CIIP) mode.

3. The method of claim 1, wherein:
    the primary transform is a type-7 discrete sine transform (DST-7) mode for a horizontal transform that is applied to the transform block responsive to a width of the current block being smaller than or equal to a threshold value,
    the primary transform is the DST-7 mode for a vertical transform that is applied to the transform block responsive to a height of the current block being smaller than or equal to the threshold value, and
    the threshold value includes one of 4 pixels, 8 pixels, 16 pixels, or 32 pixels.

4. The method of claim 1, wherein
the primary transform is a type-2 discrete cosine transform (DCT-2) mode for a horizontal transform that is applied to the transform block responsive to a width of the current block being bigger than to a threshold value,
the primary transform is the DCT-2 mode for a vertical transform that is applied to the transform block responsive to a height of the current block being larger than the threshold value, and
the threshold value includes one of 4 pixels, 8 pixels, 16 pixels, or 32 pixels.

5. The method of claim 1, wherein the primary transform is a transform skip mode (TSM), a DCT-2 mode, or a DST-7 mode.

6. The method of claim 1, wherein the filtering process is a boundary filtering process in which at least one row adjacent to a boundary of the current block or at least one column adjacent to the boundary of the current block is adjusted based on the filtering process.

7. The method of claim 1, wherein the filtering process applies position-dependent weightings between the inter prediction samples of the current block and the neighboring reconstructed samples of the current block.

8. The method of claim 1, wherein the primary transform is implicit for a luma component of the current block, and a DCT-2 mode or a transform skip mode for a chroma component of the current block.

9. The method of claim 2, wherein:
the primary transform is a type-7 discrete sine transform (DST-7) mode for a horizontal transform that is applied to the transform block responsive to (i) the filtering process being operated in the CIIP mode with a ratio of Wintra/Winter being larger than a first threshold value, and (ii) a width of the current block being smaller than or equal to a second threshold value,
the primary transform is the DST-7 mode for a vertical transform that is applied to the transform block responsive to (i) the filtering process being operated in the CIIP mode with the ratio of Wintra/Winter being larger than the first threshold, and (ii) a height of the current block being smaller than or equal to the second threshold value,
the first threshold value includes one of number values 2, 2.5, 3, and 7,
the second threshold value includes one of 4 pixels, 8 pixels, 16 pixels, or 32 pixels, and
Wintra is an intra weighting factor applied on an intra prediction information of the current block, and Winter is an inter weighting factor applied on an inter prediction information of the current block.

10. The method of claim 2, wherein:
the primary transform is a type-7 discrete sine transform (DST-7) mode for a horizontal transform that is applied to the transform block responsive to (i) the filtering process being operated based on the CIIP mode, (ii) both above and left neighboring blocks of the current block being intra coded, and (iii) a width of the current block being smaller than or equal to a threshold value; and
the primary transform is the DST-7 mode for a vertical transform that is applied to the transform block responsive to (i) the filtering process being operated in the CIIP mode, (ii) both the above and the left neighboring blocks of the current block being intra coded, and (ii) a height of the current block being smaller than or equal to the threshold value, the threshold value including one of 4 pixels, 8 pixels, 16 pixels, or 32 pixels.

11. The method of claim 2, wherein:
the primary transform is a type-7 discrete sine transform (DST-7) mode for a horizontal transform that is applied to the transform block responsive to (i) the filtering process being operated based on the CIIP mode, (ii) a subset of above and left neighboring blocks of the current block being intra coded, (iii) a width of the current block being smaller than or equal to a threshold value; and
the primary transform is the DST-7 mode for a vertical transform that is applied to the transform block responsive to (i) the filtering process being operated based on the CIIP mode, (ii) the subset of the above and the left neighboring blocks of the current block being intra coded, and (iii) a height of the current block being smaller than or equal to the threshold value, the threshold value including one of 4 pixels, 8 pixels, 16 pixels, or 32 pixels.

12. The method of claim 2, further comprising:
determining a context model from a set of context models based on the prediction information, the prediction information indicating the filtering process based on the PDPC mode being applied to the current block; and
decoding primary transform information based on the determined context model, the primary transform information indicating whether the primary transform includes one of a transform skip mode (TSM), a DCT-2 mode, a DST-7 mode, and a DCT-8 mode.

13. A method of video decoding for a decoder, the method comprising:
acquiring prediction information of a current block from a coded video bitstream,
determining whether the prediction information indicates (i) an inter prediction merge mode, and (ii) a combined inter and intra prediction (CIIP) mode;
determining an intra prediction mode from an intra prediction mode candidate list responsive to the prediction information indicating the inter prediction merge mode and the CIIP mode;
determining intra prediction information according to the intra prediction mode and inter prediction information according to the inter prediction merge mode;
determining a weighting factor responsive to neighboring blocks of the current block being coded according to the CIIP mode or an inter position dependent prediction combination (PDPC) mode;
determining CIIP prediction information based on a sum of weighted intra prediction infoiination and weighted inter prediction information, the weighted intra prediction information being based on the intra prediction information and the weighting factor, the weighted inter prediction information being based on the inter prediction information and the weighting factor; and
reconstructing a sample of the current block according to the CIIP prediction information.

14. The method of claim 13, wherein the weighted inter prediction information is based on the inter prediction information and a constant value minus the weighting factor, the constant value including one of number values 2, 4, 8, or 16.

15. The method of claim 14, wherein:
the weighting factor is 3 responsive to both top-right/top and bottom-left/left neighboring blocks of the current block being coded using the CIIP mode,
the weighting factor is 2 responsive to one of the top-right/top and the bottom-left/left neighboring blocks of the current block being coded using the CIIP mode, and the weighting factor is 1 responsive to the top-right/top and the bottom-left/left neighboring blocks of the current block being coded using the CIIP mode.

16. The method of claim 15, wherein:
the weighting factor is 3 responsive to both top-right/top and bottom-left/left neighboring blocks of the current block being coded using the PDPC mode;
the weighting factor is 2 responsive to one of the top-right/top and the bottom-left/left neighboring blocks of the current block being coded using the PDPC mode; and
the weighting factor is 1 responsive to none of the top-right/top and the bottom-left/left neighboring blocks of the current block being coded using the PDPC mode.

17. A method of video decoding for a decoder, the method comprising:
acquiring transform block signaling information from a coded video bitstream, the transform block signaling information including first information associated with an inter prediction transform and second information associated with an intra prediction transform;
determining a first value of the first information and a second value of the second information;
transforming a first transform block coded in an inter prediction mode according to the first value and a first transform in an implicit multiple transform selection (MTS) mode in which the first transform is based on a property of the first transform block; and
transforming a second transform block coded in an intra prediction mode according to a second value and a second transform in the implicit MTS mode in which the second transform is based on a property of the second transform block.

18. The method of claim 17, wherein the first value of the first information is equal to 1 and the second value of the second information is equal to 1.

19. The method of claim 17, wherein the first value of the first information is greater than 0, and the second value of the second information is equal to 1.

20. The method of claim 17, wherein the transforming the second transform block comprises:
transforming the second transform block coded in the intra prediction mode according to the second value, the second transform in the implicit MTS mode, and a coding unit that includes the second transform block being intra sub-partitioning (ISP) coded, the second value being larger than 0.

* * * * *